US007869888B2

(12) United States Patent
Koyama et al.

(10) Patent No.: US 7,869,888 B2
(45) Date of Patent: Jan. 11, 2011

(54) INFORMATION PROCESSING APPARATUS, SEMICONDUCTOR MANUFACTURING SYSTEM, INFORMATION PROCESSING METHOD, AND STORAGE MEDIUM

(75) Inventors: Noriaki Koyama, Oshu (JP); Minoru Obata, Nirasaki (JP); Wenling Wang, Nirasaki (JP)

(73) Assignee: Tokyo Electron Limited, Tokyo (JP)

( * ) Notice: Subject to any disclaimer, the term of this patent is extended or adjusted under 35 U.S.C. 154(b) by 717 days.

(21) Appl. No.: 11/754,643

(22) Filed: May 29, 2007

(65) Prior Publication Data

US 2007/0282554 A1    Dec. 6, 2007

(30) Foreign Application Priority Data

May 31, 2006 (JP) ............................. 2006-151803
Jun. 6, 2006 (JP) ............................. 2006-156764

(51) Int. Cl.
*G05B 13/02* (2006.01)
*G06F 19/00* (2006.01)

(52) U.S. Cl. ............................. 700/54; 700/28; 700/45; 700/121; 702/85

(58) Field of Classification Search ............. 700/28–34, 700/37, 40–45, 52, 54, 108–110, 117–121, 700/172–174, 299; 702/81–85, 99, 182; 708/200, 270, 290
See application file for complete search history.

(56) References Cited

U.S. PATENT DOCUMENTS

| | | | | |
|---|---|---|---|---|
| 4,594,510 A | * | 6/1986 | Brown et al. ............ | 250/339.13 |
| 5,070,846 A | * | 12/1991 | Dudek et al. ................. | 123/488 |
| 5,993,043 A | * | 11/1999 | Fujii .......................... | 700/121 |
| 6,161,054 A | * | 12/2000 | Rosenthal et al. ........... | 700/121 |
| 6,376,139 B1 | * | 4/2002 | Fujisawa et al. .............. | 430/30 |
| 6,496,749 B1 | * | 12/2002 | Yamaguchi et al. ......... | 700/121 |

(Continued)

FOREIGN PATENT DOCUMENTS

JP    2002-25997    1/2002

OTHER PUBLICATIONS

Leang et al., A Control System for Photolithographic Sequences, 1996, IEEE Transactions on Semiconductor Manufacturing, v.9, n.2, pp. 191-207.*

(Continued)

*Primary Examiner*—M. N. Von Buhr
(74) *Attorney, Agent, or Firm*—Oblon, Spivak, McClelland, Maier & Neustadt, L.L.P.

(57) ABSTRACT

A information processing apparatus 100 for processing an acquired value, which is a value acquired in regard to a state during a treatment, performed by a semiconductor manufacturing apparatus 200 for performing a treatment on a treatment target containing a semiconductor according to a set value, which is a value for setting a condition of a treatment, includes: a set value receiving portion 101 for receiving the set value; a state value receiving portion 102 for receiving the acquired value; a correction amount calculating portion 103 for calculating a correction amount of the acquired value, using a correction function indicating a relationship between the set value and the acquired value; a correcting portion 104 for correcting the acquired value received by the state value receiving portion 102, using the correction amount calculated by the correction amount calculating portion 103; and an output portion 105 for outputting a result of correction performed by the correcting portion 104.

22 Claims, 25 Drawing Sheets

U.S. PATENT DOCUMENTS

| | | | |
|---|---|---|---|
| 6,567,720 B1* | 5/2003 | Figiel | 700/129 |
| 6,697,749 B2* | 2/2004 | Kamitani | 702/107 |
| 7,016,049 B2* | 3/2006 | Kurosawa | 356/508 |
| 7,115,424 B2* | 10/2006 | Nakao | 438/5 |
| 7,155,319 B2* | 12/2006 | Nangoy et al. | 700/281 |
| 7,256,892 B2* | 8/2007 | Nakajima | 356/417 |
| 7,566,181 B2* | 7/2009 | Yang et al. | 396/575 |
| 7,631,555 B2* | 12/2009 | Nakano et al. | 73/204.15 |
| 2004/0138773 A1* | 7/2004 | Tomoyasu | 700/108 |
| 2004/0199323 A1* | 10/2004 | Mizuno et al. | 701/109 |
| 2005/0064609 A1* | 3/2005 | Nagaoka et al. | 438/5 |
| 2006/0060602 A1* | 3/2006 | Jeong | 222/52 |
| 2006/0100735 A1* | 5/2006 | Hauf et al. | 700/121 |
| 2006/0172442 A1* | 8/2006 | Okabe et al. | 438/14 |
| 2006/0196960 A1* | 9/2006 | Yu et al. | 237/81 |
| 2006/0212156 A1* | 9/2006 | Tanaka et al. | 700/121 |
| 2007/0270983 A1* | 11/2007 | Yasui | 700/31 |
| 2007/0280609 A1* | 12/2007 | Ito | 385/94 |
| 2008/0183312 A1* | 7/2008 | Funk et al. | 700/45 |

OTHER PUBLICATIONS

Lachman-Shalem et al., Nonlinear Modeling and Multivariable Control of Photolithography, 2002, IEEE Transactions on Semiconductor Manufacturing, v.15, n.3, pp. 310-322.*

Su et al., A Processing Quality Prognostics Scheme for Plasma Sputtering in TFT-LCD Manufacturing, 2006, IEEE Transactions on Semiconductor Manufacturing, v.19, n.2, pp. 183-194.*

Schaper et al., Modeling and Control of Rapid Thermal Processing, 1992, SPIE Proceedings of Rapid Thermal and Integrated Processing, The International Society for Optical Engineering, v.1595, pp. 2-17.*

* cited by examiner

INFORMATION PROCESSING APPARATUS, SEMICONDUCTOR MANUFACTURING SYSTEM, INFORMATION PROCESSING METHOD, AND STORAGE MEDIUM

BACKGROUND OF THE INVENTION

1. Field of the Invention

The present invention relates to information processing apparatuses and the like that process values acquired from semiconductor manufacturing apparatuses.

2. Description of Related Art

As a semiconductor manufacturing apparatus for manufacturing a semiconductor device, for example, there is a heat treatment apparatus for performing a heat treatment such as a film-forming process, an oxidizing process, or a diffusion process, on a treatment target including a semiconductor such as semiconductor wafers.

In a heat treatment apparatus and the like, typically, a heat treatment is performed by controlling an item such as treatment temperature, treatment pressure, or gas flow rate so as to match a set value referred to as recipe, which is a value for setting a condition of the treatment.

For example, regarding such a heat treatment apparatus, there is a technique for controlling the electric power of a heater, using estimated values that are obtained by arranging multiple temperature sensors in a reaction furnace, and sequentially estimating the temperature of semiconductor wafers using a thermal model (mathematical model) based on factors such as the output from the temperature sensors and the electric power supplied to the heater (see JP 2002-25997A (e.g., page 1, FIG. 1), for example). According to such a technique, the temperature of semiconductor wafers in a non-contact state can be relatively accurately estimated, and thus the treatment temperature can be precisely controlled.

In a heat treatment apparatus as described above, it is judged whether or not the apparatus is properly operating, or whether or not a desired treatment is properly performed, by acquiring values indicating a state during a treatment, such as treatment temperature, treatment pressure, and electric power of a heater when a treatment is actually performed, and monitoring these values. For example, when in a single apparatus, results of a treatment performed for multiple times using the same recipe are plotted on a graph in the course of time, time-series deterioration or the like of the functions of the heat treatment apparatus can be judged.

However, regarding results of treatments performed using different set values, values acquired from the heat treatment apparatus are typically different from each other, and thus values obtained for the respective set values are managed using, for example, different control charts. Thus, it is not possible to monitor the treatment results simultaneously. In order to monitor the treatment results, it is necessary to switch the display of the control charts. Accordingly, there is a problem in that such operations take an inordinate amount of effort, and operations for monitoring are complicated.

Furthermore, since management is performed on the different control charts, it is difficult to simultaneously compare values of the treatment results with each other. Even if values obtained using the different set values are displayed in one system of coordinates, graphs of the values obtained using the different set values are plotted at positions that are away from each other, and thus there is a problem in that it is difficult to compare these values with each other.

Furthermore, typically, it is judged whether or not an apparatus or a treatment performed by an apparatus is properly operating, by setting a threshold value or the like for a value acquired from a heat treatment apparatus or the like in advance, and judging whether the value acquired from the heat treatment apparatus or the like is equal to or larger than the threshold value, or is smaller than the threshold value. When set values are different from each other, acquired values obtained from the heat treatment apparatus or the like are also different from each other. Thus, it is necessary to set threshold values in advance for the respective set values. Accordingly, there is a problem in that a process of setting threshold values takes an effort and time.

Furthermore, in a conventional information processing apparatus, it is difficult to display values, for example, in different value units or value ranges acquired from the semiconductor manufacturing apparatus in a superimposed manner, or to compare these values with each other. For example, even if internal temperature values acquired from the semiconductor manufacturing apparatus and electric power values of a heater inside the semiconductor manufacturing apparatus are plotted in a simply superimposed manner on a graph, it is difficult to accurately compare the values with each other because their units and the like are different from each other.

Furthermore, it is substantially not possible to apply multivariate analysis on such values in different units or the like without any processing, because even if applied, obtained values vary depending on how the units are taken.

Therefore, it is conceivable to perform so-called standardization on values acquired from the semiconductor manufacturing apparatus. The standardization refers to a process in which the values are converted into values that are not affected by how the units are taken, by converting the units of the values such that the average value and the standard deviation are set to specified values, for example. By performing such standardization, information expressed in different units can be compared with each other and can be analyzed using multivariate analysis. Typically, the standardization is performed such that the average value is 0 and that the standard deviation is 1. More specifically, the standardization is performed by calculating the formula "(value indicating a state−average value)/standard deviation", on each value indicating the state of the semiconductor manufacturing apparatus, acquired from the semiconductor manufacturing apparatus.

Such conventional standardization is effective in a case where data is normally-distributed, but there is a problem in that the standardization is not suitable as a process performed in a case where data is not normally-distributed.

For example, a case is described in which multivariate analysis is performed on state values in different measurement units. Typically, in multivariate analysis, standardization is performed as a preparation process such that there is no influence of the units and the like. At that time, there may be a case in which most state values are concentrated in the vicinity of a particular value, and only one value is significantly away from the particular value. In this case, there is a problem in that even if the one value is in the range of normal values as a value acquired from the semiconductor manufacturing apparatus, when the above-described standardization using the standard deviation is performed, the value may be judged to be a value that is significantly different from the others, as a result of the multivariate analysis.

Furthermore, in a case where values obtained by performing the standardization in this manner on values in different measurement units are plotted in a superimposed manner on a graph or the like or compared with each other, the standardization is performed on the values in different measurement units themselves such that there is no influence of the measurement units. However, when threshold values and the like are set for the respective values, even when the standardization is performed on the threshold values and the like, different threshold values are obtained. Consequently, it is necessary to evaluate values obtained by performing the standardization on values in different measurement units, using different threshold values. Thus, comparison and the like between state values cannot be said to be sufficiently easy, and there is a problem in that the effects of the standardization cannot be achieved.

As described above, conventionally, there is a problem in that values in different units or the like cannot be converted into appropriate values that do not depend on measurement units and that are suitable for data analysis such as multivariate analysis or comparison between the values.

SUMMARY OF THE INVENTION

An information processing apparatus according to the present invention is an information processing apparatus for processing a state value, which is a value relating to a state during a treatment, performed by a semiconductor manufacturing apparatus for performing a treatment on a treatment target containing a semiconductor according to a set value, which is a value for setting a condition of a treatment, comprising: a set value receiving portion that receives the set value; a state value receiving portion that receives the state value; a correction amount calculating portion that calculates a correction amount of the state value, using a correction function, which is a function indicating a relationship between the set value and the correction amount; a correcting portion that corrects the state value received by the state value receiving portion, using the correction amount calculated by the correction amount calculating portion; and an output portion that outputs the state value corrected by the correcting portion.

With this configuration, state values that are acquired from the semiconductor manufacturing apparatus or the like respectively in regard to treatments performed using different set values can be accurately superimposed such that predicted state value that are predicted to be ideally obtained for the respective set values are superimposed. Thus, the state values can be easily monitored. Furthermore, the state values can be easily compared with each other. As a result, abnormality in the semiconductor manufacturing apparatus or the like can be easily found.

Furthermore, in the information processing apparatus of the present invention, the correction function is a function indicating a relationship between a change amount of the set value and the correction amount, which is a change amount of the state value predicted based on the change amount of the set value, and the correction amount calculating portion calculates the correction amount corresponding to a change amount, with respect to a predetermined value, of the set value received by the set value receiving portion, using the correction function.

With this configuration, state values according to treatments performed using different set values can be accurately superimposed such that state values that are predicted to be ideally obtained for the respective set values are superimposed. Thus, the state values can be easily monitored. Furthermore, the state values can be easily compared with each other.

Furthermore, in the information processing apparatus of the present invention, the correction function is a function having, as a coefficient, a correction matrix for setting the correction function, the correction matrix being a matrix in which a value of each column is a value of a change amount of a state value obtained in a case where the semiconductor manufacturing apparatus is caused to perform a treatment while a value of each element in a matrix representing a desired set value is sequentially changed by a unit amount.

With this configuration, a correction function is set according to actually measured values. Thus, it is possible to set a correction function taking an actual state such as the arrangement state of the semiconductor manufacturing apparatus into consideration. Accordingly, the state values obtained according to different set values can be accurately superimposed.

Furthermore, in the information processing apparatus of the present invention, the correction function is a function having, as a coefficient, steady-state gain of a transfer function of the semiconductor manufacturing apparatus.

With this configuration, a process of obtaining the coefficient of the correction function is not necessary. Thus, the correction function can be set without causing the semiconductor manufacturing apparatus to perform a desired treatment. Accordingly, the setting of the correction function can be simplified.

Furthermore, in the information processing apparatus of the present invention, the correction function is a function indicating a relationship between the set value and the correction amount, which is a state value predicted based on the set value, and the correction amount calculating portion calculates the correction amount corresponding to the set value received by the set value receiving portion, using the correction function.

With this configuration, state values according to treatments performed using different set values can be accurately superimposed such that state values that are predicted to be ideally obtained for the respective set values are superimposed. Thus, the state values can be easily monitored. Furthermore, the state values can be easily compared with each other. As a result, abnormality in the semiconductor manufacturing apparatus or the like can be easily found.

Furthermore, in the information processing apparatus of the present invention, the correction function is a function obtained using multiple groups of the set value and the state value corresponding to the set value.

With this configuration, a correction function is set according to actually measured values. Thus, it is possible to set a correction function taking an actual state of the semiconductor manufacturing apparatus into consideration. Accordingly, the state values obtained according to different set values can be accurately superimposed.

Furthermore, the information processing apparatus of the present invention further comprises a correction function generating portion that generates the correction function, using multiple groups of the set value and the state value corresponding to the set value.

With this configuration, a correction function is set according to actually measured values. Thus, it is possible to set a correction function taking an actual state of the semiconductor manufacturing apparatus into consideration. Accordingly, the state values obtained according to different set values can be accurately superimposed.

Furthermore, in the information processing apparatus of the present invention, the correction function is a function expressed as an approximation formula obtained using multiple groups of the set value and the state value corresponding to the set value.

With this configuration, a correction function is set according to actually measured values. Thus, it is possible to set a correction function taking an actual state of the semiconductor manufacturing apparatus into consideration. Accordingly, the state values obtained according to different set values can be accurately superimposed.

Furthermore, in the information processing apparatus of the present invention, the set value is a value for setting a condition of a treatment on the treatment target inside the semiconductor manufacturing apparatus, and the state value is a value indicating a state during a treatment at a position other than a position at which the treatment target is disposed in the semiconductor manufacturing apparatus.

With this configuration, the state and the like of the semiconductor manufacturing apparatus can be monitored based on the state during a treatment at a position other than the position at which the treatment target is disposed in the semiconductor manufacturing apparatus.

Furthermore, in the information processing apparatus of the present invention, the set value receiving portion receives multiple set values, the state value receiving portion receives multiple state values respectively corresponding to the multiple set values, the correction amount calculating portion calculates multiple correction amounts respectively corresponding to the multiple state values, using the correction function, the correcting portion corrects the multiple state values respectively corresponding to the multiple correction amounts calculated by the correction amount calculating portion, by the multiple correction amounts, and the output portion outputs the multiple state values corrected by the correcting portion.

With this configuration, state values according to multiple set values can be accurately superimposed.

Furthermore, in the information processing apparatus of the present invention, the set value receiving portion receives a first set value and a second set value each serving as the set value, the state value receiving portion receives a first state value and a second state value respectively corresponding to the first set value and the second set value, the correction amount calculating portion calculates a correction amount of the second state value, based on a change amount of the second set value with respect to the first set value serving as a predetermined value, using the correction function, the correcting portion corrects the second state value by the correction amount, and the output portion outputs the second state value corrected by the correcting portion and the first state value.

With this configuration, it is sufficient to correct only the second state value. Thus, the process time can be reduced.

Furthermore, in the information processing apparatus of the present invention, the set value is a set value of temperature inside the semiconductor manufacturing apparatus, and the state value is a measured value of temperature inside the semiconductor manufacturing apparatus.

With this configuration, measured values of temperature obtained by causing the semiconductor manufacturing apparatus to perform a treatment according to different temperature settings can be accurately superimposed for monitoring or comparison.

Furthermore, in the information processing apparatus of the present invention, the set value is a set value of temperature at a predetermined position inside the semiconductor manufacturing apparatus, and the state value is a power value of a heater that heats an internal portion of the semiconductor manufacturing apparatus.

With this configuration, power values of a heater obtained by causing the semiconductor manufacturing apparatus to perform a treatment according to different temperature settings can be accurately superimposed for monitoring or comparison.

Moreover, an information processing apparatus according to the present invention is an information processing apparatus for processing a state value, which is a value relating to a state during a treatment, performed by a semiconductor manufacturing apparatus for performing a treatment on a treatment target containing a semiconductor, comprising: a state value receiving portion that receives the state value; a standard value storage portion in which a standard value, which is a value serving as standard for the state value, can be stored; a threshold value storage portion in which a threshold value, which is a value used for judging whether or not the state value is a desired value, can be stored; a calculating portion that calculates a ratio between a value relating to a difference between the state value received by the state value receiving portion and the standard value, and a value relating to a difference between the threshold value and the standard value; and an output portion that outputs the ratio calculated by the calculating portion.

With this configuration, state values can be converted into ratios using threshold values and standard values. Thus, the state values can be converted into values that do not depend on the measurement units and that are suitable for analysis and the like. Furthermore, since the state values are converted into ratios taking the relationship between the condition values and the threshold values into consideration, the state values can be evaluated using the same threshold value, without depending on the measurement units. Accordingly, the state values can be easily analyzed, for example.

Furthermore, in the information processing apparatus of the present invention, the state value receiving portion receives multiple state values in different measurement units, the calculating portion calculates the ratio corresponding to each of the multiple state values in different measurement units, and the output portion outputs the multiple ratios calculated by the calculating portion.

With this configuration, state values that are different from each other in measurement unit such as unit can be converted into ratios using threshold values and standard values. Thus, the state values can be converted into values that do not depend on the measurement units and that are suitable for analysis and the like. Furthermore, since the state values are converted into ratios taking the relationship between the condition values and the threshold values into consideration, values in different measurement units can be evaluated using the same threshold value. Accordingly, state values in different measurement units can be easily analyzed, for example.

Moreover, an information processing apparatus according to the present invention is an information processing apparatus for processing a state value, which is a value relating to a state during a treatment, performed by a semiconductor manufacturing apparatus for performing a treatment on a treatment target containing a semiconductor, comprising: a state value receiving portion that receives the multiple state values in different measurement units; a standard value storage portion in which a standard value, which is a value serving as standard for the state value, can be stored; a threshold value storage portion in which a threshold value, which is a value used for judging whether or not the state value is a desired value, can be stored; a calculating portion that calculates, for each of the multiple state values in different measurement units, a ratio between a value relating to a difference between the state value received by the state value receiving portion and the standard value, and a value relating to a difference between the threshold value and the standard value; a multivariate analysis portion that performs multivariate analysis, using the multiple ratios calculated by the calculating portion; and an output portion that outputs a result of analysis performed by the multivariate analysis portion.

With this configuration, state values that are different from each other in measurement unit such as unit can be converted into ratios using threshold values and standard values. Thus, the state values can be converted into values that do not depend on the measurement units and that are suitable for analysis and the like. When multivariate analysis is performed using the converted state values, appropriate analysis results taking the threshold values into consideration can be obtained regardless of whether or not the state values are normally-distributed.

Furthermore, in the information processing apparatus of the present invention, the threshold value used by the calculating portion for calculating a ratio is a value in a subrange to which the state value belongs, of a possible range of the state value that is divided into two subranges by the standard value.

With this configuration, without depending on the measurement units, the state values can be evaluated using the common threshold value, and appropriate multivariate analysis taking the threshold values into consideration can be performed.

Furthermore, in the information processing apparatus of the present invention, the state value is a measured value of temperature inside the semiconductor manufacturing apparatus, or a value obtained by statistically processing the measured value.

With this configuration, the state values can be easily analyzed, for example.

Furthermore, in the information processing apparatus of the present invention, the state value is a measured value of pressure inside the semiconductor manufacturing apparatus, or a value obtained by statistically processing the measured value.

With this configuration, the state values can be easily analyzed, for example.

Furthermore, in the information processing apparatus of the present invention, the state value is a measured value of flow rate of gas introduced into the semiconductor manufacturing apparatus, or a value obtained by statistically processing the measured value.

With this configuration, the state values can be easily analyzed, for example.

Furthermore, in the information processing apparatus of the present invention, the multiple state values in different measurement units are a measured value of temperature inside the semiconductor manufacturing apparatus and a measured value of pressure inside the semiconductor manufacturing apparatus, or values obtained by statistically processing the measured values.

With this configuration, the state values can be easily analyzed, for example.

Furthermore, in the information processing apparatus of the present invention, the multiple state values in different measurement units further include a measured value of flow rate of gas introduced into the semiconductor manufacturing apparatus, or a value obtained by statistically processing the measured value.

With this configuration, the effects are achieved that the state values can be easily analyzed, for example.

Moreover, a semiconductor manufacturing system according to the present invention is a semiconductor manufacturing system, comprising a semiconductor manufacturing apparatus for performing a treatment on a treatment target containing a semiconductor, and the above-described information processing apparatus, wherein the semiconductor manufacturing apparatus comprises: a treatment state value acquiring portion that acquires the state value; and a treatment output portion that outputs the state value.

With this configuration, the state values can be easily analyzed, for example.

Furthermore, in the semiconductor manufacturing system of the present invention, the semiconductor manufacturing apparatus further comprises: a treatment vessel in which a treatment is performed on the treatment target; and at least one temperature detecting portion that detects temperature inside the treatment vessel, and the treatment state value acquiring portion acquires a state value that is a value of temperature detected by the temperature detecting portion, or a value obtained by statistically processing the value.

With this configuration, the temperature of the semiconductor manufacturing apparatus can be easily analyzed, for example.

Furthermore, in the semiconductor manufacturing system of the present invention, the semiconductor manufacturing apparatus further comprises: a treatment vessel in which a treatment is performed on the treatment target; and a pressure detecting portion that detects pressure inside the treatment vessel, and the treatment state value acquiring portion acquires a state value that is a value of pressure detected by the pressure detecting portion, or a value obtained by statistically processing the value.

With this configuration, the pressure can be easily analyzed, for example.

Furthermore, in the semiconductor manufacturing system of the present invention, the semiconductor manufacturing apparatus further comprises: a treatment vessel in which a treatment is performed on the treatment target; and a gas flow rate detecting portion that detects flow rate of gas introduced into the treatment vessel, and the treatment state value acquiring portion acquires a state value that is a value of gas flow rate detected by the gas flow rate detecting portion, or a value obtained by statistically processing the value.

With this configuration, the gas flow rate can be easily analyzed, for example.

According to the information processing apparatus and the like of the present invention, values acquired from the semiconductor manufacturing apparatus or the like respectively in regard to treatments performed using different set values can be easily monitored.

Furthermore, according to the information processing apparatus and the like of the present invention, values that are different from each other in measurement unit such as unit can be converted into values that do not depend on the measurement units and that are suitable for analysis, for example.

DETAILED DESCRIPTION OF THE INVENTION

Figure 1:
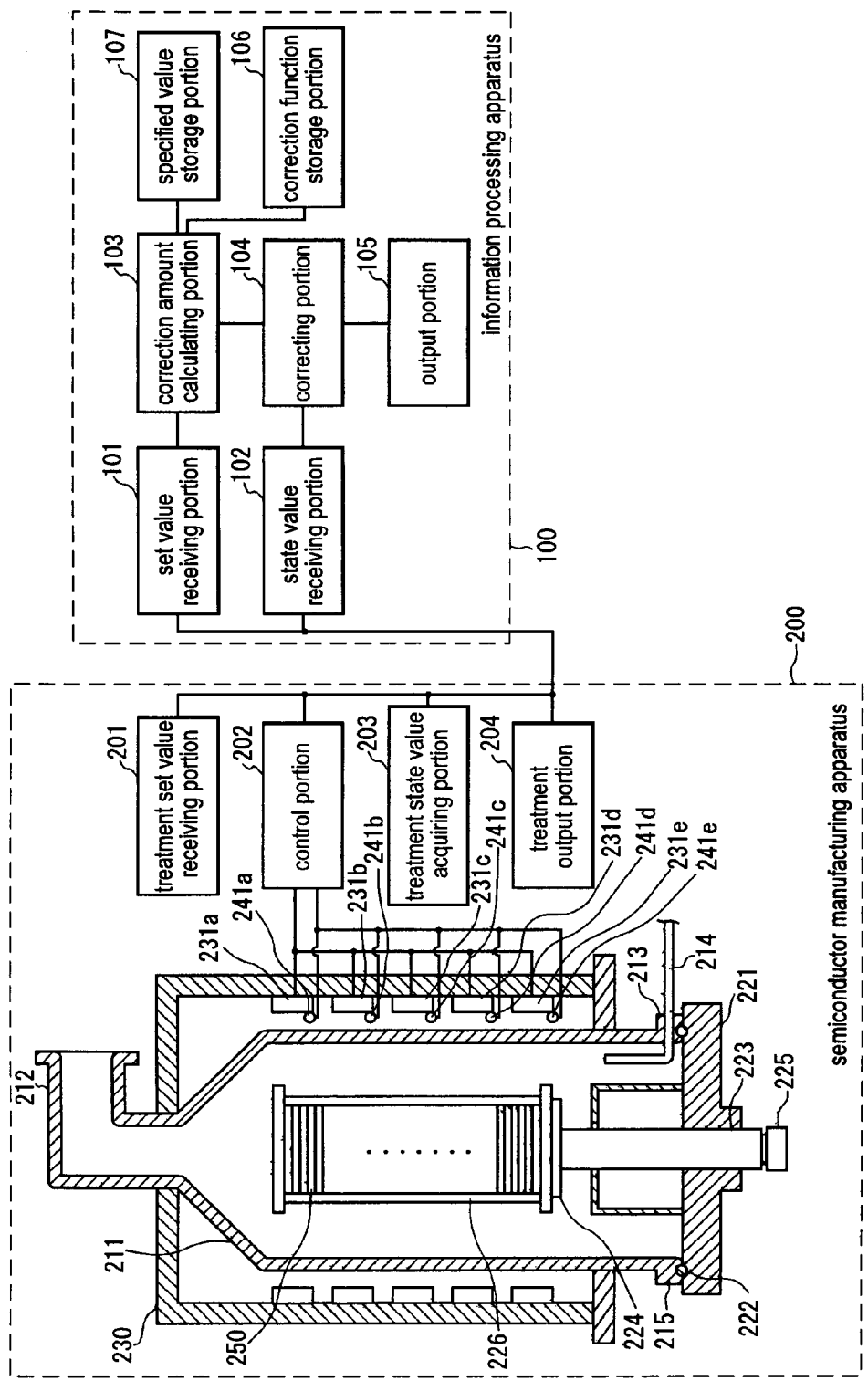
FIG. 1 is a diagram illustrating the configuration of a semiconductor manufacturing system in Embodiment 1.

Hereinafter, embodiments of an information processing apparatus and the like are described with reference to the drawings. Components indicated by the same reference numerals in the embodiments perform similar operations, and thus a description thereof may not be repeated.

Embodiment 1

FIG. 1 is a block diagram illustrating the configuration of a semiconductor manufacturing system in this embodiment. The semiconductor manufacturing system is provided with an information processing apparatus 100 and a semiconductor manufacturing apparatus 200. Herein, an example is described in which the semiconductor manufacturing apparatus 200 is a heat treatment apparatus for performing treatments including a heat treatment and in which a treatment target is a semiconductor wafer. However, the semiconductor manufacturing apparatus 200 may be in any form, as long as it performs treatments on a treatment target containing a semiconductor, and the treatment may be any treatment. More specifically, the configuration of the present invention can be applied also to a case where the semiconductor manufacturing apparatus 200 is in a form other than a heat treatment apparatus, or a case where the treatment target is a material containing a semiconductor, other than a semiconductor wafer. Herein, the information processing apparatus 100 and the semiconductor manufacturing apparatus 200 are connected to each other such that information can be exchanged, for example, via a network such as the Internet or LAN, or a dedicated signal line.

The information processing apparatus 100 is provided with a set value receiving portion 101, a state value receiving portion 102, a correction amount calculating portion 103, a correcting portion 104, an output portion 105, a correction function storage portion 106, and a specified value storage portion 107.

The set value receiving portion 101 receives a set value, which is a value for setting a condition of a treatment of the semiconductor manufacturing apparatus. Herein, for example, it is assumed that the set value received by the set value receiving portion 101 is a value for setting a condition of a treatment on a treatment target inside the semiconductor manufacturing apparatus 200. Specific examples of the set value include values for setting treatment temperature, treatment pressure, gas flow rate, heater electric power of the semiconductor manufacturing apparatus 200. Herein, an example is specifically described in which the set value is a value for setting the temperature of one or more semiconductor wafers inside the semiconductor manufacturing apparatus 200. In a case where a condition of the treatment is to be set at multiple points in the semiconductor manufacturing apparatus 200, the set value receiving portion 101 may receive one or more set values for setting the condition at part or whole of the multiple points. For example, in a case where the temperature can be controlled at multiple areas inside the semiconductor manufacturing apparatus 200, set values for setting temperature may be received for the respective areas. Furthermore, in a semiconductor manufacturing apparatus such as a heat treatment apparatus for performing a batch process, the set value receiving portion 101 may receive set values that are different from batch to batch. Examples of the reception performed by the set value receiving portion 101 include reception from an input unit, reception of an input signal that transmitted from another device or the like, and reading out of information from a storage medium or the like. Herein, an example is described in which the set value receiving portion 101 receives a set value output from the semiconductor manufacturing apparatus 200 (described later), but there is no limitation on the manner in which the set value receiving portion 101 receives the set value. An input unit of the set value to the set value receiving portion 101 may be in any form, such as a numeric keypad, a keyboard, a mouse, a menu screen, or a communication device such as a network card. The set value receiving portion 101 may or may not be provided with a device for reading out information from a communication device or a storage medium. The set value receiving portion 101 can be implemented by a device driver of an input unit such as a numeric keypad or a keyboard, control software for a menu screen, or a driver of a communication device, for example.

The state value receiving portion 102 receives a state value, which is a value acquired in regard to a state during a treatment of the semiconductor manufacturing apparatus 200. "State value" herein refers to a value acquired when the semiconductor manufacturing apparatus 200 is performing a treatment according to the set value. "Value acquired in regard to a state during a treatment" may be any value, as long as it can be acquired and can indicate a state during a treatment of the semiconductor manufacturing apparatus 200. Specific examples thereof include a measured value that is acquired during a treatment, from the semiconductor manufacturing apparatus 200 itself or the internal environment of the semiconductor manufacturing apparatus 200, a calculated value that is calculated using this measured value, and a value that is internally controlled during a treatment by the semiconductor manufacturing apparatus 200. Examples of the state value include a value obtained by measuring the temperature during a treatment at a desired position inside a treatment vessel 211 in the semiconductor manufacturing apparatus 200 using a temperature sensor or the like, a value obtained by measuring the treatment pressure using a pressure gauge or the like, a power value of a heater measured by a wattmeter, and an average value, a maximum value, a minimum value, and a standard deviation of the measured values. Furthermore, the state value may be a power value of an internal heater calculated based on, for example, voltage or current supplied during a treatment from the semiconductor manufacturing apparatus to the heater. It should be noted that there is preferably a correlation between the above-described set value received by the set value receiving portion 101 and the state value received by the state value receiving portion 102. For example, if the set value is a set temperature at a desired position inside the treatment vessel 211 in the semiconductor manufacturing apparatus 200, then the temperature at a predetermined position inside the treatment vessel 211 in the semiconductor manufacturing apparatus 200 or the output from the heater during a treatment is taken as the state value received by the state value receiving portion 102. The state value may be one value, may be multiple values such as multiple values acquired in the course of time, or may be a value acquired each time the semiconductor manufacturing apparatus performs a batch process. There is no limitation on the manner in which the state value receiving portion 102 receives the state value. For example, the state value receiving portion 102 may receive the state value that transmitted from another device or the like via a communication line, or may read out the state value that is stored in a storage medium or the like. Furthermore, the state value receiving portion 102 may receive the state value that is input from an input unit such as a numeric keypad, a keyboard, a mouse, or a menu screen. The state value receiving portion 102 can be implemented by a device driver of an input unit such as a numeric keypad or a keyboard, control software for a menu screen, a driver of a communication device, or a driver of a device for reading out information from a storage medium, such as a memory card reader or a CD drive, for example.

The correction amount calculating portion 103 calculates a correction amount using a correction function, which is a function indicating the relationship between the set value and a correction amount of the state value. The correction amount refers to a value used for correction. The correction function is, for example, a function indicating the relationship between the change amount of the set value received by the set value receiving portion 101 and the correction amount, which is the change amount of the state value predicted based on the change amount of the set value. Herein, using the correction function, the correction amount calculating portion 103 calculates the correction amount corresponding to a change amount, with respect to a predetermined value, of the set value received by the set value receiving portion 101. Herein, the predetermined value is referred to as a specified value. The specified value is described later. In this embodiment, more specifically, the correction amount calculating portion 103 calculates the correction amount by assigning a change amount, with respect to a preset specified value, of the set value received by the set value receiving portion 101 to the above-described correction function. It should be noted that the predicted state value specifically refers to an ideal state value that is predicted to be obtained in a case where ideal control is performed according to the set value in the semiconductor manufacturing apparatus. The change amount described herein typically refers to a value obtained by subtracting a value such as the set value or the state value before change from a value such as the set value or the state value after change. The change amount also may be an absolute value of the value obtained by this subtraction. Furthermore, the correction amount also may be an absolute value. The correction function is described later in detail. The correction function is stored in a storage medium such as a memory in advance, and read out when calculating the correction amount, for example. Herein, it is assumed that the correction function is stored in the correction function storage portion 106. The specified value is a preset value for specifying a value into which the set value received by the set value receiving portion 101 is to be converted. The specified value may be arbitrarily set by the user, or may be set by the information processing apparatus 100 according to the set value or the state value received by the information processing apparatus 100, for example. For example, when multiple set values are received, one of the set values may be taken as the specified value, or any value between the set values such as an intermediate value may be taken as the specified value. The correction amount obtained using the correction function is a correction amount that is necessary for each state value, in a case where the set value is converted into the specified value. More specifically, when the state value received by the state value receiving portion 102 is corrected using the correction amount, the state value received by the state value receiving portion 102 is corrected into the state value obtained in a case where the set value is the specified value. The specified value may be stored in a storage medium such as a memory in advance, or may be received as appropriate from a receiving portion such as the set value receiving portion 101 described above. Herein, a case is described in which the specified value stored in advance in the specified value storage portion 107 is read out by the correction amount calculating portion 103. The correction amount calculating portion 103 can be typically implemented as an MPU (micro processing unit) or a memory, for example. Typically, the process procedure of the correction amount calculating portion 103 is implemented by software, and the software is stored in a storage medium such as a ROM. Note that the process procedure also may be implemented by hardware (dedicated circuit).

The correcting portion 104 corrects the state value received by the state value receiving portion 102, using the correction amount calculated by the correction amount calculating portion 103, thereby acquiring a new state value. For example, the correcting portion 104 performs correction in which the correction amount is subtracted from the state value received by the state value receiving portion 102. It should be noted that in a case where the correction amount is an absolute value, the correcting portion 104 performs correction that eventually provides the same correction results as those obtained in a case where the correction amount is not an absolute value. The correcting portion 104 can be typically implemented as an MPU or a memory, for example. Typically, the process procedure of the correcting portion is implemented by software, and the software is stored in a storage medium such as a ROM (read only memory). Note that the process procedure also may be implemented by hardware (dedicated circuit).

The output portion 105 outputs the state value corrected by the correcting portion 104. Herein, the term "output" is a concept that includes displaying on a display screen, printing on paper or the like using a printer, accumulation in a storage medium such as a memory, and transmission to an external apparatus. The output portion 105 may or may not include an output device such as a display screen or a printer. The output portion 105 can be implemented by driver software for an output device, or a combination of driver software for an output device and the output device, for example.

The correction function is stored in the correction function storage portion 106. The phrase "correction function is stored" refers to a state in which information indicating the correction function is stored. There is no limitation on the correction function storage portion 106, as long as the correction function can be stored therein. Typically, the correction function storage portion 106 is preferably a non-volatile storage medium, but also can be implemented as a volatile storage medium.

The specified value is stored in the specified value storage portion 107. There is no limitation on the specified value storage portion 107, as long as the specified value can be stored therein. Typically, the specified value storage portion 107 is preferably a non-volatile storage medium, but also can be implemented as a volatile storage medium.

Next, the configuration of the semiconductor manufacturing apparatus 200 is described. It should be noted that the semiconductor manufacturing apparatus 200 has the configuration for performing a desired treatment on a treatment target according to various settings, for example. However, this specification describes only the primary configuration for performing a desired treatment on a treatment target according to the above-described set value, and the primary configuration for acquiring the above-described state value in a state where the desired treatment is performed on a treatment target. The other configurations and the like are known arts, and therefore a description thereof is omitted.

The semiconductor manufacturing apparatus 200 is provided with the treatment vessel 211. The treatment vessel 211 is also referred to as a reactor vessel or a reaction furnace, for example. In the treatment vessel 211, a semiconductor wafer 250 serving as the treatment target is contained and undergoes a predetermined heat treatment such as a CVD (chemical vapor deposition) process. The treatment vessel 211 is made of a heat-resistant and corrosion-resistant material such as quartz glass. The treatment vessel 211 has a single tube structure in which the upper end and lower end are opened. The upper end is narrowed to a small diameter and forms an exhaust portion 212. The exhaust portion 212 is connected via an exhaust pipe (not shown) to a vacuum pump (not shown), for example.

A gas introducing portion 213 for introducing treatment gas or inert gas into the treatment vessel 211 is disposed in the lower portion of the treatment vessel 211. Multiple gas-supplying pipes 214 communicated with a gas source are inserted into the gas introducing portion 213. Treatment gas introduced from the gas introducing portion 213 rises through the treatment vessel 211, is supplied to a predetermined heat treatment on the semiconductor wafer 250, and then is exhausted from the exhaust portion 212.

A flange-shaped lower end portion 215 of the treatment vessel 211 is opened and closed by a cover 221 made of a heat-resistant and corrosion-resistant material such as stainless steel. The cover 221 is vertically moved by a lift (not shown), thereby tightly closing the lower end portion 215 of the treatment vessel 211 at the lifted position, and opening the lower end portion 215 of the treatment vessel 211 at the lowered position.

An O-ring 222 for securing air tightness is disposed between the lower end portion 215 of the treatment vessel 211 and the cover 221.

A rotating support post 223 is rotatably provided upright at a central portion of the cover 221, and a rotating table 224 is secured to the upper end of the rotating support post 223.

Furthermore, a driving portion 225 for driving to rotate the rotating support post 223 is provided below the cover 221.

On the rotating table 224, a boat 226 made of quartz glass (so-called semiconductor wafer boat) in which, for example, 60 semiconductor wafers 250 can be mounted at a predetermined interval in the height direction is placed. The boat 226 is placed on the rotating table 224 in a state where the cover 221 has been lowered, is completely loaded into the treatment vessel 211 when the cover 221 is lifted to tightly close the lower end portion 215 of the treatment vessel 211, and is unloaded as the cover 221 is lowered after the treatment has been completed. Furthermore, during a process, the boat 226 rotates as the rotating table 224 is rotated by the driving portion 225, and thus a uniform heat treatment is performed on the semiconductor wafers 250.

The treatment vessel 211 is surrounded by a heating furnace 230 provided with one or more heaters 231, which are heating units for heating the semiconductor wafers 250 contained in the treatment vessel 211, from the peripheral portion of the semiconductor wafers 250. The heaters 231 are arranged along the periphery of the treatment vessel 211. The heaters 231 have resistance heat generating members, and generate heat when electric power is supplied, for example. As the resistance heat generating members, it is preferable to use a carbon wire or the like that is excellent in temperature rising and falling properties. However, there is no limitation on the structure or the like of the heaters 231. Herein, an example is shown in which the one or more heaters 231 are constituted by five heaters 231$a$ to 231$e$, but there is no limitation on the number of the heaters. The heaters 231$a$ to 231$e$ are arranged along the direction in which the semiconductor wafers 250 are aligned. However, there is no limitation on the points at which the heaters 231$a$ to 231$e$ are arranged.

One or more temperature detecting portions 241 are provided along the outer circumferential face of the treatment vessel 211. Herein, an example is described in which the one or more temperature detecting portions 241 are constituted by five temperature detecting portions 241$a$ to 241$e$, but there is no limitation on the number of the temperature detecting portions 241. Herein, the five temperature detecting portions 241$a$ to 241$e$ are arranged in one row in the vertical direction, but there is no limitation on the points at which the temperature detecting portions 241 are arranged. The temperature detecting portions 241$a$ to 241$e$ detect temperature, and output an electric signal corresponding to the detected temperature. The temperature detecting portions 241$a$ to 241$e$ are specifically temperature sensors, and may have any structure such as a thermocouple, as long as the temperature can be detected thereby. It should be noted that there is no limitation on the arrangement of the temperature detecting portions 241$a$ to 241$e$. As described later, the output of the temperature detecting portions 241$a$ to 241$e$ is used for predicting the surface temperature of the semiconductor wafers 250 that are arranged in the boat 226.

The semiconductor manufacturing apparatus 200 is further provided with a treatment set value receiving portion 201, a control portion 202, a treatment state value acquiring portion 203, and a treatment output portion 204.

The treatment set value receiving portion 201 receives a set value for setting a condition of a treatment on a treatment target. More specifically, the set value received by the treatment set value receiving portion 201 is the above-described set value received by the set value receiving portion 101. In a case where a condition of a treatment is to be set at multiple points in the semiconductor manufacturing apparatus 200, the treatment set value receiving portion 201 may receive one or more set values for setting the condition at part or whole of the multiple points. For example, in a case where the temperature can be controlled at multiple areas inside the semiconductor manufacturing apparatus 200, set values for setting temperature may be received for the respective areas. Furthermore, in a semiconductor manufacturing apparatus for performing a batch process, such as a batch-type heat treatment apparatus, the treatment set value receiving portion 201 may receive set values that are different from batch to batch. Herein, it is assumed that the set value is a set value of the temperature of the one or more semiconductor wafers inside the treatment vessel 211, as described above. When setting the temperature of multiple semiconductor wafers 250, the treatment set value receiving portion 201 receives set values for the respective positions of the semiconductor wafers 250. There is no limitation on the manner in which the treatment set value receiving portion 201 receives the state value. For example, the treatment set value receiving portion 201 may receive the state value that transmitted from another device or the like via a communication line, or may read out the state value that is stored in a storage medium or the like. Furthermore, the treatment set value receiving portion 201 may receive the state value that is input from an input unit such as a numeric keypad, a keyboard, a mouse, or a menu screen. Herein, an example is described in which the set value that has been received by the treatment set value receiving portion 201 is output by the treatment output portion 204 to the set value receiving portion 101 in the information processing apparatus 100, and this set value is received by the set value receiving portion 101. The treatment set value receiving portion 201 can be implemented by a device driver of an input unit such as a numeric keypad or a keyboard, control software for a menu screen, a driver of a communication device, or a driver of a device for reading out information from a storage medium, such as a memory card reader or a CD drive, for example.

The control portion 202 controls the operation of the semiconductor manufacturing apparatus 200 according to the set value received by the treatment set value receiving portion 201. For example, in a case where the set value is a value for setting temperature, the control portion 202 performs control such that the temperature inside the treatment vessel 211 matches the temperature set by the set value, by controlling the output of the heaters 231 according to the temperature detected by the one or more temperature detecting portions 241. There is no limitation on the manner in which the control portion 202 controls the state inside the treatment vessel 211 according to the set value. For example, it is possible to apply so-called feedback control in which a state serving as a control target is detected at a control target point by a sensor or the like, and the semiconductor manufacturing apparatus 200 is controlled such that the detection results match the set value. Herein, an example is described in which the control portion 202 performs control such that the temperature at a position for which the set value is to be set, such as a treatment target or a specific zone inside the treatment vessel 211, matches the temperature set by the set value. Herein, an example is specifically described in which as disclosed in JP 2002-25997A described above, the control portion 202 estimates the temperature of a predetermined treatment target or zone inside the treatment vessel 211, based on the temperature detected by the temperature detecting portions 241, using a model that is for estimating the temperature of the treatment target or zone and that is stored in a storage portion or the like (not shown), and individually controls the one or more heaters 231 according to this estimation such that the temperature of the treatment target or zone matches the temperature set by the set value. The control portion 202 performs control of the entire semiconductor manufacturing apparatus 200 other than the above, such as control of gas flow rate, control of opening/closing of a valve, and control of the boat lift, but such control is a known art, and therefore a description thereof is omitted. The control portion 202 can be typically implemented as an MPU or a memory, for example. Typically, the process procedure of the control portion 202 is implemented by software, and the software is stored in a storage medium such as a ROM. Note that the process procedure also may be implemented by hardware (dedicated circuit).

The treatment state value acquiring portion 203 acquires a state value, which is a value relating to a state during a treatment of the semiconductor manufacturing apparatus 200. Typically, this state value is the same as the above-described state value received by the state value receiving portion 102. Examples of the state value include temperature values detected by the temperature detecting portions 241, that is, measured values, and power values of the heaters 231. For example, in a state where a predetermined treatment is performed on a treatment target, based on a signal that is output as a result of detecting the temperature with the temperature detecting portions, the treatment state value acquiring portion 203 acquires the state value that is a temperature value corresponding to that signal. Furthermore, the treatment state value acquiring portion 203 may acquire the state vale that is a power value of the heaters 231 controlled by the control portion 202, or may acquire the state value that is a power value of the heaters 231 based on a power value detected by a wattmeter (not shown). Herein, a case is described in which the output of the temperature detecting portions 241 is once input to the control portion 202, and the output of the temperature detecting portions 241 is output from the control portion 202 to the treatment state value acquiring portion 203. However, the output of the temperature detecting portions 241 may be directly received by the treatment state value acquiring portion 203. Furthermore, in this case, the input received by the treatment state value acquiring portion 203 may be output by the treatment state value acquiring portion 203 as appropriate to the control portion 202. The treatment state value acquiring portion 203 can be typically implemented as an MPU or a memory, for example. Typically, the process procedure of the treatment state value acquiring portion 203 is implemented by software, and the software is stored in a storage medium such as a ROM. Note that the process procedure also may be implemented by hardware (dedicated circuit).

The treatment output portion 204 outputs the state value acquired by the treatment state value acquiring portion 203. Herein, an example is described in which the treatment output portion 204 transmits the state value acquired by the treatment state value acquiring portion 203, to the state value receiving portion 102 in the information processing apparatus 100. There is no limitation on a timing, trigger, or the like for outputting the state value from the treatment output portion 204 to the state value receiving portion 102. For example, it is not necessary for the treatment output portion 204 to output a state value every time the treatment state value acquiring portion 203 acquires a value relating to a state during a treatment. The treatment output portion 204 also may output multiple values after the multiple values are temporarily accumulated in a memory or the like. Furthermore, the state value output by the treatment output portion 204 may be accumulated in a storage medium such as a memory (not shown) inside the information processing apparatus 100. Furthermore, the treatment output portion 204 may output the set value received by the treatment set value receiving portion 201, to the set value receiving portion 101. Furthermore, the treatment output portion 204 may exchange information relating to a treatment or the like with the information processing apparatus 100, via a removable storage medium or the like. Herein, the term "output" is a concept that includes transmission to an external apparatus, and accumulation in a storage medium such as a memory. The treatment output portion 204 may or may not include an output device such as a communication device. The treatment output portion 204 can be implemented by driver software for an output device, or a combination of driver software for an output device and the output device, for example.

Next, the operation of the information processing apparatus 100 is described with reference to the flowchart in FIG. 2. Herein, for the sake of convenience, a case is described in which the information processing apparatus 100 receives a set value set for performing a desired treatment, and multiple state values acquired at different times in a case where the semiconductor manufacturing apparatus 200 is caused to perform the desired treatment according to this set value that have been output by the semiconductor manufacturing apparatus 200 or the like. Herein, it is assumed that each of the multiple state values is associated with information of the time when that state value is acquired.

(step S201) The set value receiving portion 101 receives a set value that is output by the semiconductor manufacturing apparatus 200 or the like. The received set value is at least temporarily accumulated in a storage medium such as a memory (not shown).

(step S202) The state value receiving portion 102 receives multiple state values that are output by the semiconductor manufacturing apparatus 200 or the like. The received state values are accumulated in a storage medium such as a memory (not shown).

(step S203) The correction amount calculating portion 103 acquires a correction function stored in advance, from the correction function storage portion 106.

(step S204) The correction amount calculating portion 103 acquires a specified value stored in advance, from the specified value storage portion 107.

(step S205) The correction amount calculating portion 103 calculates a change amount of the set value received in step S201, with respect to the specified value acquired in step S204. More specifically, the change amount is obtained by subtracting the specified value from the set value.

(step S206) The correction amount is calculated by assigning the change amount calculated in step S205, to the correction function acquired in step S203.

(step S207) The correcting portion 104 assigns 1 to a counter K.

(step S208) The correcting portion 104 acquires a Kth state value. Herein, the state value receiving portion 102 acquires a state value that is a Kth value in time-series order acquired by the semiconductor manufacturing apparatus 200 or the like, among set values accumulated in a memory or the like (not shown).

(step S209) The correcting portion 104 corrects the state value acquired in step S208, by the correction amount acquired in step S206.

(step S210) The output portion 105 outputs the state value corrected in step S209. For example, the output portion 105 stores the corrected state value in a memory, displays it on a display screen, or transmits it to another apparatus.

(step S211) The correcting portion 104 increments the counter K by 1.

(step S212) The correcting portion 104 judges whether or not there is a Kth state value. If there is a Kth state value, then the procedure returns to step S208. If there is no Kth state value, then the process is ended.

Figure 2:
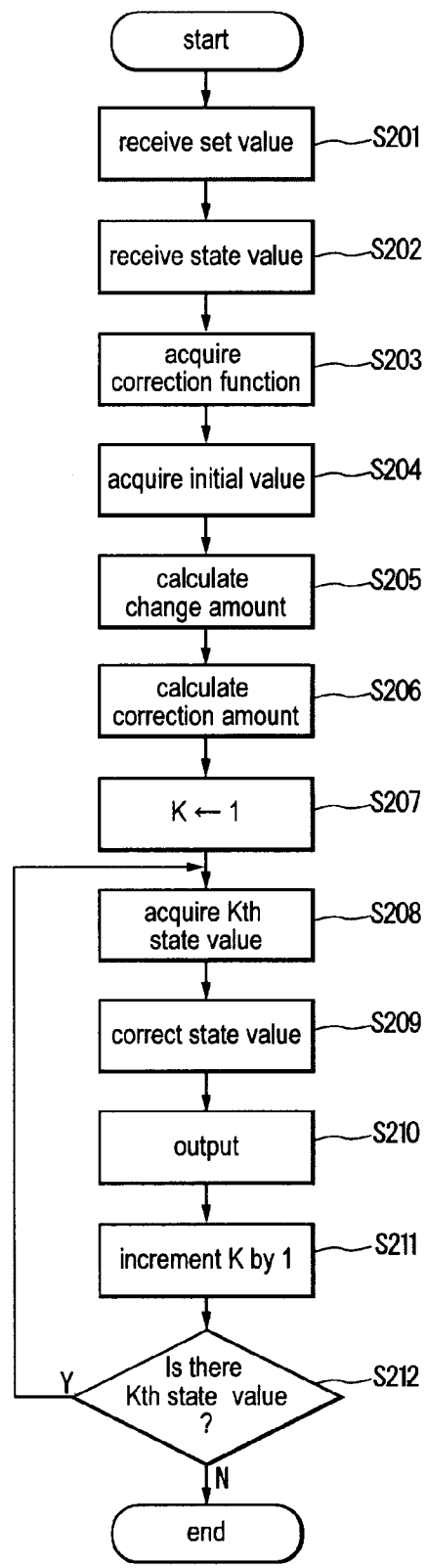
FIG. 2 is a flowchart illustrating the operation of an information processing apparatus in the semiconductor manufacturing system.

It should be noted that in the flowchart in FIG. 2, the above-described process may be performed in a state where multiple set values used for one batch, multiple specified values, multiple state values acquired at one time, and the like are expressed as a matrix. For example, in a case where the temperature is to be set at multiple zones inside the semiconductor manufacturing apparatus 200, the set values and the specified values may be expressed as a matrix in which the number of elements is the same as the number of the zones. Furthermore, in a case where respective power values of the multiple heaters 231 or multiple values obtained from the temperatures acquired by the multiple temperature detecting portions 241 are used as the state values, the state values may be expressed as a matrix in which the number of elements matches the number of the heaters 231 or the number of the temperature detecting portions 241. In this case, the process in step S205, step S206, step S209, and the like is performed by a matrix operation, for example.

In the description above, a case is described in which a process such as correction is performed on state values obtained as a result of performing a treatment using one set value. However, in a case where a treatment is performed while changing the set value from batch to batch, for example, a process such as correction may be performed on state values respectively obtained for the different set values. For example, in a case where multiple set values can be received in step S201 and where state values corresponding to the multiple set values can be received in step S202, after the process has been performed on one set value following the above-described flowchart, it may be judged whether or not there is another set value. If there is another set value, then the procedure returns to, for example, step S204, where a process such as correction is repeatedly performed on a state value obtained for another set value as in the above-described flowchart.

In the flowchart in FIG. 2, the process is ended by turning off power or a processing-ending interruption.

The above-described operation in which the semiconductor manufacturing apparatus 200 in the semiconductor manufacturing system performs a desired treatment according to the set value, or acquires the state value is a known art, and therefore a description thereof is omitted.

Next, a method for acquiring the above-described correction function is described.

Herein, first, it is assumed that m treatment conditions (m is an integer of 1 or more) can be set for the semiconductor manufacturing apparatus, and that n state values (n is an integer of 1 or more), such as state values acquired from n measurement target positions, can be acquired at once from the semiconductor manufacturing apparatus 200.

A set value for setting an ith treatment condition among the m treatment conditions is taken as $X_i$ ($1 \leq i \leq m$), and set values for setting the m treatment conditions are taken as X, where $X=(X_1, \ldots, X_i, \ldots, X_m)$. Furthermore, specified values for specifying values into which the set values X are to be converted are taken as x, where $x=(x_1, \ldots, x_i, \ldots, x_m)$. Each element of the specified values x for specifying a value into which each element $X_i$ of the set values X is to be converted is $x_i$. State values that are predicted to be ideally obtained in a case where the semiconductor manufacturing apparatus is caused to perform a desired treatment using the set value $X_i$ are taken as Q, where $Q=(Q_1, \ldots, Q_j, \ldots Q_n)$. State values that are predicted to be ideally obtained in a case where the semiconductor manufacturing apparatus is caused to perform a desired treatment using the set value $x_i$ are taken as q, where $q=(q_1, \ldots, q_j, \ldots q_n)$. Furthermore, ith state values are respectively taken as $Q_j$ and $q_j$ ($1 \leq j \leq n$). Examples of the desired treatment include treatments such as a heat treatment that is performed by the semiconductor manufacturing apparatus on a semiconductor wafer. It should be noted that the specified values x may be any value, but in a case where the set value X can take multiple values, a value between the maximum value and the minimum value of the multiple set values X or a value in the vicinity thereof is preferable.

Next, the set values $X=(X_1, \ldots, X_i, \ldots X_m)$ are converted into desired set values Sp for setting a correction function that are expressed as a matrix. Herein, the set values $Sp=(Sp_1, \ldots, Sp_i, \ldots Sp_m)$. The elements of the set values Sp may be the same value or different values. The set values Sp may be any value, but in a case where the set value X can take multiple values, a value between the maximum value and the minimum value of the multiple set values X or a value in the vicinity thereof is preferable. A value in the vicinity of the above-described specified value x is more preferable.

First, the semiconductor manufacturing apparatus 200 is caused to perform a desired treatment such as a heat treatment using the set values Sp. Then, n state values that are output from the semiconductor manufacturing apparatus 200 during this treatment are acquired. The state values are herein referred to as initial state values.

Next, only the first element among the set values Sp is increased by the unit amount, herein, by one, and the semiconductor manufacturing apparatus 200 is caused to perform a desired treatment using the changed set values. It should be noted that although the element is increased herein, the element also may be decreased by the unit amount.

Then, n state values that are output from the semiconductor manufacturing apparatus 200 during this treatment are acquired. The change amounts of the n state values are obtained by subtracting the initial state values from the n state values. The change amounts of the n state values are expressed as a matrix $(a_{1i}, \ldots, a_{ji}, \ldots, a_{ni})$.

In a similar manner, only the ith element among the set values Sp is increased by the unit amount, herein, by one, and the semiconductor manufacturing apparatus 200 is caused to perform a treatment using the changed set values. The change amounts $(a_{1i}, \ldots, a_{ji}, \ldots, a_{ni})$ of the state values are acquired by subtracting the initial state values from state values obtained during this treatment.

This process is sequentially performed until i=m, and a matrix A is obtained in which the change amounts of the state values obtained when the ith element of the set values Sp is increased by the unit amount are set to values in an ith column. The matrix A can be expressed as below.

$$A = \begin{pmatrix} a_{11} & \cdots & a_{1i} & \cdots & a_{1m} \\ \vdots & \ddots & \vdots & \ddots & \vdots \\ a_{j1} & \cdots & a_{ji} & \cdots & a_{jm} \\ \vdots & \ddots & \vdots & \ddots & \vdots \\ a_{n1} & \cdots & a_{ni} & \cdots & a_{nm} \end{pmatrix}$$

Then, the following correction function having the matrix A as a coefficient is defined.

$$\Delta Q = (Q \cdot q)$$

-continued
$$= A(X \cdot x)$$

$$= \begin{pmatrix} \Delta Q_1 \\ \vdots \\ \Delta Q_j \\ \vdots \\ \Delta Q_n \end{pmatrix}$$

$$= \begin{pmatrix} a_{11} & \cdots & a_{1i} & \cdots & a_{1m} \\ \vdots & \ddots & \vdots & \ddots & \vdots \\ a_{j1} & \cdots & a_{ji} & \cdots & a_{jm} \\ \vdots & \ddots & \vdots & \ddots & \vdots \\ a_{n1} & \cdots & a_{ni} & \cdots & a_{nm} \end{pmatrix} \begin{pmatrix} X_1 - x_1 \\ \vdots \\ X_i - x_i \\ \vdots \\ X_m - x_m \end{pmatrix}$$

In this correction function, $\Delta Q=(\Delta Q_1, \ldots, \Delta Q_j, \ldots \Delta Q_n)$ represents the change amount between the ideal state value Q that is predicted to be obtained in a case where the set value is X and the ideal state value q that is predicted to be obtained in a case where the set value is the specified value x. The correction function is a function indicating the relationship between the change amount $\Delta Q$ and state values that are predicted to be obtained in a case where the semiconductor manufacturing apparatus 200 is controlled according to the set values x and X when the set value is changed from x to X. More specifically, when the state value acquired from the semiconductor manufacturing apparatus 200 using the set value X is corrected using $\Delta Q$ as the correction amount, the state value can be corrected into the state value that is to be acquired in a case where the set value is the specified value x.

For example, a case is described in which the set value is a set value of the treatment temperature of the semiconductor manufacturing apparatus 200. As in JP 2002-25997A described above, in a case where the position of a target that is to be controlled according to the set value, such as a semiconductor wafer, is different from that of a temperature detecting portion for detecting temperature, or in a case where the arrangement of a temperature detecting portion disposed at a control target position in order to perform feedback control is different from that of a temperature detecting portion disposed in order to output the state value to the outside, the temperature at the position controlled according to the set value typically takes different values between the set value and the state value. Furthermore, the degree of difference in the temperature varies depending on factors such as the set value of the temperature, and is not constant. In order to compare state values obtained by causing the semiconductor manufacturing apparatus 200 to perform a desired treatment at different times using a first set value and a second set value that are different from each other, a method is conceivable in which the state values are compared with each other by constituting the state values obtained in a case where the second set value is superimposed on the first set value, by subtracting a change amount of the second set value with respect to the first set value, from the state value obtained based on the second set value. However, in such a case, the change amount of the set value may not necessarily match the change amount of the state value obtained by performing control according to the set value, and thus the different state values may not be accurately compared with each other.

On the other hand, in this embodiment, the correction function indicating the relationship between the change amount of the set value and the change amount of the state value is acquired, actually based on the state values. Thus, when the difference between the set value and the specified value serving as a value to which the set value is to be converted is assigned to the correction function, it is possible to obtain the change amount of the state value in an ideal case. Accordingly, when the state value is corrected, herein, subtracted using this change amount as the correction amount, it is possible to obtain an ideal state value that is predicted to be obtained in a case where the set value is the specified value.

Figure 3:
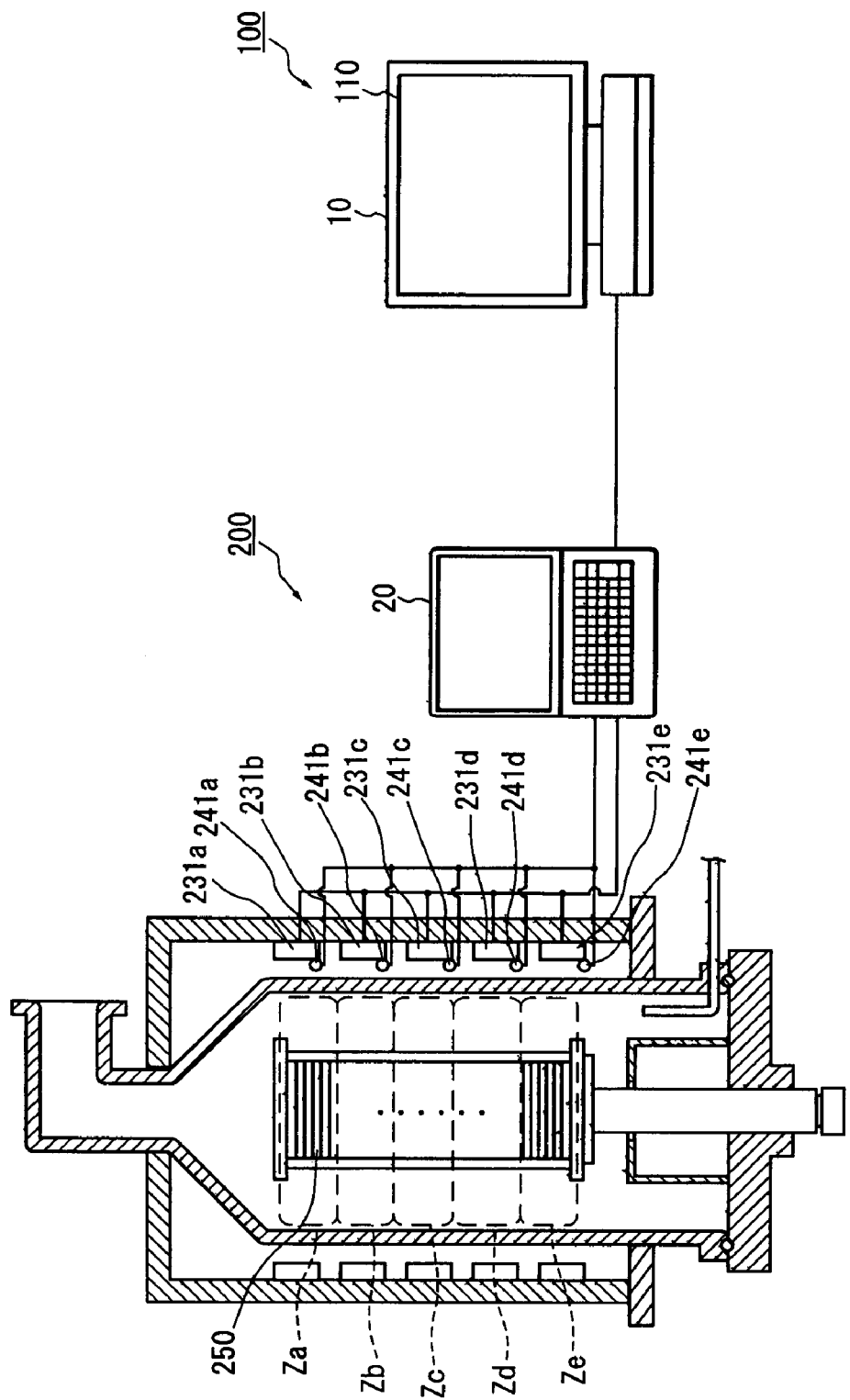
FIG. 3 is a conceptual diagram of the semiconductor manufacturing system.

Hereinafter, the specific operation of the semiconductor manufacturing system in this embodiment is described. FIG. 3 shows a conceptual diagram of the semiconductor manufacturing system. Herein, it is assumed that the information processing apparatus 100 is implemented by a computer 10, for example. Furthermore, it is herein assumed that the treatment set value receiving portion 201, the control portion 202, the treatment state value acquiring portion 203, and the treatment output portion 204 in the semiconductor manufacturing apparatus 200 are implemented by a computer 20 for control, which is a part of the semiconductor manufacturing apparatus 200, for example. It should be noted that the set value and the state value used herein are values prepared for explanation, and are different from an actual set value or a state value obtained when performing a treatment according to the set value.

Herein, for example, it is assumed that the semiconductor manufacturing apparatus 200 is a heat treatment apparatus, and that the area in which semiconductor wafers are arranged inside the semiconductor manufacturing apparatus 200 is divided into five zones Za to Ze arranged in the vertical direction. The treatment temperature can be set for the semiconductor wafers in each of the five zones Za to Ze inside the treatment vessel 211 in the semiconductor manufacturing apparatus 200, and the state value receiving portion 102 receives five state values corresponding to the temperatures respectively detected by the five temperature detecting portions 241a to 241e.

Herein, two groups of different set values of temperature are prepared for the semiconductor wafers in the five zones Za to Ze. Of the set values in two groups, the set values in the first group (hereinafter, referred to as "first set values") are taken as (700, 695, 695, 705, 710), and the set values in the second group (hereinafter, referred to as "second set values") are taken as (600, 605, 600, 610, 610). The first set values indicate that the temperature of the semiconductor wafers in the zone Za is set to 700° C., that in the zone Zb is set to 695° C., that in the zone Zc is set to 695° C., that in the zone Zd is set to 705° C., and that in the zone Ze is set to 710° C. The second set values indicate that the temperatures are set in a similar manner. After the temperature of the semiconductor wafers in the respective zones is set using the first set values, the semiconductor manufacturing apparatus 200 performs a predetermined treatment on the semiconductor wafers repeatedly on a batch-to-batch basis. Then, the state value receiving portion 102 acquires respective average values per batch of the five state values corresponding to the temperatures respectively detected by the temperature detecting portions 241a to 241e in a period during which the treatment temperature is stable.

Herein, first, a correction function is prepared. More specifically, set values for setting the correction function, for example, set values $(Sp_1, Sp_2, Sp_3, Sp_4, Sp_5)$ of the treatment temperature on the semiconductor wafers in the five zones are prepared. Then, using the values as the set values for the zones Za to Ze, the semiconductor manufacturing apparatus 200 is caused to perform a heat treatment. During the heat treatment, based on the temperatures sequentially detected respectively by the temperature detecting portions 241a to 241e in the semiconductor manufacturing apparatus 200, the treatment state value acquiring portion 203 sequentially acquires treatment temperature values at the respective positions of the temperature detecting portions 241a to 241e, and calculates average values of the treatment temperatures at the positions. The average values of the treatment temperatures at the respective five positions are obtained as initial state values $T_0$ described above. Herein, the initial state values $T_0=(T_{01}, T_{02}, T_{03}, T_{04}, T_{05})$, for example.

Next, the set values for setting the correction function are changed into $(Sp_{1+1}, Sp_2, Sp_3, Sp_4, Sp_5)$, and average values $T_1=(T_{11}, T_{12}, T_{13}, T_{14}, T_{15})$ per batch of the treatment temperature at the respective positions of the five temperature detecting portions 241a to 241e are acquired in a similar manner.

In a similar manner, the set values for setting the correction function are changed into $(Sp_1, Sp_{2+1}, Sp_3, Sp_4, Sp_5)$, and average values $T_2=(T_{21}, T_{22}, T_{23}, T_{24}, T_{25})$ of the treatment temperature are acquired. The set values for setting the correction function are changed into $(Sp_1, Sp_2, Sp_{3+1}, Sp_4, Sp_5)$, and average values $T_3=(T_{31}, T_{32}, T_{33}, T_{34}, T_{35})$ of the treatment temperature are acquired. The set values for setting the correction function are changed into $(Sp_1, Sp_2, Sp_3, Sp_{4+1}, Sp_5)$, and average values $T_4=(T_{41}, T_{42}, T_{43}, T_{44}, T_{45})$ of the treatment temperature are acquired. The set values for setting the correction function are changed into $(Sp_1, Sp_2, Sp_3, Sp_4, Sp_{5+1})$, and average values $T_5=(T_{51}, T_{52}, T_{53}, T_{54}, T_{55})$ of the treatment temperature are acquired.

Then, $T_1-T_0=(a_{11}, a_{21}, a_{31}, a_{41}, a_{51})$, $T_2-T_0=(a_{12}, a_{22}, a_{32}, a_{42}, a_{52})$, $T_3-T_0=(a_{13}, a_{23}, a_{33}, a_{43}, a_{53})$, $T_4-T_0=(a_{14}, a_{24}, a_{34}, a_{44}, a_{54})$, $T_5-T_0=(a_{15}, a_{25}, a_{35}, a_{45}, a_{55})$ are calculated, and a matrix A having the calculation results as the columns is obtained. The matrix A is as below.

$$A = \begin{pmatrix} a_{11} & a_{12} & a_{13} & a_{14} & a_{15} \\ a_{21} & a_{22} & a_{23} & a_{24} & a_{25} \\ a_{31} & a_{32} & a_{33} & a_{34} & a_{35} \\ a_{41} & a_{42} & a_{43} & a_{44} & a_{45} \\ a_{51} & a_{52} & a_{53} & a_{54} & a_{55} \end{pmatrix}$$

Then, the following correction function having the matrix A as a coefficient is defined.

$$\Delta Q = A(X \cdot x)$$

$$= \begin{pmatrix} \Delta Q_1 \\ \Delta Q_2 \\ \Delta Q_3 \\ \Delta Q_4 \\ \Delta Q_5 \end{pmatrix}$$

$$= \begin{pmatrix} a_{11} & a_{12} & a_{13} & a_{14} & a_{15} \\ a_{21} & a_{22} & a_{23} & a_{24} & a_{25} \\ a_{31} & a_{32} & a_{33} & a_{34} & a_{35} \\ a_{41} & a_{42} & a_{43} & a_{44} & a_{45} \\ a_{51} & a_{52} & a_{53} & a_{54} & a_{55} \end{pmatrix} \begin{pmatrix} X_1 - x_1 \\ X_2 - x_2 \\ X_3 - x_3 \\ X_4 - x_4 \\ X_5 - x_5 \end{pmatrix}$$

In this correction function, $X=(X_1, X_2, X_3, X_4, X_5)$ represents set values of the temperature when a treatment is actually performed, $x=(x_1, x_2, x_3, x_4, x_5)$ represents specified values for specifying values into which the set values X are to be converted, and $\Delta Q=(\Delta Q_1, \Delta Q_2, \Delta Q_3, \Delta Q_4, \Delta Q_5)$ represents correction amounts.

Next, the first set values are set in the semiconductor manufacturing apparatus 200, and a heat treatment is performed.

During this heat treatment, based on the temperatures sequentially detected respectively by the temperature detecting portions 241a to 241e in the semiconductor manufacturing apparatus 200, the treatment state value acquiring portion 203 sequentially acquires treatment temperature values at the respective positions of the temperature detecting portions 241a to 241e, and calculates average values per batch of the treatment temperatures at the positions. The semiconductor manufacturing apparatus 200 outputs the first set values to the information processing apparatus 100. Furthermore, in the semiconductor manufacturing apparatus 200, the treatment output portion 204 outputs the average values of the treatment temperatures at the five respective positions detected with the temperature detecting portions 241a to 241e, to the state value receiving portion 102. This process is repeated for multiple batches.

The set value receiving portion 101 receives set values the from the semiconductor manufacturing apparatus 200.

Figure 4:
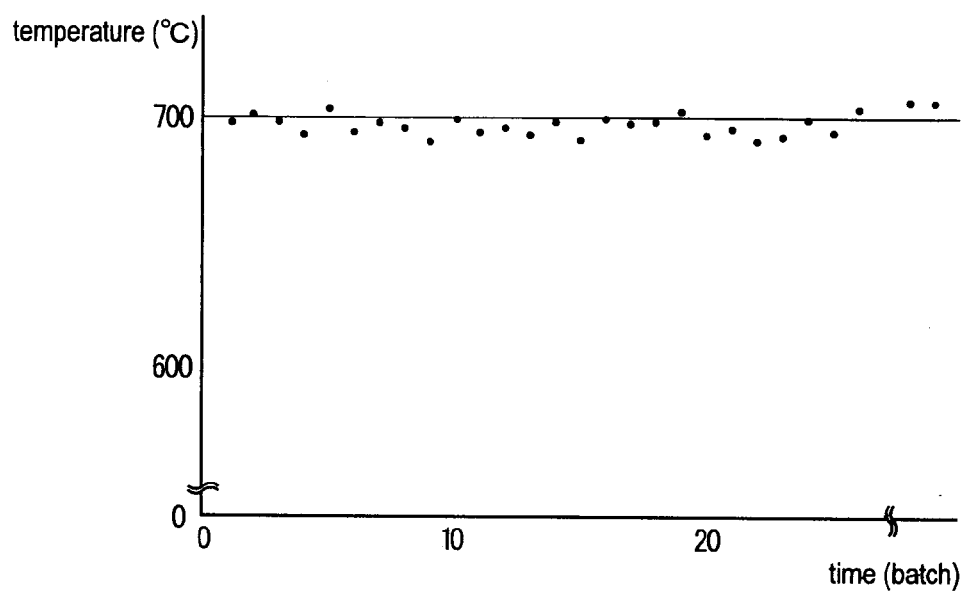
FIG. 4 is a graph showing state values received by the information processing apparatus.

The state value receiving portion 102 receives the average values per batch of treatment temperature values at the positions of the temperature detecting portions 241a to 241e. The state value receiving portion 102 temporarily stores the acquired average values in a memory or the like. The average values are state values. FIG. 4 shows the average values as a graph. In FIG. 4, the horizontal axis represents the time, herein, the number of batches, and the vertical axis represents the average value of the temperatures detected by the temperature detecting portion 241a. For the sake of convenience, this specification describes only treatment temperature values detected by the one temperature detecting portion 241a, but the state value receiving portion 102 actually acquires five treatment temperature values for one batch.

Next, using the above-described correction function, the correction amounts are calculated. More specifically, the correction amounts $\Delta Q$ are obtained by assigning values to X and x in the above-described correction function. As the set value X, the first set values are assigned. As the specified values x, in particular herein, the second set values are assigned. The thus obtained correction amounts $\Delta Q$ are (90, 88, 91, 94, 94).

The thus obtained correction amounts $\Delta Q$ are the change amounts, that is, the differences between the ideal treatment temperatures that are detected by the temperature detecting portions 241 and that are predicted to be obtained in a case where a heat treatment is performed using the first set values, and the ideal treatment temperatures that are detected by the temperature detecting portions 241 and that are predicted to be obtained in a case where a heat treatment is performed using the second set values. When converting the set values from the first set values to the second set values, it is possible to obtain the treatment temperatures that are predicted to be obtained in a case where a heat treatment is performed using the second set values, by correcting the treatment temperature values obtained using the first set values, with the correction amounts $\Delta Q$.

The state value receiving portion 102 reads out, for each batch, state values that are average values of the treatment temperature values detected by the temperature detecting portions 241a to 241e. The correcting portion 104 subtracts the correction amounts $\Delta Q$ from the state values, and temporarily stores the obtained values in a memory or the like. This process is repeated for all batches. For example, the correcting portion 104 subtracts $\Delta Q_1$=90 (degrees) from each of state values that are average values of the treatment temperature values detected by the temperature detecting portion 241a.

Next, the second set values are set in the semiconductor manufacturing apparatus 200, and a heat treatment is performed. During this heat treatment, based on the temperatures sequentially detected respectively by the temperature detecting portions 241a to 241e in the semiconductor manufacturing apparatus 200, the treatment state value acquiring portion 203 sequentially acquires treatment temperature values at the respective positions of the temperature detecting portions 241a to 241e, and calculates average values per batch of the treatment temperatures at the positions. State values that are the average values of the treatment temperatures at the five respective positions are output by the treatment output portion 204 to the state value receiving portion 102. This process is repeated for multiple batches.

The state value receiving portion 102 acquires the state values for each bath. The acquired state values are temporarily stored in a memory or the like. Herein, the state values obtained using the first set values are to be corrected into the state values that are predicted to be obtained in a case where a treatment is performed using the second set values, so that, the state values acquired using the second set values are not to be corrected.

The output portion 105 displays the results of correction performed by the correcting portion 104 on the treatment temperature obtained in a case where a heat treatment is performed using the first set values, and the treatment temperature obtained in a case where a heat treatment is performed using the second set values, for example, in the form of a graph, on a display screen 110.

Figure 5:
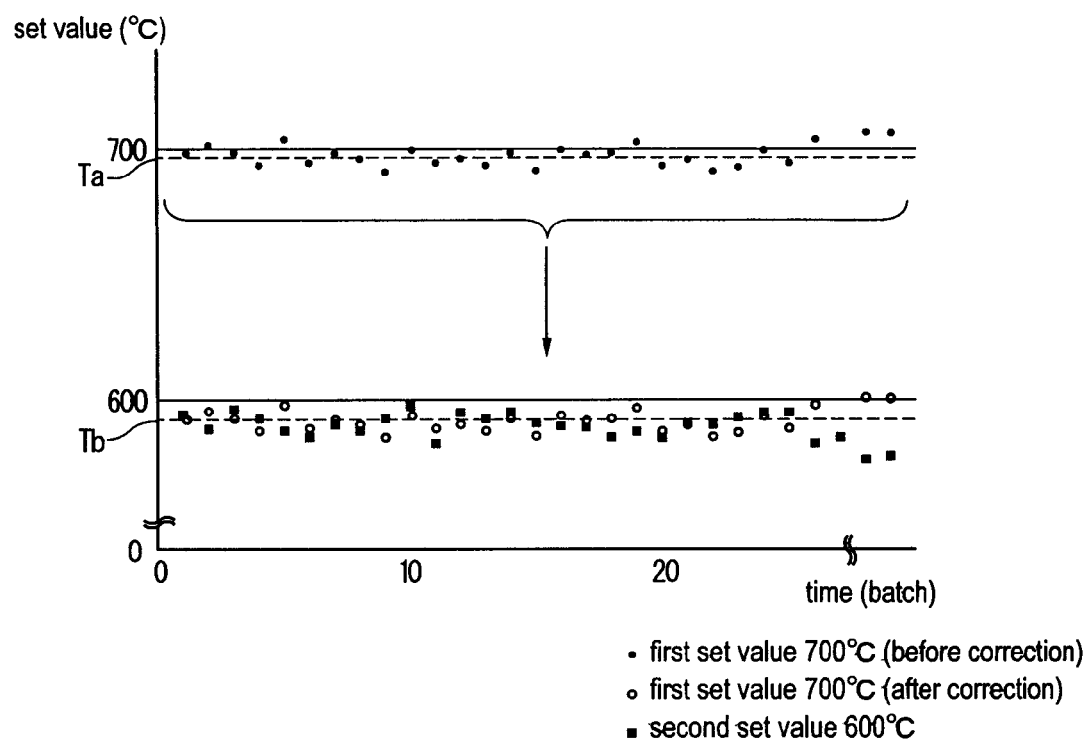
FIG. 5 is a graph showing a display example of the information processing apparatus.

FIG. 5 shows a display example of the output portion 105, and is a graph showing the results of correction performed by the correcting portion 104 on state values of the treatment temperature obtained in a case where a heat treatment is performed using the first set values, and the treatment temperature obtained in a case where a heat treatment is performed using the second set values. In FIG. 5, the horizontal axis represents time, herein, the number of batches, and the vertical axis represents the average value of the temperatures detected by the temperature detecting portion 241a. For the sake of convenience, this specification describes only treatment temperature values detected by the temperature detecting portion 241a and values obtained by correcting the treatment temperatures, but there are actually five treatment temperature values for one batch. The correcting portion 104 corrects treatment temperature values obtained in a case where a heat treatment is performed using the first set values, into the treatment temperature that is predicted to be obtained in a case where a heat treatment is performed using the second set values, but treatment temperature values obtained in a case where a heat treatment is performed using the second set values are not corrected, because the set values are the second set value in the first place.

For example, as in a case where the temperature is controlled at a predetermined position inside the semiconductor manufacturing apparatus 200 using the temperature estimated based on a temperature model as described in JP 2002-25997A, if the position at which control is performed according to the set value inside the semiconductor manufacturing apparatus 200 is different from the position at which the temperature is detected by the temperature detecting portion 241a, then typically, the set value and the temperature detected by the temperature detecting portion 241a are not the same temperature, even if ideal control is performed. Therefore, as shown in FIG. 5, when a temperature value that is predicted to be detected by the temperature detecting portion 241a in an ideal state in a case where the temperature at the control target position inside the semiconductor manufacturing apparatus 200 is controlled, using the first set value, to match the temperature set by the set value is taken as Ta, a state value that is a temperature value actually detected by the temperature detecting portion 241a during a heat treatment performed using the first set value seems to be in the vicinity of the temperature Ta, taking the temperature Ta as standard. Furthermore, when a temperature value that is predicted to be detected by the temperature detecting portion 241a in an ideal state in a case where the temperature at the control target position inside the semiconductor manufacturing apparatus 200 is controlled, using the second set value, to match the temperature set by the set value is taken as Tb, a state value that is a temperature value actually detected by the temperature detecting portion 241a during a heat treatment performed using the second set value seems to be in the vicinity of the temperature Tb, taking the temperature Tb as standard. Thus, it is possible to judge whether or not the semiconductor manufacturing apparatus 200 is properly operating, by checking the difference between the measured treatment temperature (state values), and Ta and Tb. It should be noted that in FIG. 5, the values Ta, Tb are shown for the sake of convenience, and it is not possible to judge actual values in FIG. 5.

The above-described correction function can be regarded as a function defining the relationship between the change amount of the set value and the change amount of the state value predicted based on the set value, herein, the change amount of a temperature value detected by the temperature detecting portions 241. Thus, the correction amount calculated using the correction function, based on the difference between the first set value and the second set value, corresponds to the value of Ta-Tb shown in FIG. 5. Thus, when the correcting portion 104 performs correction by the correction amount obtained using the correction function, the temperature value detected by the temperature detecting portion 241a during a heat treatment performed using the first set value is corrected such that the temperature Ta is superimposed on the temperature Tb. More specifically, the state values that are treatment temperature values obtained when a heat treatment is performed using two set values, that is, the first set value and the second set value are corrected such that the temperatures Ta and Tb serving as their distribution standards are superimposed. The temperatures Ta and Tb can be used, for example, as standard temperatures when judging whether or not the semiconductor manufacturing apparatus 200 is properly operating. Thus, when the measurement results of the treatment temperature are superimposed such that these standard values match each other, it is possible to judge, using the same standard, whether or not state values acquired in regard to treatments performed using different set values are normal. As a result, it is possible to monitor as appropriate actually measured values acquired in regard to treatments performed using different set values, that is, the measurement results of the treatment temperatures. Actually, the superimposed temperature Tb cannot be specified in this example, but when a value is significantly different from others in the superimposed measurement results of the treatment temperature, it is possible to judge that there is something wrong with a treatment corresponding to the value or that there is something wrong with the semiconductor manufacturing apparatus 200, for example.

Figure 6:
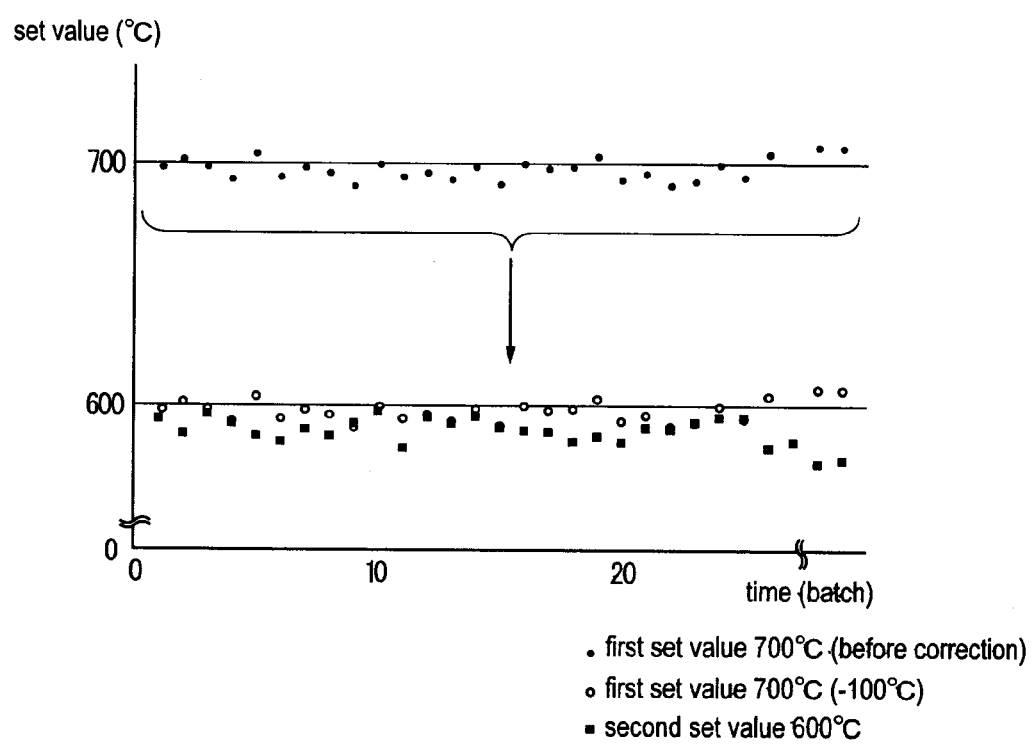
FIG. 6 is a graph showing a display example of the information processing apparatus.

Herein, for example, a process is conceivable in which the average value of treatment temperature values detected by the temperature detecting portions 241 during a treatment performed using the first set value is corrected such that the first set value and the second set value are superimposed. More specifically, since the difference between the first set value and the second set value for the first the zone Za is 100° C., in order to allow the first set value to match the second set value, 100° C. are subtracted from the first set value, and 100° C. are also subtracted from the average value of the treatment temperature values detected by the temperature detecting portions 241 during a treatment performed using the first set value. FIG. 6 shows a display example in a case where the correcting portion 104 performs this process.

However, both of the first set value and the second set value are different from the temperatures detected by the temperature detecting portions 241 in an ideal state, and thus temperature values detected by the temperature detecting portions 241 cannot be said to be distributed using the first set value or the second set value as standard. Therefore, even if the temperature values detected by the temperature detecting portions 241, that is, the state values are corrected such that the first set value and the second set value are superimposed, the state values obtained as a result of performing a heat treatment using the first set value and the second set value have not been corrected such that the standard temperatures in the respective distributions are superimposed. As a result, it is not possible to judge, using the same standard, whether or not state values that are the measurement results of the treatment temperature acquired in regard to treatments performed using different set values are normal. For example, a judgment standard, such as a threshold value, used for judging whether or not state value obtained using the second set value is proper cannot be used as a judgment standard for measurement results of the treatment temperature obtained using the first set value. Thus, it is necessary to individually judge, based on respective judgment standards, whether or not the measurement results of the treatment temperature obtained using the first set value and the measurement results of the treatment temperature obtained using the second set value are normal. Therefore, it is not possible to simultaneously monitor the measurement results of the treatment temperature acquired in regard to treatments performed using different set values.

Figure 8:
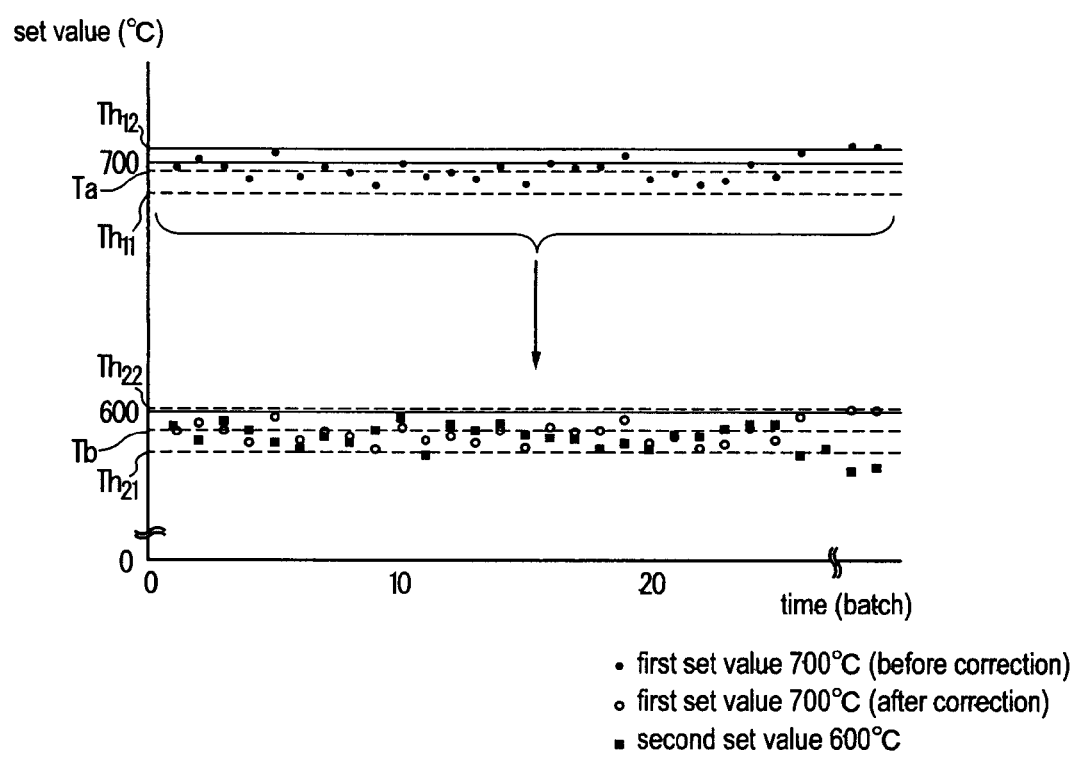
FIG. 8 is a graph showing a display example for illustrating the information processing apparatus.

For example, as shown in FIG. 8, in a case where state values obtained at the first set value 700° C. and state values obtained at the second set value 600° C. are superimposed as described above, the state values obtained from the first set value and the second state value are displayed in a significantly scattered manner although the state values are distributed in the vicinity of the temperatures that are considered to be ideal for the respective set values, and thus it is difficult to judge whether or not the state values are normal.

On the other hand, as shown in FIG. 5, in a case where correction as described in this embodiment is performed, state values obtained for different set values can be superimposed such that the temperatures that are considered to be ideal for the respective set values are superimposed. As a result, as long as the state values are close to normal values, all state values can be distributed in the vicinity of one value, and thus it is easy to judge whether or not the state values are normal.

As described above, according to this embodiment, the correction amount, which is the change amount of the state value that is predicted based on the change amount of the set value, is obtained using the correction function. Then, the state value is corrected using the correction amount. Thus, state values obtained according to various set values can be output after the state values are corrected such that ideal state values obtained in a case where the semiconductor manufacturing apparatus 200 is caused to perform a desired treatment using the respective set values are superimposed. Accordingly, for example, state values obtained according to different set values are displayed in a superimposed manner, and thus the control charts or the like can be integrated into one chart, so that the semiconductor manufacturing apparatus and the like can be easily monitored. Furthermore, the operation for managing the semiconductor manufacturing apparatus can be simplified, and thus the operation for monitoring the semiconductor manufacturing apparatus and the like can be easily performed. Furthermore, state values obtained according to different set values can be displayed in a superimposed manner, and thus the state values can be easily compared with each other.

Furthermore, in the foregoing embodiment, the coefficient of the correction function is determined based on the state values acquired in a case where the elements of the initial values are sequentially increased by the unit amount. However, in the present invention, steady-state gain of a transfer function of the semiconductor manufacturing apparatus 200 also may be used as the coefficient of the correction function. Steady-state gain of a transfer function refers to the ratio of change width of the output, with respect to change width of the input in the steady state. Such steady-state gain is necessary for controlling an apparatus, and is preset for an apparatus that is to be controlled, such as the semiconductor manufacturing apparatus 200 in this embodiment. Thus, the steady-state gain expressed as a matrix may be used instead of the coefficient A.

For example, when the steady-state gain is taken as $A_g$, the correction function can be expressed as below.

$$\Delta Q = A_g(X \cdot x)$$

When this correction function is used instead of the correction function, effects similar to those described above are achieved. Furthermore, when the steady-state gain of the semiconductor manufacturing apparatus 200 is used in this manner, the above-described operation of obtaining the coefficient of the correction function is not necessary. Thus, the correction function can be set without causing the semiconductor manufacturing apparatus 200 to perform a desired treatment, so that the correction function can be easily set.

Figure 7:
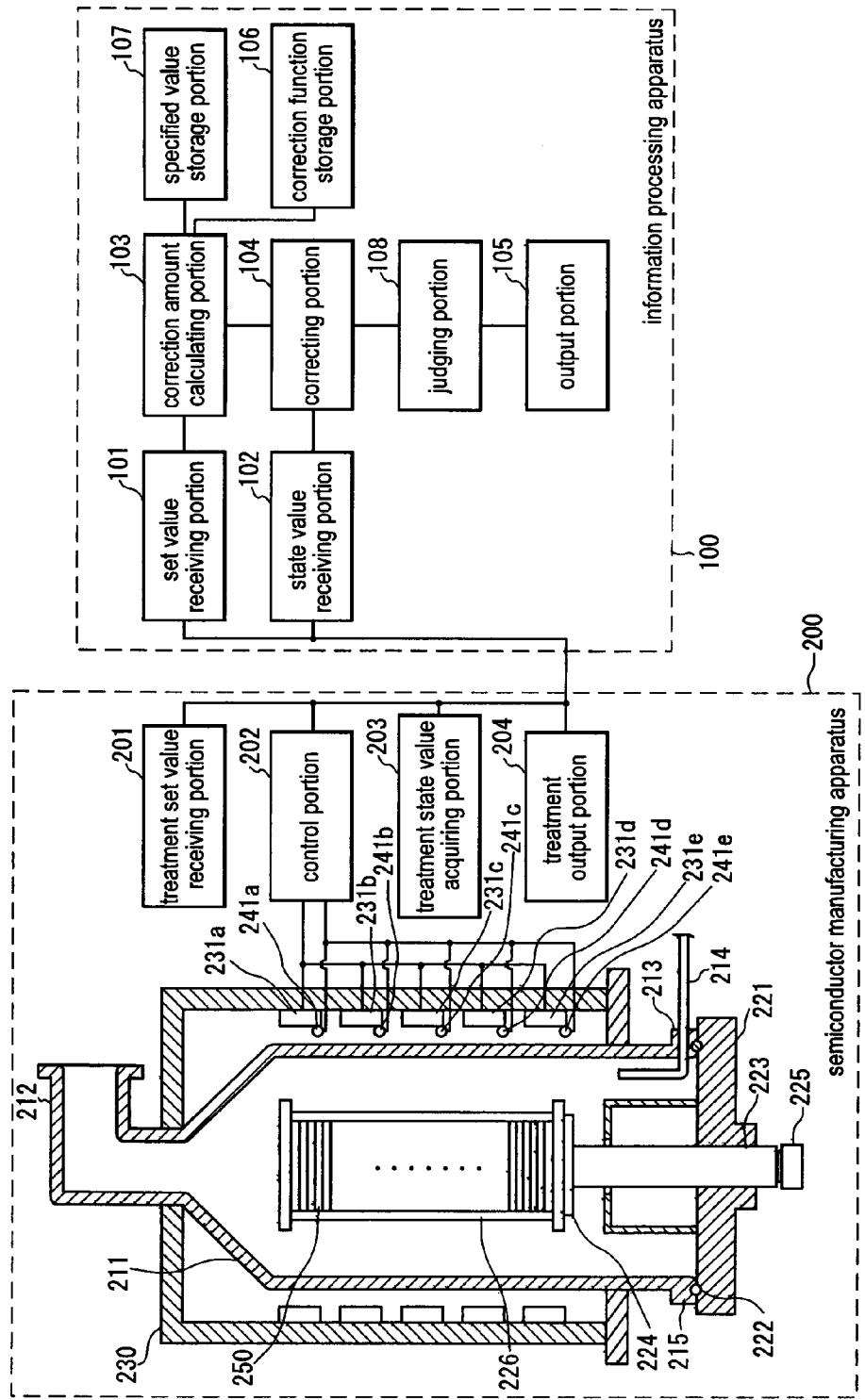
FIG. 7 is a diagram illustrating a modified example of the semiconductor manufacturing system.

Furthermore, in this embodiment, the configuration as shown in FIG. 7 also may be applied in which: a judging portion 108 is provided between the correcting portion 104 and the output portion 105; a preset threshold value and a value corrected by the correcting portion 104 are compared with each other at the judging portion 108; based on the comparison results, the judging portion 108 instructs the output portion 105 to output judgment results indicating whether or not there is something wrong with the semiconductor manufacturing apparatus 200 or its process; and in response to this instruction, the output portion 105 outputs, as appropriate, information indicating that there is something wrong with the semiconductor manufacturing apparatus 200 or its process. It should be noted that the number of such threshold values may be one or multiple. For example, the upper limit threshold value and the lower limit threshold value prescribing the range in which the semiconductor manufacturing apparatus is properly operating may be provided.

FIG. 8 shows a case in which the treatment temperatures that are the state values obtained during treatments performed using the first set value and the second set value described in the foregoing example are output without any processing such as correction by the correction amount obtained using the correction function.

In a case where as shown in FIG. 8, the treatment temperatures that are the state values are not superimposed without performing correction by the correction amount, for example, the lower limit threshold value and the upper limit threshold value for judging that the semiconductor manufacturing apparatus 200 is properly operating are respectively $Th_{11}$ and $Th_{12}$ for the treatment temperature corresponding to the first set value, and $Th_{21}$ and $Th_{22}$ for the treatment temperature corresponding to the second set value.

In this embodiment, in particular, the state values acquired during treatments performed using different set values are corrected by the correction amount obtained, using the correction function, such that the state values in an ideal state serving as the distribution standards of the respective values are superimposed. Typically, threshold values and the like are used for setting a boundary of values that are judged to be abnormal, using the state values in the most ideal state as standard. Thus, when the state values are corrected such that the standard values are superimposed, that is, when the state values are corrected such that Ta and Tb are superimposed, the threshold values used in the comparison can be used in common. Accordingly, the threshold values set for the state value acquired during a treatment performed using one set value can be used also for other set values.

Figure 9:
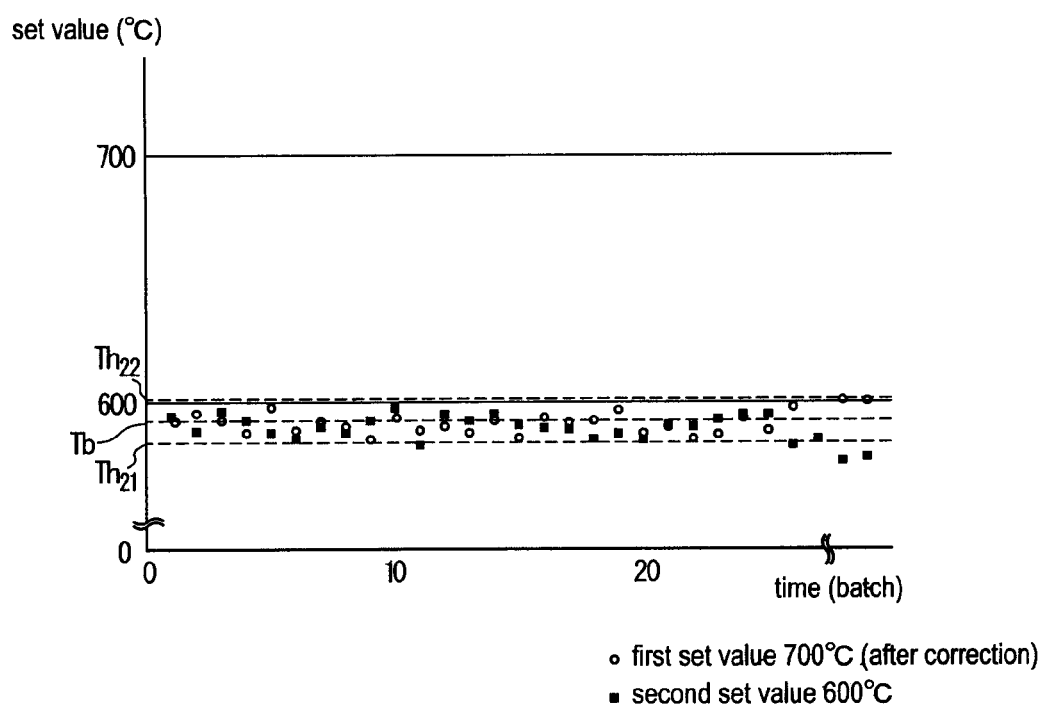
FIG. 9 is a graph showing a display example for illustrating the information processing apparatus.

For example, in a case where as shown in FIG. 9, the treatment temperatures that are the state values are superimposed by performing correction by the correction amount, if the threshold values $Th_{21}$ and $Th_{22}$ have been set, for the treatment temperature corresponding to the second set value, as the threshold values for judging that the semiconductor manufacturing apparatus 200 is properly operating, then the threshold values $Th_{21}$ and $Th_{22}$ can be used without any processing, also for values obtained when the correcting portion 104 corrects the treatment temperature corresponding to the first set value.

Thus, in this embodiment, the threshold values set for treatments performed using different set values can be used in common, and thus an effort and time for setting the threshold values can be reduced.

Furthermore, in the foregoing example, a case is described in which the set value is a set value for temperature and in which the state value is a temperature value detected by the temperature detecting portions. However, the present invention can be applied also to other set values or state values. For example, the present invention can be applied also to a case where the set value is a set value for temperature and where the state value is a power value of the heaters 231 acquired by the treatment state value acquiring portion 203.

Furthermore, in the foregoing example, a case is described in which the specified value that is to be assigned to the correction function is the second set value. However, the specified value also may be a value other than the second set value. In this case, it is necessary for the correcting portion 104 to correct also the state value obtained in a treatment performed using the second set value, by the correction amount obtained using the correction function.

Furthermore, in the foregoing example, a case is described in which temperature values detected by the temperature detecting portions 241 in treatments performed using two set values are superimposed. However, the present invention can be applied also to a case in which temperature values detected by the temperature detecting portions 241 in treatments performed using three or more set values are superimposed.

More specifically, it is possible to apply a configuration in which: the set value receiving portion 101 receives multiple set values; the state value receiving portion 102 receives multiple state values respectively corresponding to the multiple set values; the correction amount calculating portion 103 calculates multiple correction amounts respectively corresponding to the multiple state values, using the correction function; the correcting portion 104 corrects the multiple state values respectively corresponding to the multiple correction amount, by the multiple correction amounts calculated by the correction amount calculating portion 103; and the output portion 105 outputs the multiple state values corrected by the correcting portion.

Embodiment 2

Figure 10:
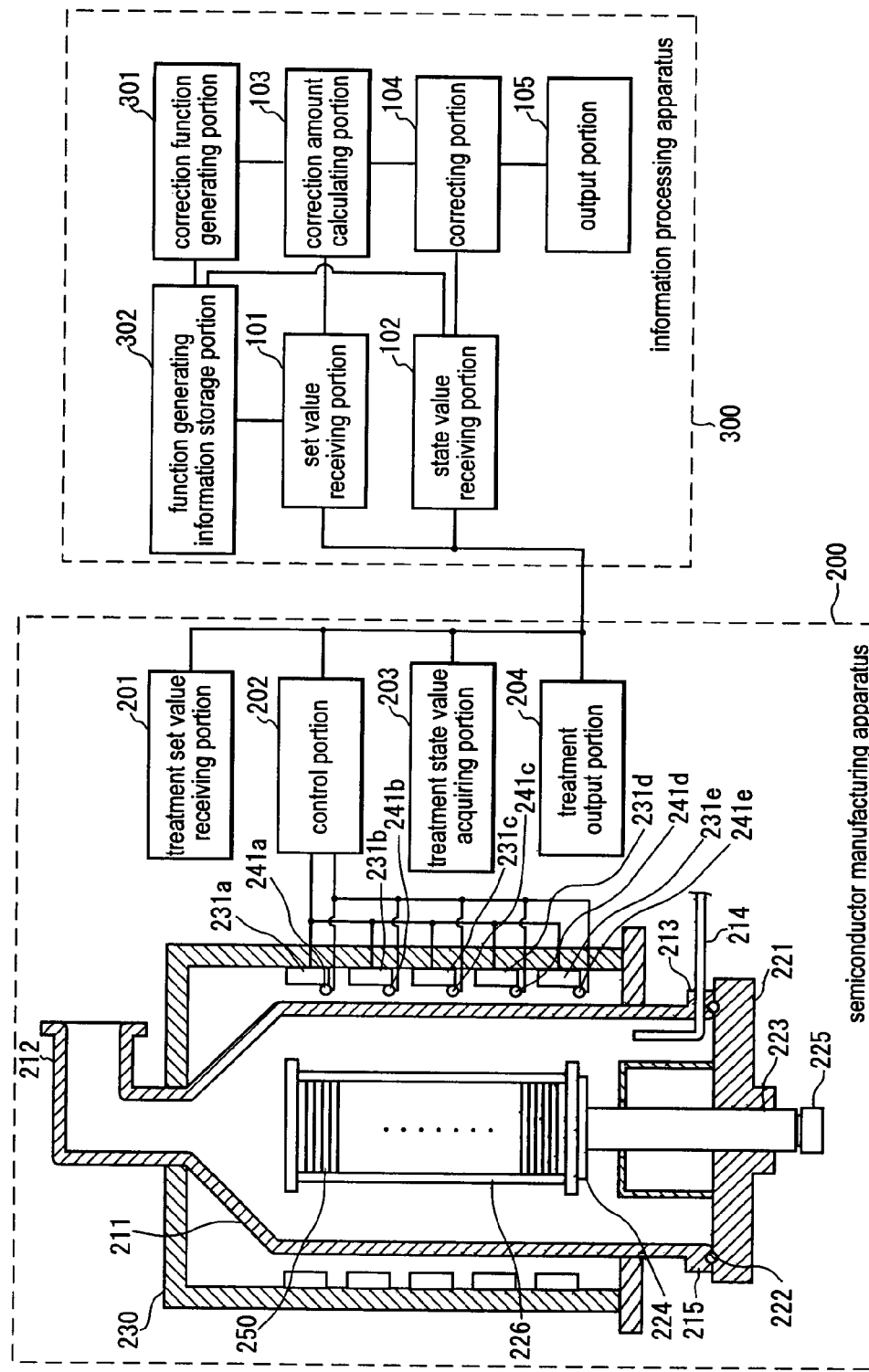
FIG. 10 is a diagram illustrating the configuration of a semiconductor manufacturing system in Embodiment 2.

FIG. 10 is a block diagram illustrating the configuration of a semiconductor manufacturing system in this embodiment. The semiconductor manufacturing system is provided with an information processing apparatus 300 and the semiconductor manufacturing apparatus 200.

The configuration of the semiconductor manufacturing apparatus 200 is as in Embodiment 1 above, and therefore a description thereof is omitted.

The information processing apparatus 300 is provided with the set value receiving portion 101, the state value receiving portion 102, the correction amount calculating portion 103, the correcting portion 104, the output portion 105, a correction function generating portion 301, and a function generating information storage portion 302.

The configuration of the set value receiving portion 101, the state value receiving portion 102, the correction amount calculating portion 103, the correcting portion 104, and the output portion 105 is as in Embodiment 1 above, and therefore a description thereof is omitted. However, in this embodiment, the correction amount calculating portion 103 calculates the correction amount corresponding to the set value received by the set value receiving portion 101, using a correction function that is generated by the correction function generating portion 301 and that indicates the relationship between the set value received by the set value receiving portion 101 and the correction amount, which is a state value predicted based on the set value.

The correction function generating portion 301 generates a correction function, using multiple groups of the set value and the state value corresponding to the set value. More specifically, the correction function is a function indicating the relationship between the set values and the correction amounts that are state values predicted based on the set values. The predicted state values specifically refer to state values that are predicted to be ideally acquired according to the set values. The correction function is a function obtained using multiple groups of the set value and the state value corresponding to the set value, more specifically, an approximation formula. The correction function generating portion 301 obtains a correction function that is an approximation formula indicating the relationship between the set values and the correction amounts, based on multiple groups of the set value and the state value corresponding to the set value. The approximation formula generated by the correction function generating portion 301 may be any approximation formula, such as an equation of rth degree (r is an integer of 1 or more), an exponential function, or a logarithmic function. Furthermore, the correction function generating portion 301 may use any algorithm and the like to generate the approximation formula. The process or configuration for generating the approximation formula and the like based on multiple groups of information is a known art, and therefore a description thereof is omitted. The multiple groups of the set value and the state value corresponding to the set value, the groups being used by the correction function generating portion 301 for generating the correction function, may be prepared for generating the correction function, or may be state values that are to be actually corrected by the correction amount and set values for obtaining the state values. Herein, a case is described in which the correction function generating portion 301 generates a correction function, using function generating information that is multiple groups of the set value and the state value corresponding to the set value stored in the function generating information storage portion 302. The correction function generating portion 301 can be typically implemented as an MPU or a memory, for example. Typically, the process procedure of the correction function generating portion 301 is implemented by software, and the software is stored in a storage medium such as a ROM. Note that the process procedure also may be implemented by hardware (dedicated circuit).

It should be noted that the configuration also may be applied in which: a correction function storage portion as in Embodiment 1 above is provided; correction functions set by the user and correction function generated by other apparatuses are accumulated in the correction function storage portion, instead of the correction function generated by the correction function generating portion 301; and the correction functions are read out and used by the correction amount calculating portion 103.

The multiple groups of the set value and the state value corresponding to the set value can be stored in the function generating information storage portion 302. The groups may be stored in advance, or the set values received by the set value receiving portion 101 and the state values acquired by the state value receiving portion 102 may be accumulated. Groups of the set value and the state value may be stored in the function generating information storage portion 302 before the correction amount calculating portion 103 performs the first process. Alternatively, groups of the set value received by the set value receiving portion 101 and the state value acquired by the state value receiving portion 102 may be sequentially added to the function generating information storage portion 302. In this case, each time the information is added, the correction function generating portion 301 may generate a correction function again and replace its previous correction function with this correction function. Typically, the function generating information storage portion 302 is preferably a non-volatile storage medium, but also can be implemented as a volatile storage medium.

Figure 11:
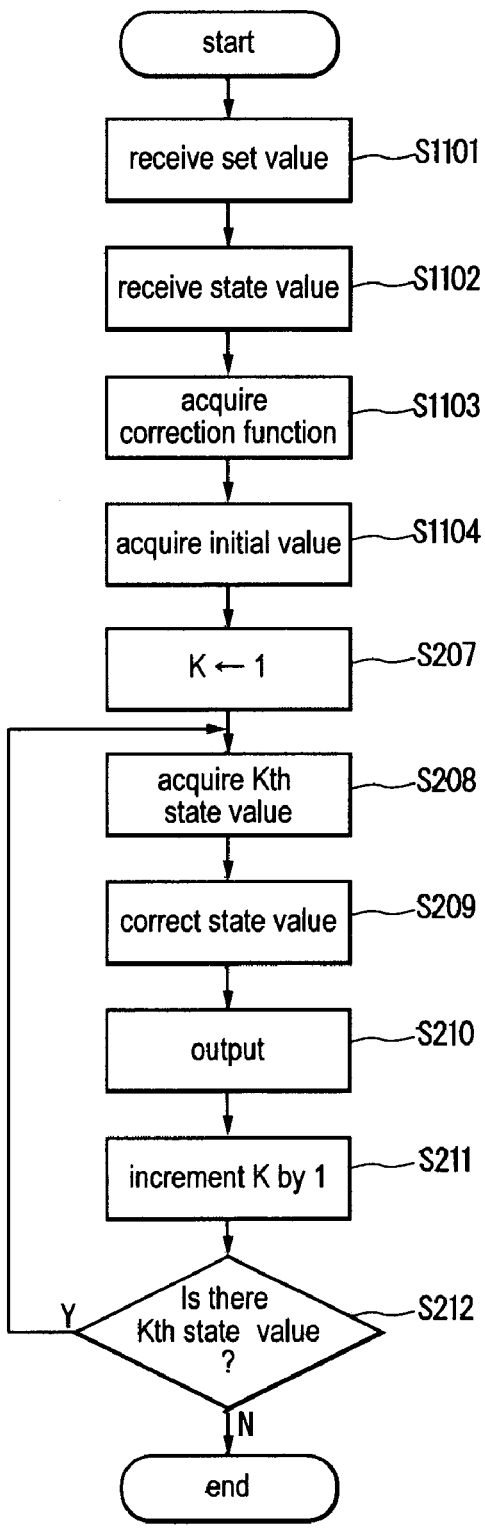
FIG. 11 is a flowchart illustrating the operation of an information processing apparatus in the semiconductor manufacturing system.

Next, the operation of the information processing apparatus 300 is described with reference to the flowchart in FIG. 11. In FIG. 11, the same reference numerals as in FIG. 2 indicate the same or corresponding step. Herein, for the sake of convenience, a case is described in which a set value set for performing a desired treatment, and multiple state values acquired at different times in a case where the semiconductor manufacturing apparatus 200 is caused to perform the desired treatment according to this set value, are output by the semiconductor manufacturing apparatus 200 or the like to the information processing apparatus 100. Herein, it is assumed that each of the multiple state values is associated with information of the time when that state value is acquired. Furthermore, herein, it is assumed that multiple groups of the set value and the state values acquired in a case where the semiconductor manufacturing apparatus 200 is caused to perform a desired treatment according to those set values are accumulated in advance in the function generating information storage portion 302, for example.

(step S1101) The set value receiving portion 101 receives a set value that is output by the semiconductor manufacturing apparatus 200 or the like. The received set value is accumulated in a storage medium such as a memory (not shown). It should be noted that the set value may be accumulated in the function generating information storage portion 302.

(step S1102) The state value receiving portion 102 receives multiple state values that are output by the semiconductor manufacturing apparatus 200 or the like. The received state values are accumulated in a storage medium such as a memory (not shown). It should be noted that the state values may be accumulated in the function generating information storage portion 302.

(step S1103) The correction function generating portion 301 reads out multiple groups of the set value and the state values corresponding to the set value from the function generating information storage portion 302, and generates a correction function. More specifically, an approximation formula between the set values and acquired values is generated.

(step S1104) The correction amount calculating portion 103 calculates a correction amount corresponding to the set value received in step S1101, by assigning the set value to the correction function generated in step S1103.

In the description above, a case is described in which a process such as correction is performed on state values obtained as a result of performing a treatment using one set value. However, in a case where a treatment is performed while changing the set value from batch to batch, for example, a process such as correction may be performed on state values respectively obtained for the different set values. For example, in a case where multiple set values can be received in step S1101 and where state values corresponding to the multiple set values can be received in step S1102, after the process has been performed on one set value following the above-described flowchart, it may be judged whether or not there is another set value. If there is another set value, then the procedure returns to, for example, step S207, where a process such as correction is repeatedly performed on a state value obtained for another set value as in the above-described flowchart.

In the flowchart in FIG. 11, the process is ended by turning off power or a processing-ending interruption.

Next, a method for acquiring the above-described correction function is described.

Figure 12:
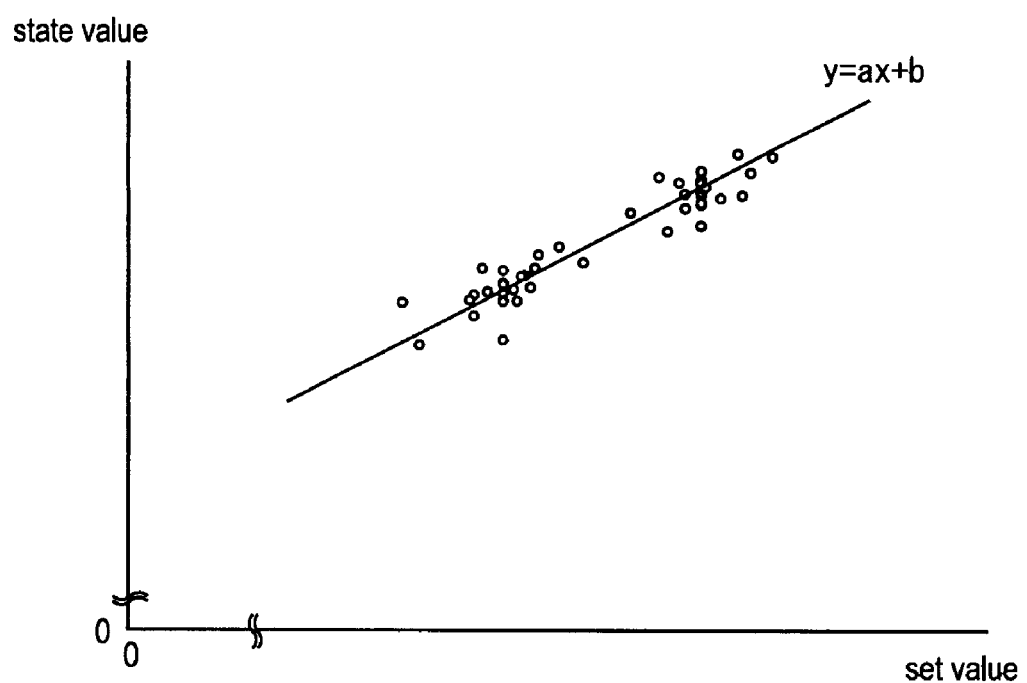
FIG. 12 is a graph illustrating the relationship between the set value and the state value received by the information processing apparatus.

First, the semiconductor manufacturing apparatus 200 is caused to perform a treatment for multiple times, for each of two or more set values. The obtained multiple state values are plotted on a graph in which the x-axis represents the set value and the y-axis represents the state value, as shown in FIG. 12. Herein, for the sake of convenience, a case is described in which one state value is acquired for one set value from the semiconductor manufacturing apparatus 200, that is, a case in which the set value and the state value are in the form of a 1×1 matrix. However, the set value and the state value may be in the form of a matrix each having multiple elements.

Next, the function y=f(x) is obtained based on the set value and the state value. Herein, it is assumed that the approximation formula is y=ax+b, for example. There is no limitation on the manner in which the approximation formula is obtained.

The thus obtained approximation formula can be regarded as a function indicating the relationship between the set value and the ideal state value. Therefore, a state value that is considered to be ideal for a set value can be obtained by assigning the set value to x in the approximation formula.

In this embodiment, the state value obtained from the semiconductor manufacturing apparatus 200 is expressed as a difference with respect to an ideal state value, by subtracting the value y from the state value, the state value being obtained as a result of performing a treatment with the semiconductor manufacturing apparatus 200 using a particular set value, and the value y being obtained by assigning a set value that is the same as the above-described set value to x in the approximation formula. With this process, state values obtained for different set values can be expressed as a difference with respect to an ideal state value predicted based on each set value, by using the approximation formula. As described in Embodiment 1, it is difficult to compare state values obtained based on different set values, because their set values and ideal state values obtained therefrom are different from each other. However, in this embodiment, state values obtained based on different set values are corrected into a difference with respect to an ideal state value for each set value, and thus it is possible to compare state values obtained based on different set values, using an ideal state value for each set value as standard.

Hereinafter, the specific operation of the semiconductor manufacturing system in this embodiment is described. The conceptual diagram of the semiconductor manufacturing system is the same as FIG. 3, except that the information processing apparatus 300 is implemented by the computer 10. Herein, for example, it is assumed that the semiconductor manufacturing apparatus 200 is a heat treatment apparatus. For the sake of convenience, a case is described in which the set temperature for the semiconductor wafers in the zone Za inside the semiconductor manufacturing apparatus 200 is taken as the set value and in which the output of the heater 231a is taken as the state value. It should be noted that the set value and the state value used herein are values prepared for explanation, and are different from an actual set value or a state value obtained when performing a treatment according to the set value. Herein, an example is described in which electric power values of the heater 231a that are obtained in a case where the temperature of a heat treatment is set to 600° C. and 700° C. are compared with each other. Furthermore, a case is described in which the state values that are to be corrected and the corresponding set value are used for generating a correction function. More specifically, a case is described in which the set values received by the set value receiving portion 101 and the state values received by the state value receiving portion 102 are accumulated in the function generating information storage portion 302.

First, the set value, herein, the set temperature is set to 600° C., and the semiconductor manufacturing apparatus 200 performs a heat treatment. The semiconductor manufacturing apparatus 200 outputs this set value to the set value receiving portion 101. The state value receiving portion 102 accumulates the set value in the function generating information storage portion 302. Furthermore, in the semiconductor manufacturing apparatus 200, the electric power of the heater 231a in a period during which the treatment temperature is stable is acquired by the treatment state value acquiring portion 203 at a predetermined timing, and the acquired electric power value is output by the treatment output portion 204 to the information processing apparatus 300. The state value receiving portion 102 in the information processing apparatus 300 temporarily accumulates the electric power value in a memory or the like (not shown), and calculates the average value for each batch. The acquired average value of the electric powers herein is a state value. The state value receiving portion 102 accumulates the state value in association with the set temperature, in the function generating information storage portion 302. This process is repeated for multiple batches.

Next, the set value is set to 700° C., and a heat treatment is performed for multiple batches in a similar manner. The acquired average value of the electric powers is accumulated in association with the set temperature, in the function generating information storage portion 302.

Figure 13:
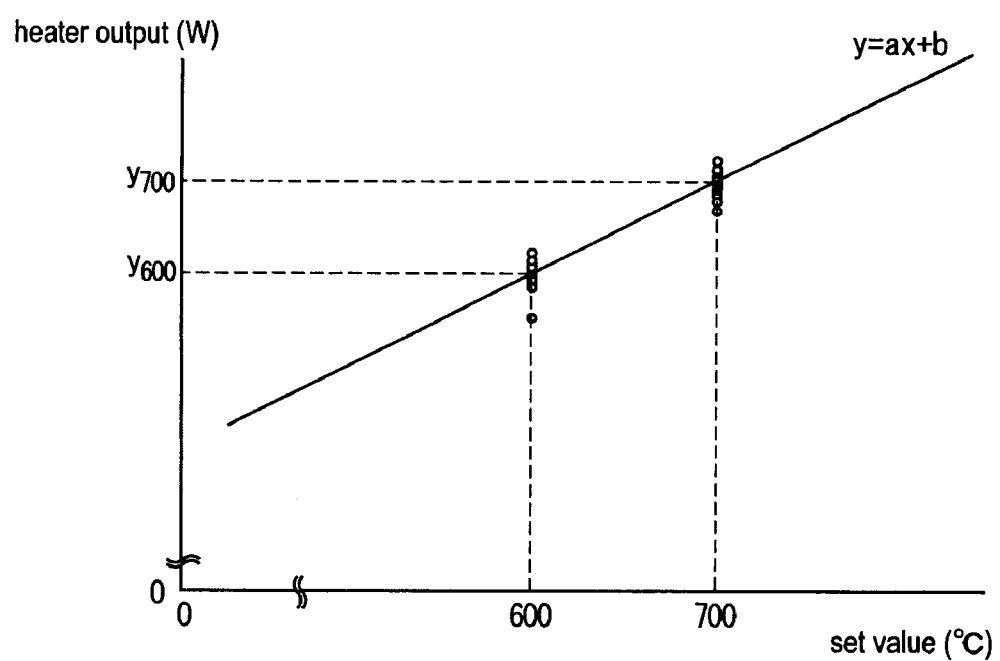
FIG. 13 is a graph showing a display example of the information processing apparatus.

FIG. 13 shows the power value of the heater 231a stored in the function generating information storage portion 302, as a graph in which the x-axis represents the processing time, herein, the number of batches, and the y-axis represents the power value (W) of the heater 231a.

Figure 14:
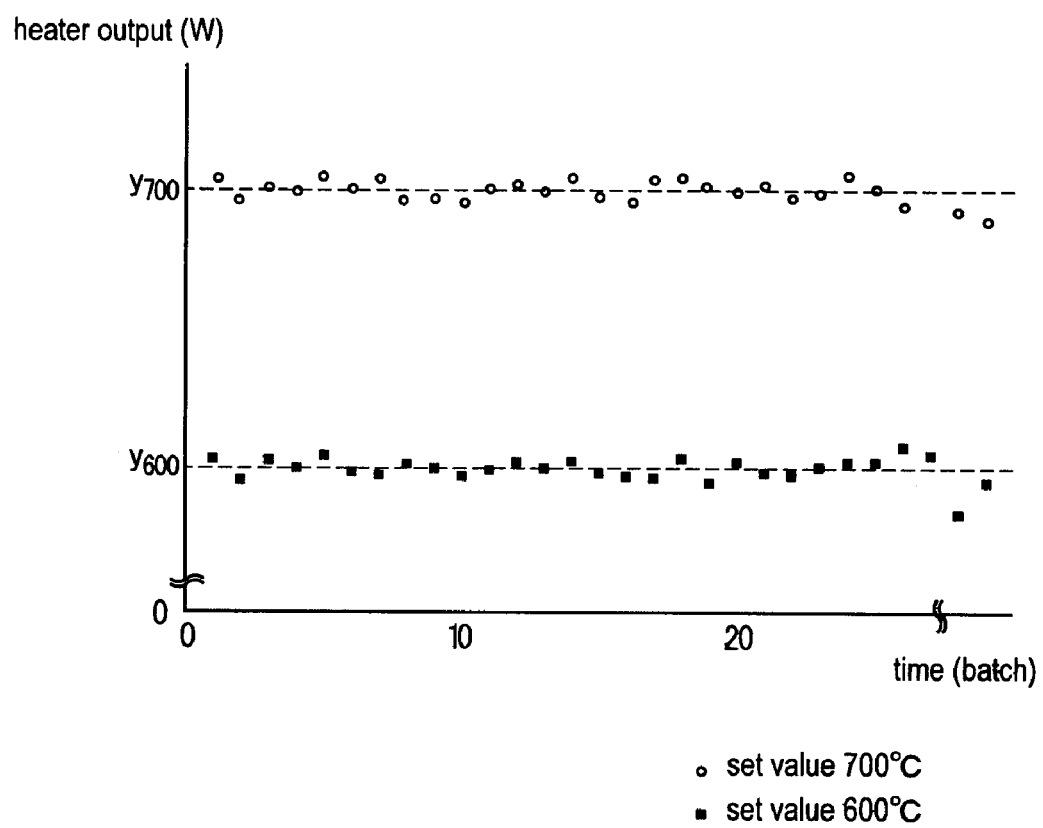
FIG. 14 is a graph illustrating the relationship between the set value of the temperature and the power value of heaters received by the information processing apparatus.

FIG. 14 shows the set temperature and the electric power of the heater 231a stored in the function generating information storage portion 302, as a graph in which the x-axis represents the set temperature and the y-axis represents the power value of the heater 231*a*.

Next, the correction function generating portion 301 calculates the approximation formula indicating the relationship between the set temperature and the electric power as shown in FIG. 14, using the set temperature and the electric power of the heater 231*a* stored in the function generating information storage portion 302. Herein, it is assumed that the obtained approximation formula is y=ax+b. The approximation formula is as shown in FIG. 13, for example.

Next, the correction amount calculating portion 103 obtains the correction amount y, by assigning the set value 600 to x in the approximation formula calculated by the correction function generating portion 301. This correction amount is taken as $y_{600}$.

The correcting portion 104 performs correction in which $y_{600}$ is subtracted from each electric power value that is accumulated in the function generating information storage portion 302 and that is obtained in a case where the set value is set to 600° C. The results of this subtraction is temporarily stored in a memory or the like (not shown).

In a similar manner, the correction amount calculating portion 103 acquires the correction amount $y_{700}$, by assigning the set value 700 to x in the approximation formula calculated by the correction function generating portion 301.

The correcting portion 104 performs correction in which $y_{700}$ is subtracted from each electric power value that is accumulated in the function generating information storage portion 302 and that is obtained in a case where the set value is set to 700° C. The results of this subtraction is temporarily stored in a memory or the like (not shown).

Figure 15:
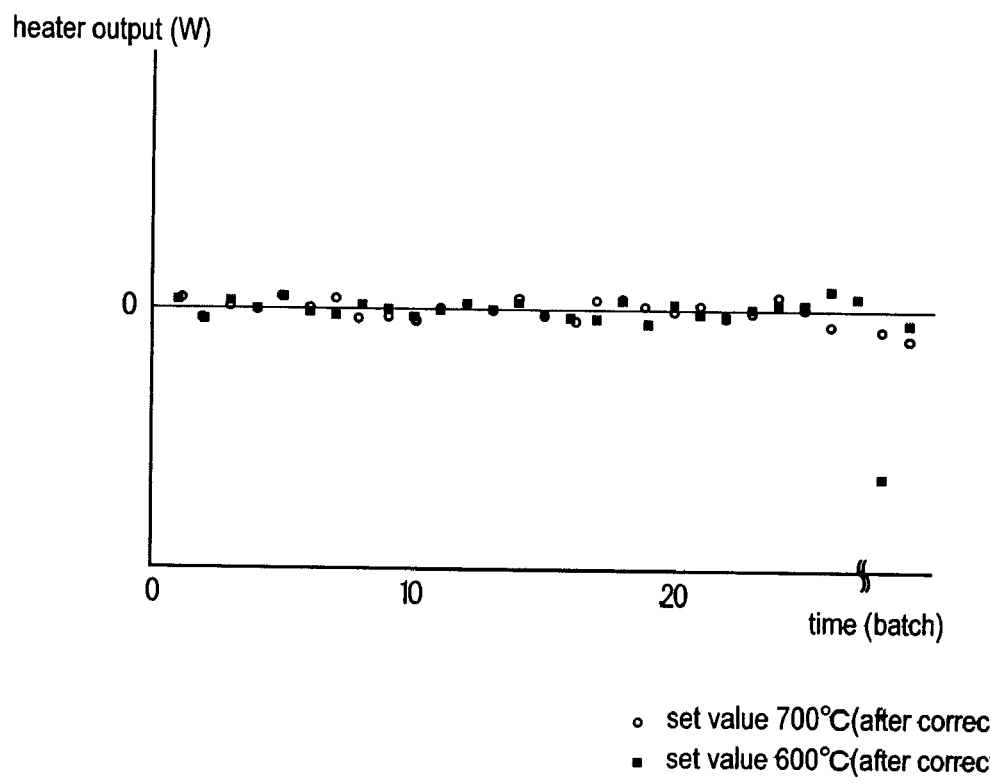
FIG. 15 is a graph showing a display example of the information processing apparatus.

The output portion 105 displays the results of the correction performed by the correcting portion 104, for example, in a graph as shown in FIG. 15. It should be noted that on the graph, the x-axis represents the processing time, and the y-axis represents the electric power of the heater 231*a*. Herein, y=0 corresponds to $y_{600}$ and $y_{700}$.

In this embodiment, first, the approximation formula is obtained based on the electric power values of the heater 231*a* obtained as a result of performing a heat treatment with the semiconductor manufacturing apparatus 200 at set temperatures of 600° C. and 700° C. Then, $y_{600}$ and $y_{700}$, which are the values of y obtained by assigning the set temperatures that are the same as the set temperatures, that is, 600° C. and 700° C., to x in the approximation formula are subtracted from the electric power values of the heater 231*a* obtained as a result of performing a heat treatment with the semiconductor manufacturing apparatus 200 at set temperatures of 600° C. and 700° C., and thus the electric power values of the heater 231*a* that are the state values obtained from the semiconductor manufacturing apparatus 200 are expressed as values corrected using ideal electric power values of the heater 231*a*. With this process, electric power values of the heater 231*a* obtained for different set temperatures can be expressed as a difference with respect to ideal electric power of the heater 231*a* for each set temperature. As a result, in this embodiment, electric power values obtained based on different set temperatures are corrected into a difference can be corrected into a difference with respect to ideal electric power of the heater 231*a* for each set temperature, and thus it is possible to compare power values obtained based on different set temperatures, using an ideal electric power for each set temperature as standard.

Instead of using the correction function generated by the correction function generating portion 301 based on the state values as described above, it is also possible to use a correction function that has been generated in advance using a similar method as described above, base on results of a heat treatment performed by the semiconductor manufacturing apparatus 200 using two or more set temperatures.

As described above, according to this embodiment, the correction amounts that are state values predicted based on the set values are obtained using the correction function, and the state values are corrected, using the correction amounts. Thus, state values obtained according to various set values can be output after the state values are corrected into a difference with respect to each ideal state value. Accordingly, for example, state values obtained according to different set values are displayed in a superimposed manner, and thus the control charts or the like can be integrated into one chart, so that the semiconductor manufacturing apparatus 200 and the like can be easily monitored. Furthermore, the operation for managing the semiconductor manufacturing apparatus 200 can be simplified, and thus the operation for monitoring the semiconductor manufacturing apparatus 200 and the like can be easily performed. Furthermore, state values obtained according to different set values can be displayed in a superimposed manner, and thus the state values can be easily compared with each other.

Furthermore, in this embodiment, the configuration as shown in FIG. 7 in Embodiment 1 also may be applied in which: the judging portion 108 is provided between the correcting portion 104 and the output portion 105; a preset threshold value and a value corrected by the correcting portion 104 are compared with each other at the judging portion 108; based on the comparison results, the judging portion 108 instructs the output portion 105 to output judgment results indicating whether or not there is something wrong with the semiconductor manufacturing apparatus 200 or its process; and in response to this instruction, the output portion 105 outputs, as appropriate, information indicating that there is something wrong with the semiconductor manufacturing apparatus 200 or its process. It should be noted that the number of such threshold values may be one or multiple. For example, the upper limit threshold value and the lower limit threshold value prescribing the range in which the semiconductor manufacturing apparatus is properly operating may be provided.

In this case, as described in Embodiment 1, threshold values set for different set values can be used in common. Accordingly, the threshold values set for the state value acquired during a treatment performed using one set value can be used also for other set values. Thus, in this embodiment, the threshold values set for treatments performed using different set values can be used in common, and thus an effort and time for setting the threshold values can be reduced.

Furthermore, in the foregoing example, a case is described in which the set value is a set value for temperature and in which the state value is a electric power value of heaters. However, the present invention can be applied also to other set values or state values.

Furthermore, in the foregoing example, a case is described in which electric power values of heaters in treatments performed using two set values are superimposed. However, the present invention can be applied also to a case in which electric power values of heaters in treatments performed using three or more set values are superimposed.

Furthermore, in this embodiment, the state values may be corrected as in Embodiment 1, using, as the correction coefficient in Embodiment 1, the coefficient of the correction function generated using two or more set values and multiple state values obtained in a case where the semiconductor manufacturing apparatus is caused to perform a predetermined treatment for multiple times using each set value, for example, a of y=ax+b in the above-described case.

For example, in the foregoing example, the difference between 700° C. and 600° C. is 100° C., and thus the value 100×a taken as the correction amount may be subtracted from the electric power values that are state values obtained at the set value 700° C., so that the electric power values that are state values obtained at the set value 600° C. and the electric power values that are state values obtained at the set value 700° C. can be compared with each other.

Furthermore, in the foregoing embodiments, the information processing apparatus 100 or the information processing apparatus 300 may be used as a single apparatus by separating it from the semiconductor manufacturing apparatus 200.

Embodiment 3

Figure 16:
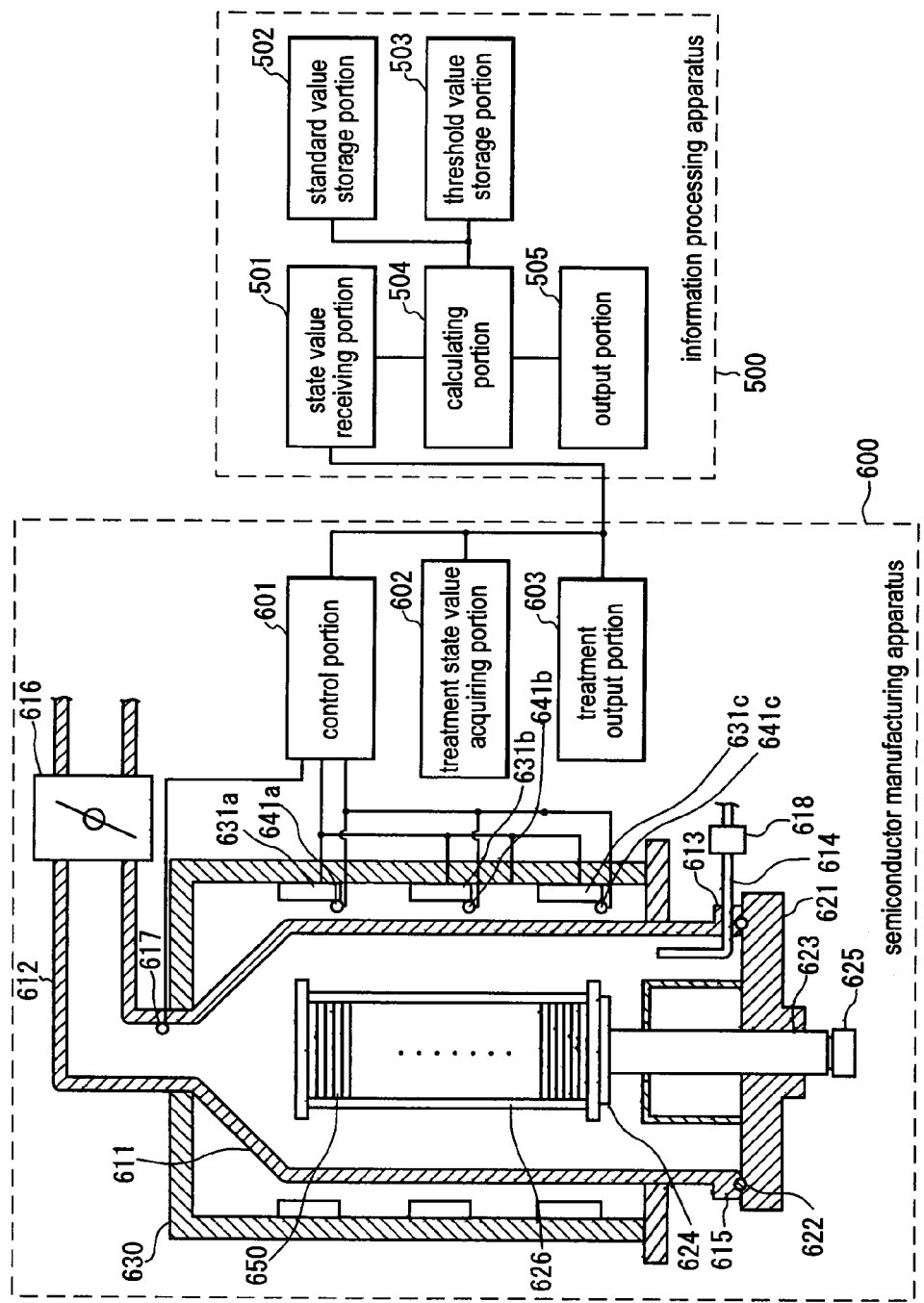
FIG. 16 is a diagram illustrating the configuration of a semiconductor manufacturing system in Embodiment 3.

FIG. 16 is a diagram illustrating the configuration of a semiconductor manufacturing system in this embodiment. The semiconductor manufacturing system is provided with an information processing apparatus 500 and a semiconductor manufacturing apparatus 600. The semiconductor manufacturing apparatus 600 performs treatments on a treatment target containing a semiconductor. Herein, an example is described in which the semiconductor manufacturing apparatus 600 is a heat treatment apparatus for performing treatments including a heat treatment and in which a treatment target is a semiconductor wafer. However, a treatment performed by the semiconductor manufacturing apparatus 600 on a treatment target containing a semiconductor may be any treatment. More specifically, the configuration of the present invention can be applied also to a case where the semiconductor manufacturing apparatus 600 is in a form other than a heat treatment apparatus, or a case where the treatment target is a material containing a semiconductor, other than a semiconductor wafer, such as a semiconductor chip. Herein, the information processing apparatus 500 and the semiconductor manufacturing apparatus 600 are connected to each other such that information can be exchanged, for example, via a network such as the Internet or LAN, or a dedicated signal line.

The information processing apparatus 500 is provided with a state value receiving portion 501, a standard value storage portion 502, a threshold value storage portion 503, a calculating portion 504, and an output portion 505.

The state value receiving portion 501 receives a state value, which is a value acquired in regard to a state during a treatment of the semiconductor manufacturing apparatus 600. The term "receive" refers to an operation of acquiring or receiving the input, for example. "State value" herein refers to a value acquired when the semiconductor manufacturing apparatus 600 is performing a desired treatment. "Value acquired in regard to a state during a treatment" may be any value, as long as it can be acquired and can indicate a state during a treatment of the semiconductor manufacturing apparatus 600. Specific examples thereof include a measured value that is acquired during a treatment, from the semiconductor manufacturing apparatus 600 itself or the internal environment of the semiconductor manufacturing apparatus 600, a calculated value that is calculated using this measured value, and a value that is internally controlled during a treatment by the semiconductor manufacturing apparatus 600. Furthermore, it is also possible to use a value obtained by statistically processing a measured value or the like. Examples of the state value include a measured value of the temperature inside the semiconductor manufacturing apparatus 600 during a treatment, more specifically, a value obtained by measuring the temperature at a desired position inside a treatment vessel 611 using a temperature sensor or the like, a value obtained by measuring the treatment pressure (air pressure) using a pressure detecting portion 617 or the like, a power value of a heater for heating the internal portion of the semiconductor manufacturing apparatus 600 measured by a wattmeter, and an average value, a maximum value, a minimum value, and a standard deviation of the measured values. Furthermore, the state value may be a power value of an internal heater calculated based on, for example, voltage or current supplied during a treatment from the semiconductor manufacturing apparatus to the heater. The state value received by the state value receiving portion 501 may be multiple state values in different measurement units. The measurement unit herein refers to, for example, the unit or zero point of the state value. Examples of the multiple state values in different measurement units include a measured value of the temperature inside the semiconductor manufacturing apparatus 600, a power value of a heater for heating the internal portion of the semiconductor manufacturing apparatus 600, and a measured value of the pressure (air pressure) inside the semiconductor manufacturing apparatus 600. There is no limitation on the manner in which the state value receiving portion 501 receives the state value. For example, the state value receiving portion 501 may receive the state value that transmitted from another device or the like via a communication line, or may read out the state value that is stored in a storage medium or the like. Furthermore, the state value receiving portion 501 may receive the state value that is input from an input unit such as a numeric keypad, a keyboard, a mouse, or a menu screen. The state value receiving portion 501 may cause the received state value to be accumulated in a memory or the like (not shown). The state value receiving portion 501 can be implemented by a device driver of an input unit such as a numeric keypad or a keyboard, control software for a menu screen, a driver of a communication device, or a driver of a device for reading out information from a storage medium, such as a memory card reader or a CD drive, for example.

A standard value, which is a value serving as standard for the state values, can be stored in the standard value storage portion 502. The value serving as standard for the state values may be any value, as long as it can be used as standard when the state values are compared with each other. Examples of the standard value include a targeted value, which serves as a target in control of the state values. The standard value may be a set value for setting a value that is used when the semiconductor manufacturing apparatus 600 is controlled and that serves as a target in control of the state value, an actually measured value of the state value obtained in a case where the semiconductor manufacturing apparatus 600 is properly controlled according to desired settings, or an average value of the actually measured values. Furthermore, the standard value may be an average value, a minimum value, or a maximum value of two or more state values obtained in a case where the semiconductor manufacturing apparatus 600 is caused to perform a desired treatment according to desired settings, for example.

The standard value storage portion 502 is preferably a non-volatile storage medium, but also can be implemented as a volatile storage medium.

A threshold value, which is a value used for judging whether or not the state value is a desired value, can be stored in the threshold value storage portion 503. "Desired value" is, for example, a value indicating that the semiconductor manufacturing apparatus 600 is properly operating or that there is something wrong therewith, or that a desired treatment has been properly performed by the semiconductor manufacturing apparatus 600 or that the desired treatment has not been properly performed. Specific examples of the threshold value include the upper limit value and the lower limit value indicating the range in which the state value is a desired value. Furthermore, the threshold value storage portion 503 may have a threshold value serving as the upper limit value and a threshold value serving as the lower limit value. Typically, the threshold values are respectively set for state values in different measurement units. Furthermore, the threshold values are set according to a treatment condition of a treatment performed by the semiconductor manufacturing apparatus 600. "Judgment whether or not the state value is a desired value" refers to, for example, judgment whether or not the state value is equal to or larger than the threshold value, judgment whether or not the state value is smaller than the threshold value, or judgment whether or not the state value is in a range defined by two threshold values. With this judgment, more specifically, it is possible to judge, based on the state value, whether or not the semiconductor manufacturing apparatus 600 is properly operating, or whether or not a desired treatment has been properly performed. The threshold value is set in advance according to the design of the semiconductor manufacturing apparatus 600, experiments or simulations using the semiconductor manufacturing apparatus 600, or the like, and is accumulated in the threshold value storage portion 503. In a case where threshold values serving as the upper limit value and the lower limit value are provided, typically, the standard value is set to be a value therebetween. The threshold value storage portion 503 is preferably a non-volatile storage medium, but also can be implemented as a volatile storage medium.

The calculating portion 504 calculates the ratio between a value relating to the difference between the state value received by the state value receiving portion 501 and the standard value, and a value relating to the difference between the threshold value and the standard value. Herein, the calculating portion 504 reads out the standard value from a standard value storage portion 502 and the threshold value from a threshold value storage portion 503 and uses these values as appropriate. "Value relating to the difference between the state value and the standard value" typically refers to the difference between the state value and the standard value, but also may be an absolute value of this difference. Furthermore, as long as the finally obtained value of the ratio does not change, the value relating to the difference between the state value and the standard value may be a value obtained by performing predetermined calculation, such as multiplication by a predetermined value, on the difference between the state value and the standard value. Furthermore, fine control also may be performed on the difference between the state value and the standard value, for example, by adding a predetermined value thereto, if necessary. "Value relating to the difference between the threshold value and the standard value" typically refers to the difference between the threshold value and the standard value, but also may be an absolute value of this difference. Furthermore, as long as the finally obtained value of the ratio does not change, the value relating to the difference between the threshold value and the standard value may be a value obtained by performing predetermined calculation, such as multiplication by a predetermined value, on the difference between the threshold value and the standard value. Furthermore, fine control also may be performed on the difference between the threshold value and the standard value, for example, by adding a predetermined value thereto, if necessary. If the state values received by the state value receiving portion 501 are multiple state values in different measurement units, then the calculating portion 504 calculates, for each of the multiple state values in different measurement units, the ratio between a value relating to the difference between the state value received by the state value receiving portion and a standard value corresponding to the state value, and a value relating to the difference between a threshold value corresponding to the state value and the standard value. When the ratio described herein is taken as R, the ratio R is specifically defined by the following equation.

$$R = \frac{(\text{state value} - \text{standard value})}{|\text{threshold value} - \text{standard value}|} \qquad \text{Equation 1}$$

It should be noted that this ratio also may be expressed in percentages or the like, if necessary. Furthermore, when the ratio R is always set to be a positive value, for example, when the magnitude of the ratio is to be obtained, Equation 2 below in which the absolute value of the denominator in Equation 1 is omitted may be used.

$$R = \frac{(\text{state value} - \text{standard value})}{|\text{threshold value} - \text{standard value}|} \qquad \text{Equation 2}$$

In a case where two threshold values are provided, for example, in a case where two threshold values for setting the upper limit value and the lower limit value for setting a desired range are provided, the calculating portion 504 acquires, from the threshold value storage portion 503, a threshold value that is a value in a subrange to which the state value belongs, of a possible range of the state value that is divided into two subranges by the standard value, and uses this threshold value for calculating the above-described ratio. More specifically, if the state value is larger than the standard value, then the threshold value that is larger than the standard value is read out from the threshold value storage portion 503, and the difference between this threshold value and the standard value is used for calculating the above-described ratio. If the state value is smaller than the standard value, then the threshold value that is smaller than the standard value is read out from the threshold value storage portion 503, and the difference between this threshold value and the standard value is used for calculating the above-described ratio. If the state value is the same as the standard value, then either of the threshold values may be used. The calculating portion 504 can be typically implemented as an MPU or a memory, for example. Typically, the process procedure of the calculating portion 504 is implemented by software, and the software is stored in a storage medium such as a ROM. Note that the process procedure also may be implemented by hardware (dedicated circuit).

The output portion 505 outputs a ratio calculated by the calculating portion 504. In a case where the state values received by the state value receiving portion 501 are multiple state values in different measurement units, the output portion 505 outputs multiple ratios calculated by the calculating portion 504 respectively for the state values in different measurement units. Herein, the term "output" is a concept that includes displaying on a display screen, printing on paper or the like using a printer, transmission to an external apparatus, and temporarily storing in a storage medium such as a memory. For example, the output portion 505 displays the ratio calculated by the calculating portion 504, on a graph on a display screen or the like. Furthermore, ratios calculated using multiple state values in different measurement units may be displayed in a superimposed manner on a graph. The output portion 505 may or may not include an output device such as a display screen or a printer. The output portion 505 can be implemented by driver software for an output device, or a combination of driver software for an output device and the output device, for example.

The semiconductor manufacturing apparatus 600 is provided with the treatment vessel 611. The treatment vessel 611 is also referred to as a reactor vessel or a reaction furnace, for example. In the treatment vessel 611, a semiconductor wafer 650 serving as the treatment target is contained and undergoes a predetermined heat treatment such as a CVD (chemical vapor deposition) process. The treatment vessel 611 is made of a heat-resistant and corrosion-resistant material such as quartz glass. The treatment vessel 611 has a single tube structure in which the upper end and lower end are opened. The upper end is narrowed to a small diameter and forms an exhaust portion 612. The exhaust portion 612 is connected via a pressure regulating portion 616 to a vacuum pump (not shown), for example. The pressure regulating portion 616 has, for example, a valve for regulating pressure, and regulates the pressure inside the treatment vessel 611 by driving the valve to open and close the valve, in accordance with the control performed by a control portion 601 (described later). Furthermore, the treatment vessel 611 includes the pressure detecting portion 617 for detecting pressure (air pressure) inside the treatment vessel 611. The pressure detecting portion 617 detects pressure, and outputs an electric signal corresponding to the detected pressure. The pressure detecting portion 617 is specifically a pressure sensor, and may have any structure, as long as the pressure can be detected thereby.

A gas introducing portion 613 for introducing treatment gas or inert gas into the treatment vessel 611 is disposed in the lower portion of the treatment vessel 611. Multiple gas-supplying pipes 614 communicated with a gas source are inserted into the gas introducing portion 613. Treatment gas introduced from the gas introducing portion 613 rises through the treatment vessel 611, is supplied to a predetermined heat treatment on the semiconductor wafer 650, and then is exhausted from the exhaust portion 612. The pipes 614 are provided with a gas flow rate detecting portion 618 for detecting the flow rate of gas introduced from the gas introducing portion 613 into the treatment vessel 611. As the gas flow rate detecting portion 618, it is possible to use a mass flow controller provided in order to control the gas flow rate in commonly used semiconductor manufacturing apparatuses. Typically, the mass flow controller can detect the gas flow rate, and output the detected measured value or the like.

A flange-shaped lower end portion 615 of the treatment vessel 611 is opened and closed by a cover 621 made of a heat-resistant and corrosion-resistant material such as stainless steel. The cover 621 is vertically moved by a lift (not shown), thereby tightly closing the lower end portion 615 of the treatment vessel 611 at the lifted position, and opening the lower end portion 615 of the treatment vessel 611 at the lowered position.

An O-ring 622 for securing air tightness is disposed between the lower end portion 615 and the cover 621 of the treatment vessel 611.

A rotating support post 623 is rotatably provided upright at a central portion of the cover 621, and a rotating table 664 is secured to the upper end of the rotating support post 623.

Furthermore, a driving portion 665 for driving to rotate the rotating support post 623 is provided below the cover 621.

On the rotating table 664, a boat 626 made of quartz glass (so-called semiconductor wafer boat) in which, for example, 60 semiconductor wafers 650 can be mounted at a predetermined interval in the height direction is placed. The boat 626 is placed on the rotating table 664 in a state where the cover 621 has been lowered, is completely loaded into the treatment vessel 611 when the cover 621 is lifted to tightly close the lower end portion 615 of the treatment vessel 611, and is unloaded as the cover 621 is lowered after the treatment has been completed. Furthermore, during a process, the boat 626 rotates as the rotating table 664 is rotated by the driving portion 665, and thus a uniform heat treatment is performed on the semiconductor wafers 650.

The treatment vessel 611 is surrounded by a heating furnace 630 provided with one or more heaters 631, which are heating units for heating the semiconductor wafers 650 contained in the treatment vessel 611, from the peripheral portion of the semiconductor wafers 650. The heaters 631 are arranged along the periphery of the treatment vessel 611. The heaters 631 have resistance heat generating members, and generate heat when electric power is supplied, for example. As the resistance heat generating members, it is preferable to use a carbon wire or the like that is excellent in temperature rising and falling properties. However, there is no limitation on the structure or the like of the heaters 631. Herein, an example is shown in which the one or more heaters 631 are constituted by three heaters 631a to 631c, but there is no limitation on the number of the heaters. The heaters 631a to 631c are arranged along the direction in which the semiconductor wafers 650 are aligned. However, there is no limitation on the points at which the heaters 631a to 631c are arranged.

One or more temperature detecting portions 641 are provided along the outer circumferential face of the treatment vessel 611. Herein, an example is described in which the one or more temperature detecting portions 641 are constituted by three temperature detecting portions 641a to 641c, but there is no limitation on the number of the temperature detecting portions 641. Herein, the three temperature detecting portions 641a to 641c are arranged in one row in the vertical direction, but there is no limitation on the points at which the temperature detecting portions 641 are arranged. The temperature detecting portions 641a to 641c detect temperature, and output an electric signal corresponding to the detected temperature. The temperature detecting portions 641a to 641c are specifically temperature sensors, and may have any structure such as a thermocouple, as long as the temperature can be detected thereby. It should be noted that there is no limitation on the arrangement of the temperature detecting portions 641a to 641c. As described later, the output of the temperature detecting portions 641a to 641c is used for predicting the surface temperature of the semiconductor wafers 650 that are arranged in the boat 626.

The semiconductor manufacturing apparatus 600 is further provided with the control portion 601, a treatment state value acquiring portion 602, and a treatment output portion 603.

The control portion 601 controls various operations of the semiconductor manufacturing apparatus 600 according to, for example, a preset set value for setting a condition of a treatment on a treatment target. For example, in a case where the treatment temperature has been set, the control portion 601 performs control such that the temperature inside the treatment vessel 611 matches the temperature set by the set value, by performing so-called feedback control on the output of the heaters 631 according to the temperature detected by the one or more temperature detecting portions 641. Furthermore, the control portion 601 performs control such that the pressure inside the treatment vessel 611 matches the pressure set by the set value, by performing so-called feedback control on the pressure regulating portion 616 according to the pressure detected by the pressure detecting portion 617. For example, such control may be performed taking the standard value stored in the standard value storage portion 502 described above, as the targeted value for control. The control portion 601 performs control of the entire semiconductor manufacturing apparatus 600 other than the above, such as control of gas flow rate, control of opening/closing of a valve, and control of the boat lift, but such control is a known art, and therefore a description thereof is omitted. The control portion 601 can be typically implemented as an MPU or a memory, for example. Typically, the process procedure of the control portion 601 is implemented by software, and the software is stored in a storage medium such as a ROM. Note that the process procedure also may be implemented by hardware (dedicated circuit).

The treatment state value acquiring portion 602 acquires a state value, which is a value relating to a state during a treatment of the semiconductor manufacturing apparatus 600. Typically, this state value is the same as the above-described state value received by the state value receiving portion 501. Examples of the state value include temperature values detected by the temperature detecting portions 641, that is, measured values of temperature, and power values of the heaters 631. For example, in a state where a predetermined treatment is performed on a treatment target, based on a signal that is output as a result of detecting the temperature with the temperature detecting portions 641, the treatment state value acquiring portion 602 acquires the state value that is a temperature value corresponding to that signal. The state value also may be a pressure value detected by the pressure detecting portion 617, that is, a measured value of pressure. Furthermore, the treatment state value acquiring portion 602 may acquire the state vale that is a power value of the heaters 631 controlled by the control portion 601, or may acquire the state value that is a power value of the heaters 631 based on a power value detected by a wattmeter (not shown). Herein, a case is described in which the output of the temperature detecting portions 641 is once input to the control portion 601, and the output of the temperature detecting portions 641 is output from the control portion 601 to the treatment state value acquiring portion 602. However, the output of the temperature detecting portions 641 may be directly received by the treatment state value acquiring portion 602. Furthermore, in this case, the input received by the treatment state value acquiring portion 602 may be output by the treatment state value acquiring portion 602 as appropriate to the control portion 601. The treatment state value acquiring portion 602 can be typically implemented as an MPU or a memory, for example. Typically, the process procedure of the treatment state value acquiring portion 602 is implemented by software, and the software is stored in a storage medium such as a ROM. Note that the process procedure also may be implemented by hardware (dedicated circuit).

The treatment output portion 603 outputs the state value acquired by the treatment state value acquiring portion 602. Herein, an example is described in which the treatment output portion 603 transmits the state value acquired by the treatment state value acquiring portion 602, to the state value receiving portion 501 in the information processing apparatus 500. There is no limitation on a timing, trigger, or the like for outputting the state value from the treatment output portion 603 to the state value receiving portion 501. For example, the treatment output portion 603 may output a state value every time the treatment state value acquiring portion 602 acquires a value relating to a state during a treatment, or may output multiple values after the multiple values are temporarily accumulated in a storage medium such as a memory. Alternatively, the treatment output portion 603 may output a state value, on receiving an instruction to output the state value from the information processing apparatus 500. Herein, the term "output" is a concept that includes transmission to an external apparatus, and accumulation in a storage medium such as a memory. The treatment output portion 603 may or may not include an output device such as a communication device. The treatment output portion 603 can be implemented by driver software for an output device, or a combination of driver software for an output device and the output device, for example.

Next, the operation of the information processing apparatus 500 is described with reference to the flowchart in FIG. 17. Herein, for the sake of convenience, a case is described in which multiple state values in the same measurement unit, more specifically, multiple state values having the same unit and zero point that have been transmitted from the semiconductor manufacturing apparatus 600 or the like and acquired at different times are received by the information processing apparatus 500. The state values are, for example, multiple state values in the same measurement unit, acquired by the semiconductor manufacturing apparatus 600 at different times in a case where the semiconductor manufacturing apparatus 600 is caused to perform a desired treatment according to the same settings in advance. Herein, it is assumed that each of the multiple state values is associated with information of the time when that state value is acquired. Herein, it is assumed that as the standard value, a targeted value for control of the state values is set in advance. Furthermore, a first threshold value serving as the upper limit value and a second threshold value serving as the lower limit value, for setting the range of the state values obtained in a case where a treatment by the semiconductor manufacturing apparatus 600 and the like is properly performed are stored in advance in the threshold value storage portion 503. It should be noted that the standard value is between the first threshold value and the second threshold value.

(step S1701) The state value receiving portion 501 receives multiple state values that are output by the semiconductor manufacturing apparatus 600 or the like. The received state values are accumulated in a storage medium such as a memory (not shown).

(step S1702) The calculating portion 504 acquires a standard value that is stored in advance, from the standard value storage portion 502.

(step S1703) The calculating portion 504 acquires threshold values that are stored in advance, from the threshold value storage portion 503. Herein, the calculating portion 504 acquires a first threshold value and a second threshold value.

(step S1704) The calculating portion 504 assigns 1 to a counter K.

(step S1705) The calculating portion 504 acquires a Kth state value. Herein, the state value receiving portion 501 acquires a state value that is a Kth value in time-series order acquired by the semiconductor manufacturing apparatus 600 or the like, among set values accumulated in a memory or the like (not shown).

(step S1706) The calculating portion 504 judges whether or not the state value is equal to or larger than the standard value. If the state value is equal to or larger than the standard value, then the procedure proceeds to step S1707. If the state value is smaller than the standard value, then the procedure proceeds to step S611. Herein, it is also possible to judge whether or not the state value is larger than the standard value, instead of judging whether or not the state value is equal to or larger than the standard value.

(step S1707) The calculating portion 504 calculates the ratio R by assigning the first threshold value acquired in step S1703 to the threshold value in Equation 1 above, and assigning the Kth state value acquired in step S1705 and the standard value acquired in step S1702 respectively to the state value and the standard value in Equation 1. The calculated ratio R is accumulated in a storage medium such as a memory (not shown).

(step S1708) The calculating portion 504 increments the counter K by 1.

(step S1709) The calculating portion 504 judges whether or not there is a Kth state value. If there is a Kth state value, then the procedure returns to step S1705. If there is no Kth state value, then the procedure proceeds to step S1710.

(step S1710) The output portion 505 reads out the ratio R calculated by the calculating portion 504 from a memory or the like, and outputs the ratio R. The output portion 505 displays the ratio R on a graph, for example. Then, the process is ended.

(step S1711) The calculating portion 504 calculates the ratio R by assigning the second threshold value acquired in step S1703 to the threshold value in Equation 1 above, and assigning the Kth state value acquired in step S1705 and the standard value acquired in step S1702 respectively to the state value and the standard value in Equation 1. The calculated ratio R is accumulated in a storage medium such as a memory (not shown).

Figure 17:
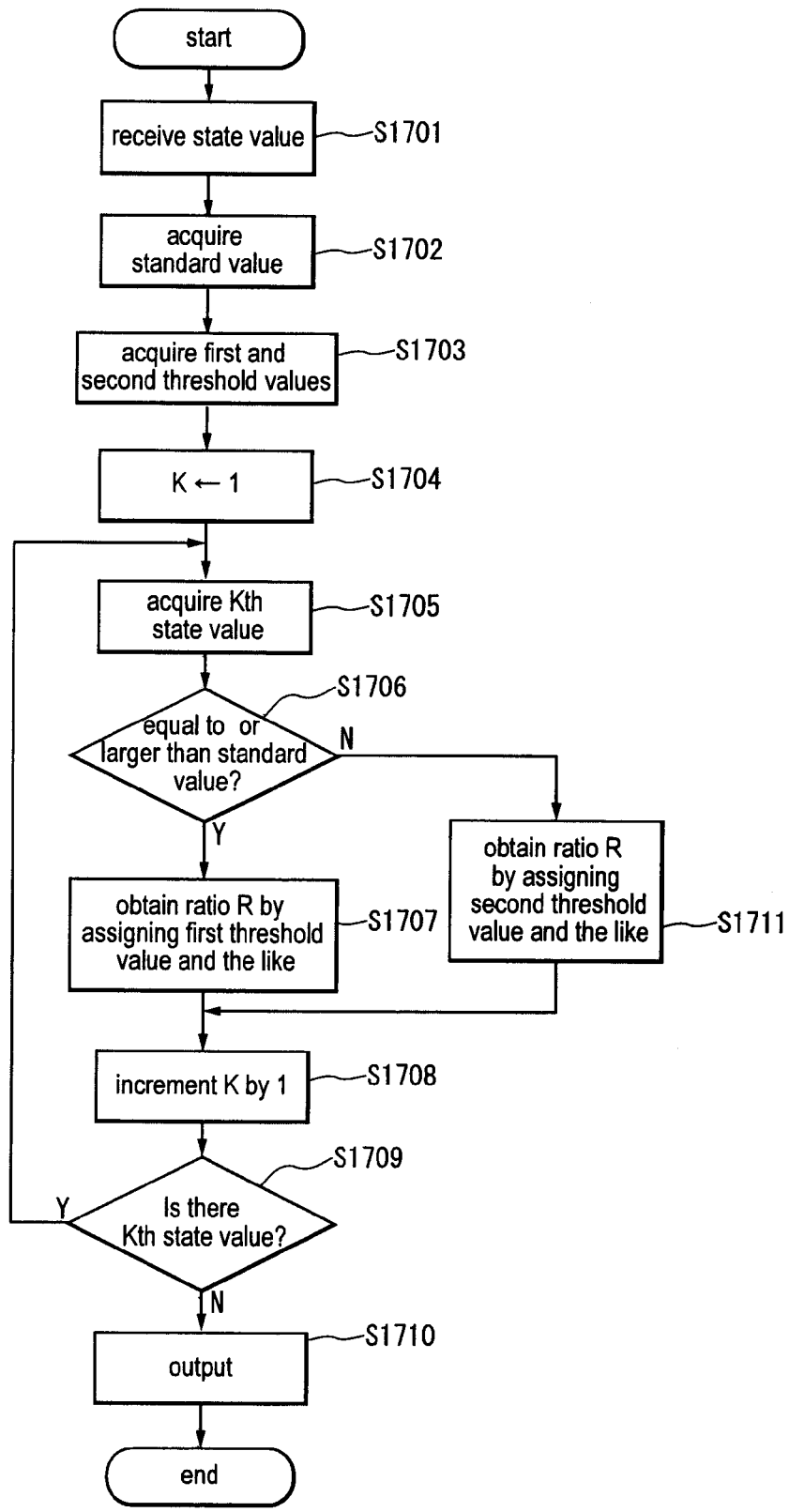
FIG. 17 is a flowchart illustrating the operation of an information processing apparatus in the semiconductor manufacturing system.

It should be noted that in the flowchart in FIG. 17, the above-described process may be performed in a state where the standard value, the threshold values, the multiple state values acquired at one time, and the like are expressed as a matrix. For example, in a case where as the state values, respective power values of the multiple heaters 631 or multiple values obtained based on the temperatures acquired by the multiple temperature detecting portions 641 inside the semiconductor manufacturing apparatus 600 are used, the state values may be expressed as a matrix in which the number of elements matches the number of the heaters 631 or the number of the temperature detecting portions 641. In this case, the process in step S1707, step S1711, and the like is performed by a matrix operation, for example.

In the description above, a case is described in which state values in the same measurement unit are used. However, in a case where state values in different measurement units are used, for example, in a case where the state values are state values in different units, after performing a process of obtaining the ratio using state values in the same measurement unit, a similar process may be performed using state values in another measurement unit. For example, in a case where state values in different measurement units can be received in step S1701, after the process has been performed on state values in one measurement unit following the above-described flowchart, it may be judged whether or not there is a state value in another measurement unit. If there is a state value in another measurement unit, then the procedure returns to step S1702, for example, and a standard value and a threshold value corresponding to that measurement unit are acquired, and a process as in the flowchart is repeated.

In the flowchart in FIG. 17, the process is ended by turning off power or a processing-ending interruption.

The operation in which the semiconductor manufacturing apparatus 600 in the semiconductor manufacturing system performs a desired treatment or acquires a state value is a known art, and therefore a description thereof is omitted.

Figure 18:
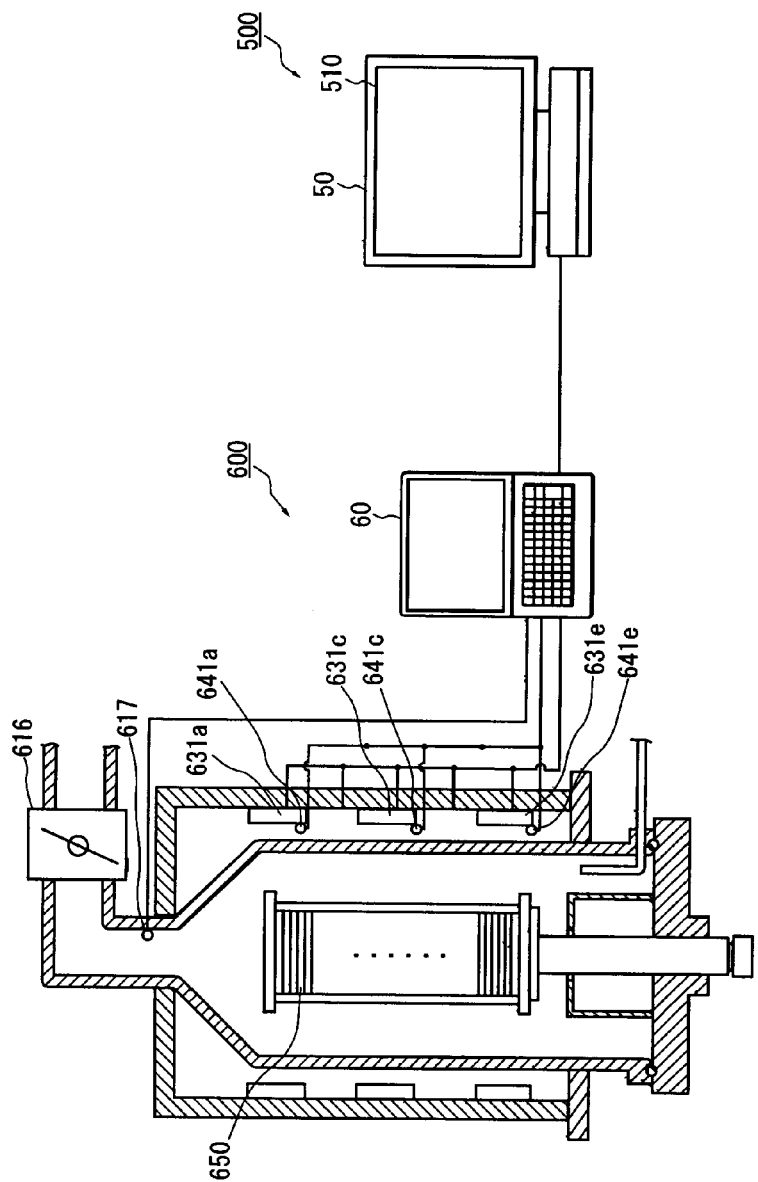
FIG. 18 is a conceptual diagram of the semiconductor manufacturing system.

Hereinafter, the specific operation of the semiconductor manufacturing system in this embodiment is described. FIG. 18 shows a conceptual diagram of the semiconductor manufacturing system. Herein, it is assumed that the information processing apparatus 500 is implemented by a computer 50, for example. Furthermore, it is herein assumed that the control portion 601, the treatment state value acquiring portion 602, and the treatment output portion 603 in the semiconductor manufacturing apparatus 600 are implemented by a computer 60 for control, which is a part of the semiconductor manufacturing apparatus 600, for example. It should be noted that the set value and the state value used herein are values prepared for explanation, and are different from actually measured values obtained when the semiconductor manufacturing apparatus 600 is caused to actually perform a desired treatment.

Herein, for example, it is assumed that the semiconductor manufacturing apparatus 600 is a heat treatment apparatus. Furthermore, the semiconductor manufacturing apparatus 600 repeatedly performs a predetermined process on semiconductor wafers on a batch-to-batch basis according to the same treatment settings, and the state value receiving portion 501 acquires, for each batch, a first state value, which is an average value of the temperatures detected by the temperature detecting portion 641a in a period during which the treatment temperature is stable, and a second state value, which is an average pressure value inside the treatment vessel 611 detected by the pressure detecting portion 617. The unit of the temperature serving as the first state value is degree (° C.), and the unit of the pressure serving as the second state value is Pascal (Pa). In this manner, the first state value and the second state value are values in different measurement units, herein, in different units. The first state value and the second state value acquired by the treatment state value acquiring portion 602 are temporarily accumulated by the treatment output portion 603, and the accumulated multiple first state values and second state values are transmitted from the treatment output portion 603 to the information processing apparatus 500.

Furthermore, a targeted value for control of the temperate serving as the first state value and a targeted value of pressure inside the treatment vessel 611 serving as the second state value are stored in advance in the standard value storage portion 502, respectively as a standard value for the first state value and a standard value for the second state value. These targeted values are standard values. Furthermore, a threshold value serving as the upper limit value (hereinafter, referred to as a "first threshold value"), and a threshold value serving as the lower limit value (hereinafter, referred to as a "second threshold value"), for setting the range of each of the temperature serving as the first state value and the pressure inside the treatment vessel 611 serving as the second state value obtained in a case where the semiconductor manufacturing apparatus 600 is performing a proper treatment are stored in the threshold value storage portion 503. It is assumed that the above-described standard value is positioned between the first threshold value and the second threshold value.

First, the semiconductor manufacturing apparatus 600 is caused to perform a predetermined treatment, and the treatment state value acquiring portion 602 acquires the temperature and the pressure during the treatment. The treatment state value acquiring portion 602 calculates an average temperature value and an average pressure value for each batch. The treatment output portion 603 temporarily accumulates the calculated average temperature value, that is, the first state value, and the calculated average pressure value, that is, the second state value, in a memory or the like (not shown). This process is repeated for multiple batches.

The treatment output portion 603 transmits the accumulated multiple first state values and second state values to the information processing apparatus 500. There is no limitation on a timing, trigger, or the like for performing the transmission. However, it is herein assumed that an instruction requesting the first state values and the second state values is received from the information processing apparatus 500, and the accumulated multiple first state values and second state values are transmitted to the information processing apparatus 500 in response to this instruction.

The state value receiving portion 501 receives the average temperature values serving as the first state values and the average pressure values serving as the second state values for multiple batches. The state value receiving portion 501 temporarily stores the received first state values and second state values in a memory or the like.

Figure 19:
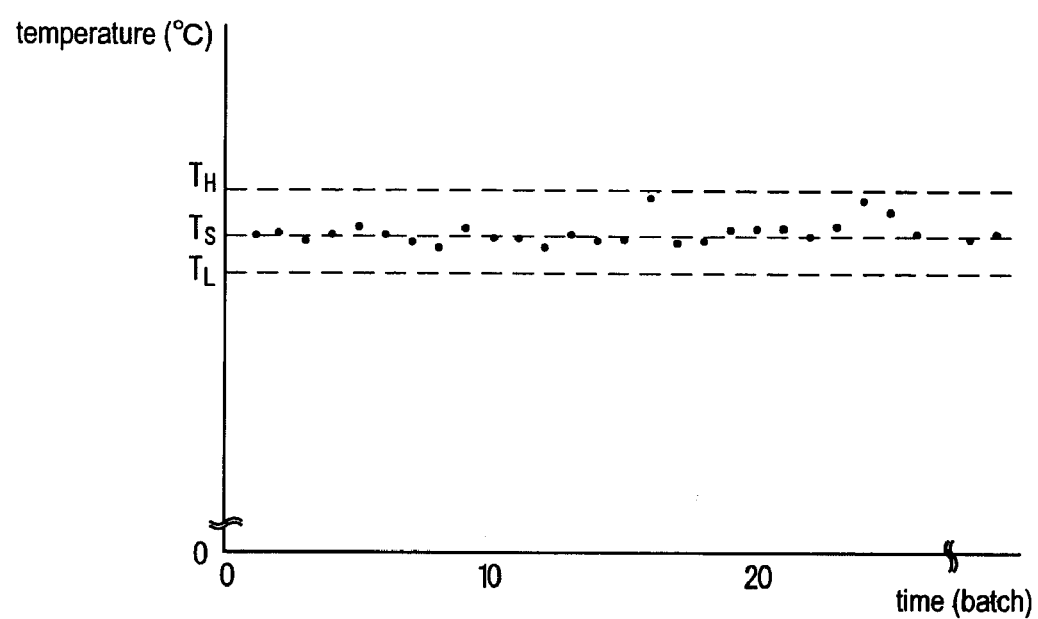
FIG. 19 is a graph showing first state values in the semiconductor manufacturing system.

FIG. 19 shows the first state values received by the state value receiving portion 501, as a graph. In FIG. 19, the horizontal axis represents time, herein, the number of batches, and the vertical axis represents the first state values, that is, the average values of the temperatures detected by the temperature detecting portions 641a. Furthermore, $T_S$ denotes a standard value of the first state value, $T_H$ denotes a first threshold value of the first state value, and $T_L$ denotes a second threshold value of the first state value. If the first state value is between the first threshold value $T_H$ and the second threshold value $T_L$, then it is judged that a treatment has been properly performed by the semiconductor manufacturing apparatus 600.

Figure 20:
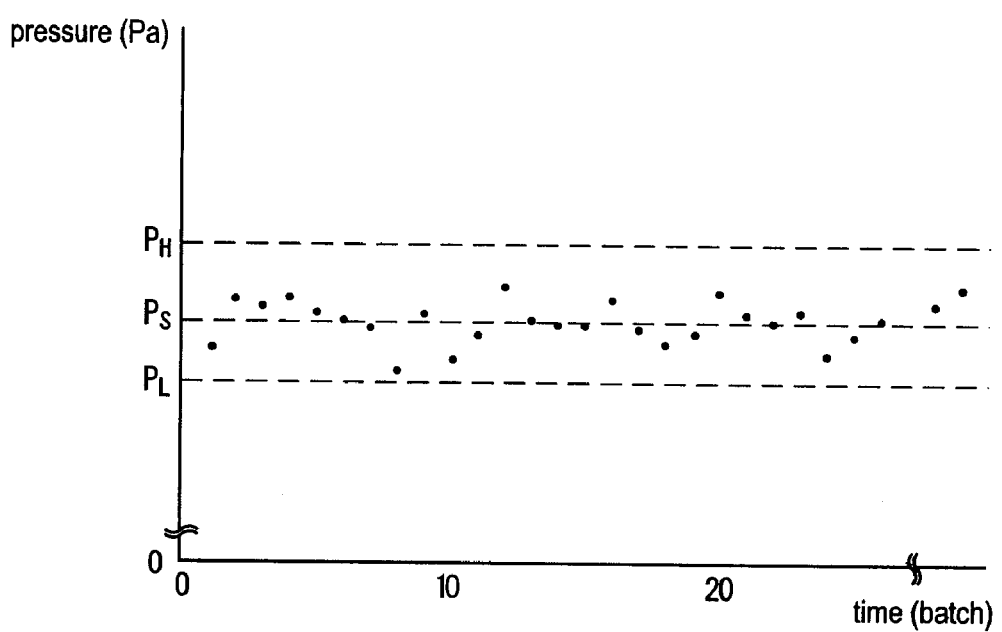
FIG. 20 is a graph showing second state values in the semiconductor manufacturing system.

FIG. 20 shows the second state values received by the state value receiving portion 501, as a graph. In FIG. 20, the horizontal axis represents time, herein, the number of batches, and the vertical axis represents the second state values, that is, the average pressure values detected by the pressure detecting portion 617. Furthermore, $P_S$ denotes a standard value of the second state value, $P_H$ denotes a first threshold value of the second state value, and $P_L$ denotes a second threshold value of the second state value. If the second state value is between the first threshold value $P_H$ and the second threshold value $P_L$, then it is judged that a treatment has been properly performed by the semiconductor manufacturing apparatus 600.

Next, the calculating portion 504 reads out the standard value $T_S$, and the first threshold value $T_H$ and the second threshold value $T_L$, corresponding to the first state values, from the standard value storage portion 502 and the threshold value storage portion 503. Then, the ratio R is obtained by performing calculation using Equation 1 above, for each of the first state values received by the state value receiving portion 501. Herein, the ratio R calculated for the first state value is taken as $R_1$. It should be noted that information indicating Equation 1 above is stored in advance in a storage medium such as a memory (not shown).

In a similar manner, the calculating portion 504 reads out the standard value $P_S$, and the first threshold value $P_H$ and the second threshold value $P_L$, corresponding to the second state values, from the standard value storage portion 502 and the threshold value storage portion 503. Then, the ratio R is obtained by performing calculation using Equation 1 above, for each of the second state values received by the state value receiving portion 501. Herein, the ratio R calculated for the second state value is taken as $R_2$.

The output portion 505 displays a graph of the ratio $R_1$ calculated for the first state values and a graph of the ratio $R_2$ calculated for the second state values in a superimposed manner such that their zero points match each other.

Figure 21:
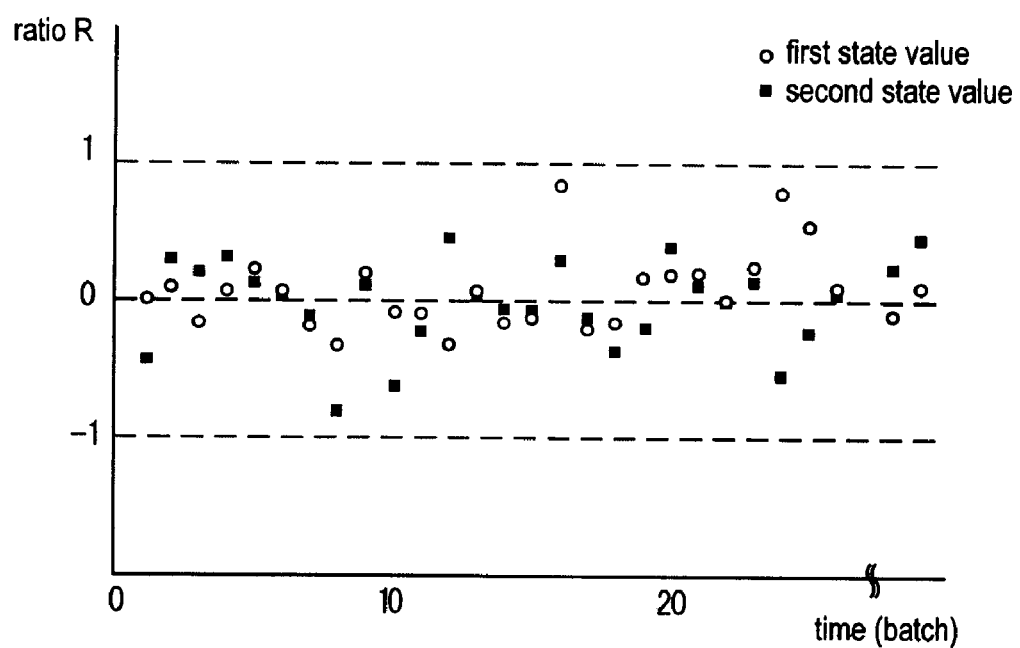
FIG. 21 is a graph showing a display example of the information processing apparatus.

FIG. 21 shows a display example of a graph in which the ratio $R_1$ and the ratio $R_2$ are superimposed, on a display screen 510 of the information processing apparatus 500, for example. In FIG. 21, the horizontal axis represents time, herein, the number of batches, and the vertical axis represents the ratio R. Herein, the ratio $R_1$ and the ratio $R_2$ are displayed in a superimposed manner, but also may be displayed in a non-superimposed manner.

In this example, values obtained by subtracting the standard values serving as targeted values for control respectively from the first state value and the second state value in different units, and values obtained by subtracting the standard values from the threshold values respectively corresponding to the first state value and the second state value are obtained, and ratios therebetween are calculated. Therefore, if the state value matches the standard value, then the obtained value (ratio) is always 0. Furthermore, if the state value is a value between the first threshold value and the second threshold value, then the obtained value (ratio) ranges from −1 to 1. More specifically, the first threshold value and the second threshold value are set to 1 and −1 that are common threshold values. As a result, regardless of the difference in measurement units such as units, it is possible to easily compare different state values with each other without depending on the units, by superimposing the state values such that the standard values match each other, and to monitor abnormality and the like in a treatment performed by the semiconductor manufacturing apparatus 600, using common threshold values. For example, in the foregoing example, whichever state value an output value corresponds to, if the output value is larger than 1 or smaller than −1, then it is possible to judge that the state value corresponding to this value is larger than the first threshold value or smaller than the second threshold value, thus making it possible to judge that there is something wrong with a treatment performed by the semiconductor manufacturing apparatus 600. Accordingly, it is possible to monitor whether or not a treatment of the semiconductor manufacturing apparatus is properly performed, for example, using a control chart on which graphs are integrated into one graph. Thus, it is possible to easily monitor the semiconductor manufacturing apparatus.

Figure 22:
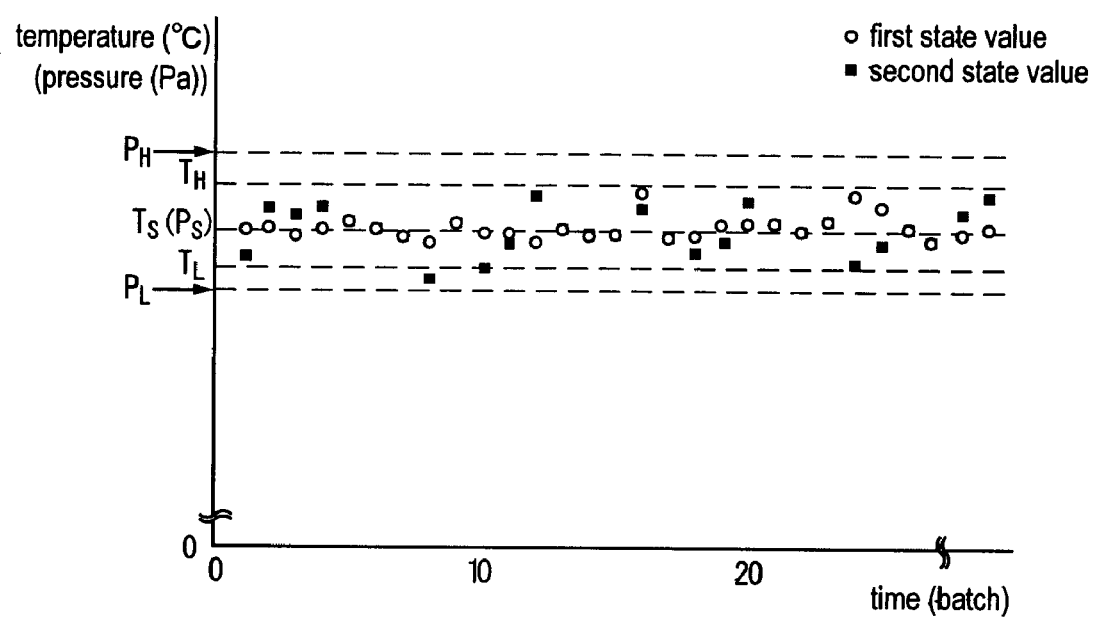
FIG. 22 is a graph for illustrating the operation of the information processing apparatus.

Herein, in a case where the graph of the first state values shown in FIG. 19 and the graph shown in FIG. 20 are simply superimposed while ignoring the units or the like such that their standard values match each other, the graph as shown in FIG. 22 is obtained. However, in this graph, the state values have different threshold values. Therefore, even in a case where the second state value is equal to or smaller than the first threshold value of the second state value, if the second state value is larger than the first threshold value of the first state value, it may be erroneously judged by the user that the second state value is out of the range of normal values when the user cannot precisely determine whether the state value is the first state value or the second state value. Therefore, it is necessary to carefully monitor whether the state value is the first state value or the second state value, and the burden for the user for monitoring increases. Thus, it is not possible to easily compare or monitor state values in different measurement units as in the foregoing example.

In the foregoing example, a case is described in which two state values in different measurement units are used, but this embodiment can be applied also to a case in which three or more state values in different measurement units are used.

For example, a case is described in which in addition to average temperature values serving as the first state values and average pressure values serving as the second state values described in the foregoing example, third state values that are average values of the gas flow rates of, for example, treatment gas introduced into the treatment vessel 611 of the semiconductor manufacturing apparatus 600 are used.

First, in a similar manner to that for the temperature and the like as described above, the treatment state value acquiring portion 602 acquires the gas flow rate of, for example, treatment gas in a case where the semiconductor manufacturing apparatus 600 is caused to perform a predetermined treatment, and then calculates their average values. The average values of the gas flow rates serve as third state values. Then, the treatment output portion 603 transmits the third states together with the first state values and second state values described above.

The state value receiving portion 501 receives the gas flow rate serving as the third state values transmitted together with the first state values and the second state values.

Figure 23:
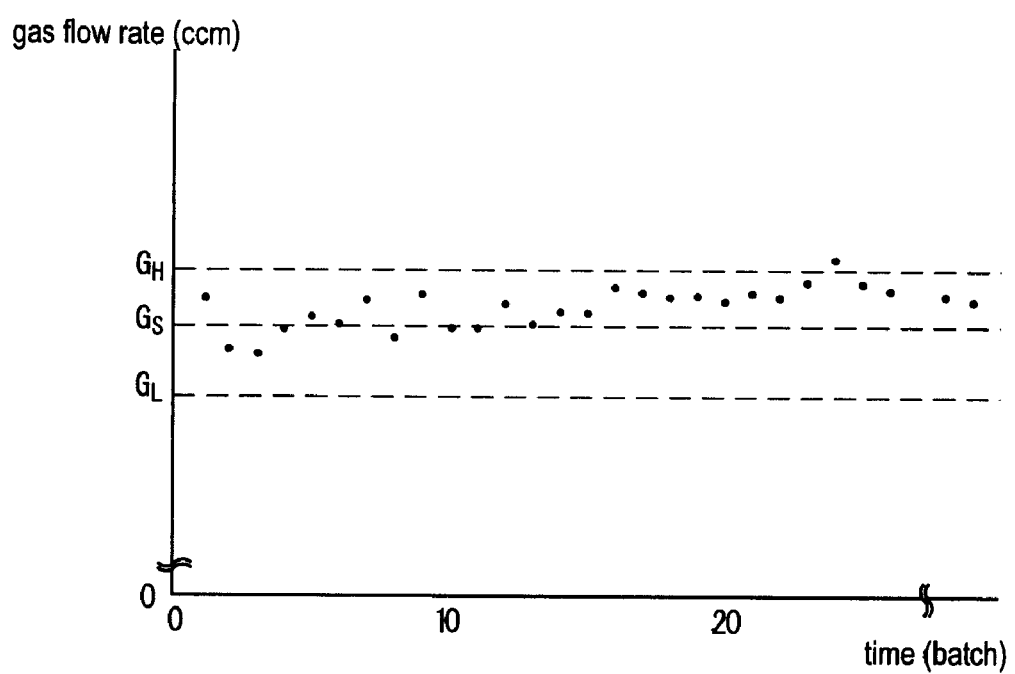
FIG. 23 is a graph showing third state values in the semiconductor manufacturing system.

FIG. 23 shows the gas flow rate serving as the third state values received by the state value receiving portion 501, as a graph. In FIG. 23, the horizontal axis represents time, herein, the number of batches, and the vertical axis represents the average value of the gas flow rates for one batch. As the gas flow rate value, for example, a measured value obtained with a mass flow controller (MFC) for controlling the flow rate of gas supplied to the gas introducing portion 613 of the semiconductor manufacturing apparatus 600 is used. Furthermore, $G_S$ denotes a standard value of the third state value, $G_H$ denotes a first threshold value of the third state value, and $G_L$ denotes a second threshold value of the third state value. The standard value $G_S$ is stored in advance in the standard value storage portion 502, and the threshold values $G_H$ and $G_L$ are stored in advance in the threshold value storage portion 503. If the third state value is between the first threshold value $G_H$ and the second threshold value $G_L$, then it is judged that a treatment has been properly performed by the semiconductor manufacturing apparatus 600.

In a similar manner to that for the first state value and the like, the calculating portion 504 reads out the standard value $G_S$, and the first threshold value $G_H$ and the second threshold value $G_L$, corresponding to the third state values, from the standard value storage portion 502 and the threshold value storage portion 503. Then, the ratio R is obtained by performing calculation using Equation 1 above, for each of the third state values received by the state value receiving portion 501. Herein, the ratio R calculated for the second state value is taken as $R_3$.

The output portion 505 displays the ratio $R_3$ calculated for the third state values in a superimposed manner on the graph as shown in FIG. 21 in which the ratio $R_1$ calculated for the first state values and the ratio $R_2$ calculated for the second state values are superimposed such that their zero points match each other.

Figure 24:
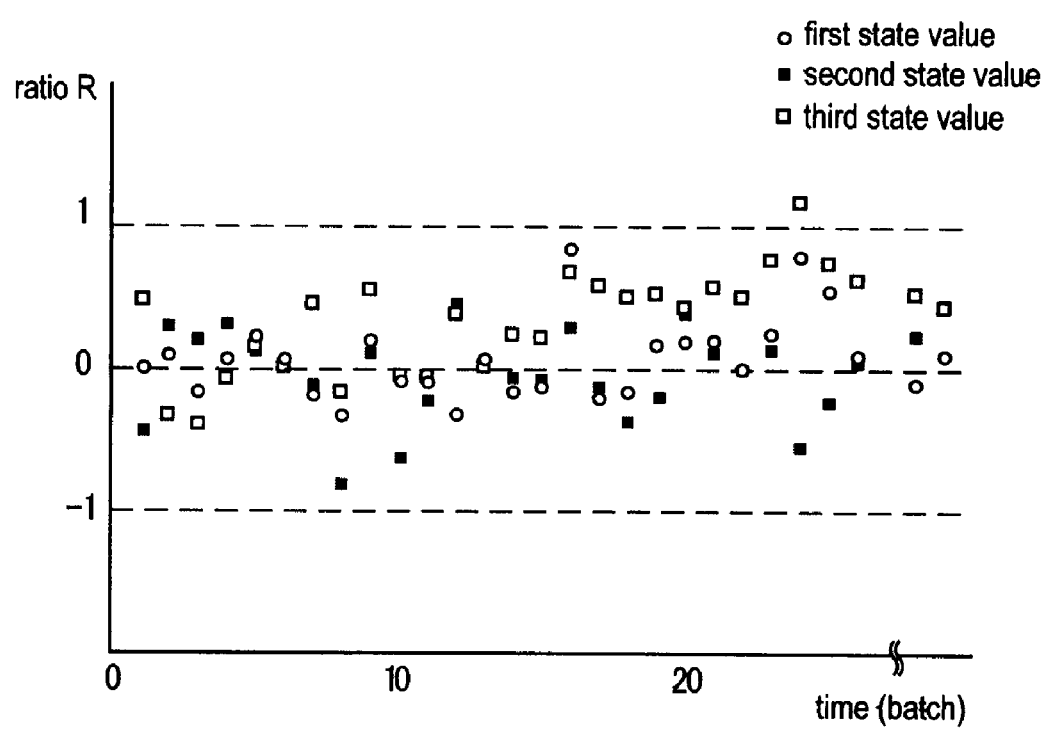
FIG. 24 is a graph showing a display example of the information processing apparatus.

FIG. 24 is a display example of a graph in which the ratio $R_1$, the ratio $R_2$, and the ratio $R_3$ are superimposed, on the display screen 510 of the information processing apparatus 500, for example. In FIG. 24, the horizontal axis represents time, herein, the number of batches, and the vertical axis represents the ratio R.

Also in this case, if the third state value matches the standard value $G_S$, then the obtained value (ratio) is always 0. Furthermore, if the third state value is a value between the first threshold value $G_H$ and the second threshold value $G_L$, then the obtained value (ratio) ranges from −1 to 1. More specifically, the first threshold value and the second threshold value for the third state value are set to 1 and −1 that are common threshold values for the first and second state values, and the third state value. As a result, regardless of the difference in measurement units such as units, it is possible to easily compare different state values with each other without depending on the units, by superimposing the state values such that the standard values match each other, and to monitor abnormality and the like in a treatment by the semiconductor manufacturing apparatus 600, using common threshold values.

As described above, according to this embodiment, each ratio between a value relating to the difference between the state value received by the state value receiving portion 501 and the standard value, and a value relating to the difference between the threshold value and the standard value is calculated, and thus it is possible to convert values that are different from each other in measurement unit such as unit, into values taking the respective threshold values into consideration, without depending on the units. Thus, it is possible to obtain, from state values in different units, values suitable for analysis such as comparison or monitoring of data. Accordingly, it is possible to easily compare or monitor state values in different measurement units.

Figure 25:
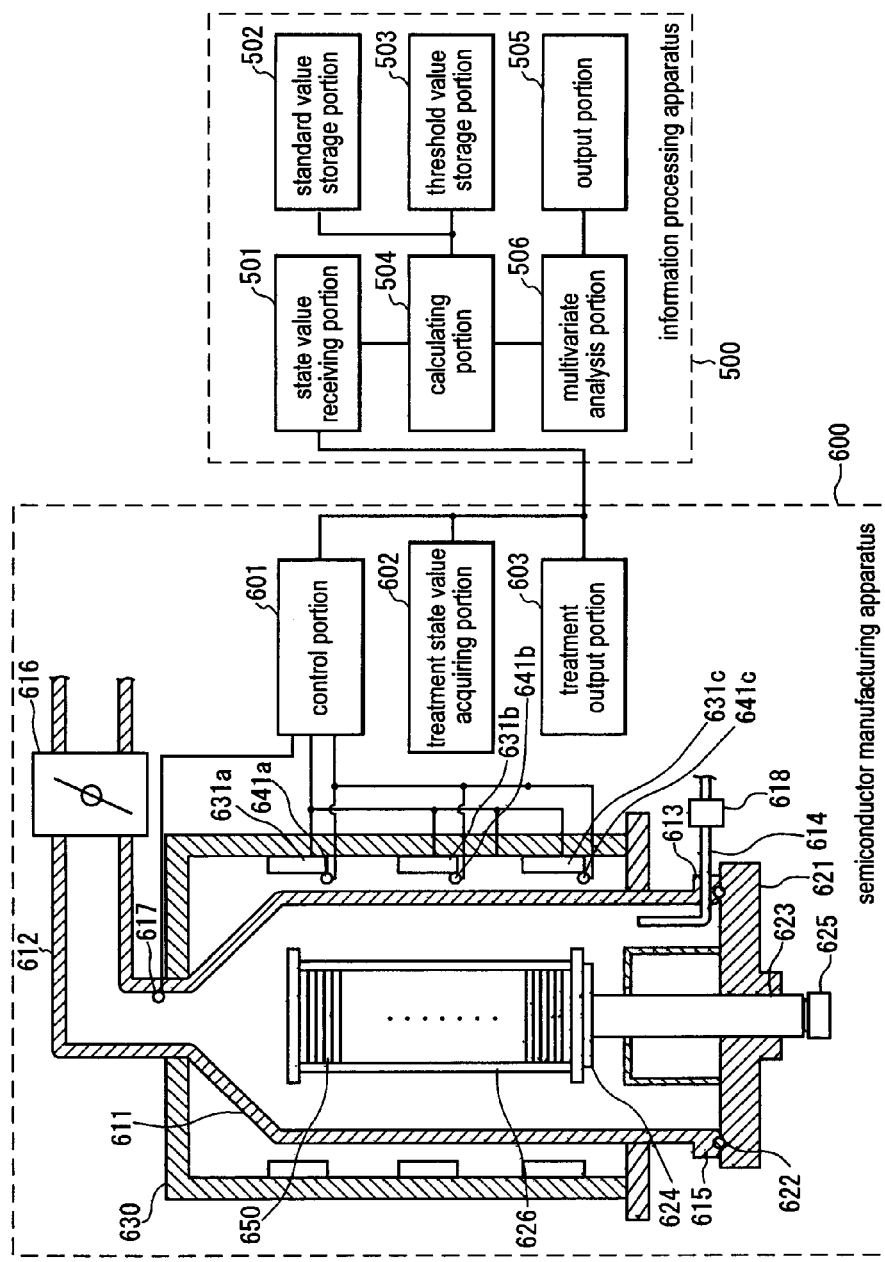
FIG. 25 is a diagram illustrating a modified example of the semiconductor manufacturing system.

In this embodiment, in a case where the state value receiving portion 501 receives two or more state values in different measurement units, the configuration also may be applied in which a multivariate analysis portion 506 is provided as shown in FIG. 25, and the output portion 505 outputs the results of multivariate analysis performed by the multivariate analysis portion 506 instead of the ratios calculated by the calculating portion 504.

The multivariate analysis portion 506 performs multivariate analysis using the calculation results of the calculating portion 504 performed on two or more state values in different measurement units. The analysis performed by the multivariate analysis portion 506 may be any analysis such as discriminant analysis using Mahalanobis' distance or multiple regression analysis. The multivariate analysis is a known art, and therefore the detailed description thereof is omitted. The multivariate analysis portion 506 can be typically implemented as an MPU or a memory, for example. Furthermore, information of equations and the like in the multivariate analysis is typically stored in a storage medium such as a memory. Typically, the process procedure of the multivariate analysis portion 506 is implemented by software, and the software is stored in a storage medium such as a ROM. Note that the process procedure also may be implemented by hardware (dedicated circuit).

As in conventional examples, in a case where information obtained by performing the standardization using the standard deviation on state values is used for the multivariate analysis, when the state values are not normally-distributed, even if a state value that is significantly different from other values is actually in the range of normal values that can be taken by the state values, as a result of the multivariate analysis, the state value may be judged to be a value that is significantly different from other values, and may be evaluated as an abnormal value.

However, in this embodiment, the standardization of the state values is performed taking the threshold values of the state values into consideration, instead of the standard deviation. Therefore, even if the state values are not normally-distributed, as long as a state value that is significantly different from other values is in the area that is judged to be normal based on the threshold values, it is possible to reduce the possibility that as a result of the multivariate analysis, the value is judged to be significantly different from other values. With this modified example, using state values in different units, appropriate multivariate analysis can be performed taking the threshold values of the respective state values into consideration.

Furthermore, in the foregoing embodiment, the information processing apparatus 500 may be used as a single apparatus by separating it from the semiconductor manufacturing apparatus 600. In this case, for example, the information processing apparatus 500 may receive data that is to be processed, via a storage medium.

Furthermore, in the foregoing example, a case is described in which the state values are the temperature, the pressure, and the gas flow rate, but the present invention can be applied also to other state values.

Also, in the foregoing embodiments, each processing (each function) may be realized by integrated processing by a single device (system), or alternatively, may be realized by distributed processing by multiple devices.

Also, in the foregoing embodiments, each component may be configured with dedicated hardware, or alternatively, components that can be realized with software may be realized by executing a program. For example, each component can be realized by a program execution portion such as a CPU reading and executing a software program that has been stored on a storage medium such as a hard disk or semiconductor memory.

Herein, the software that implements the information processing device in the foregoing embodiments may be a following program. Specifically, this program is a program for causing a computer to process a state value, which is a value relating to a state during a treatment, performed by a semiconductor manufacturing apparatus for performing a treatment on a treatment target containing a semiconductor according to a set value, which is a value for setting a condition of a treatment, wherein the program causes the computer to execute: a set value receiving step of receiving the set value; a state value receiving step of receiving the state value; a correction amount calculating step of calculating a correction amount of the state value, using a correction function, which is a function indicating a relationship between the set value and the correction amount; a correcting step of correcting the state value received in the state value receiving step, using the correction amount calculated in the correction amount calculating step; and an output step of outputting the state value corrected in the correcting step.

Furthermore, the software that implements the information processing apparatus in Embodiment 1 may be a following program. Specifically, this program is a program for causing a computer to process a state value, which is a value relating to a state during a treatment, performed by a semiconductor manufacturing apparatus for performing a treatment on a treatment target containing a semiconductor according to a set value, which is a value for setting a condition of a treatment, wherein the program causes the computer to execute: a set value receiving step of receiving the set value; a state value receiving step of receiving the state value; a correction amount calculating step of calculating a correction amount corresponding to a change amount, with respect to a predetermined value, of the set value received in the set value receiving step is calculated, using the correction function, which is a function indicating a relationship between a change amount of the set value and the correction amount, which is a change amount of the state value predicted based on the change amount of the set value; a correcting step of correcting the state value received in the state value receiving step, using the correction amount calculated in the correction amount calculating step; and an output step of outputting the state value corrected in the correcting step.

Furthermore, the software that implements the information processing apparatus in Embodiment 2 may be a following program. Specifically, this program is a program for causing a computer to process a state value, which is a value relating to a state during a treatment, performed by a semiconductor manufacturing apparatus for performing a treatment on a treatment target containing a semiconductor according to a set value, which is a value for setting a condition of a treatment, wherein the program causes the computer to execute: a set value receiving step of receiving the set value; a state value receiving step of receiving the state value; a correction amount calculating step of calculating a correction amount corresponding to the set value received in the set value receiving step is calculated using, the correction function, which is a function indicating a relationship between the set value and the correction amount, which is a state value predicted based on the set value; a correcting step of correcting the state value received in the state value receiving step, using the correction amount calculated in the correction amount calculating step; and an output step of outputting the state value corrected in the correcting step.

Furthermore, the software that implements the information processing apparatus in Embodiment 3 may be a following program. Specifically, this program is a program for causing a computer to process a state value, which is a value relating to a state during a treatment, performed by a semiconductor manufacturing apparatus for performing a treatment on a treatment target containing a semiconductor, wherein the program causes the computer to execute: a state value receiving step of receiving the state value; a calculating step of calculating a ratio between a value relating to a difference between the state value received in the state value receiving step and a stored standard value serving as standard for the state value, and a value relating to a difference between a stored threshold value used for judging whether or not the state value is a desired value, and the standard value; and an output step of outputting the ratio calculated in the calculating step.

Furthermore, in this program, in the state value receiving step, multiple state values in different measurement units are received, in the calculating step, the ratio corresponding to each of the multiple state values in different measurement units is calculated, and in the output step, the multiple ratios calculated in the calculating step are output.

Furthermore, the program is a program for causing a computer to process a state value, which is a value relating to a state during a treatment, performed by a semiconductor manufacturing apparatus for performing a treatment on a treatment target containing a semiconductor, wherein the program causes the computer to execute: a state value receiving step of receiving the multiple state values in different measurement units; a calculating step of calculating, for each of the multiple state values in different measurement units, a ratio between a value relating to a difference between the state value received in the state value receiving step and a stored standard value serving as standard for the state value, and a value relating to a difference between a stored threshold value used for judging whether or not the state value is a desired value, and the standard value; a multivariate analysis step of performing multivariate analysis, using the multiple ratios calculated in the calculating step; and an output step of outputting a result of analysis performed in the multivariate analysis step.

Furthermore, in this program, the threshold value used in the calculating step for calculating a ratio is a value in a subrange to which the state value belongs, of a possible range of the state value that is divided into two subranges by the standard value.

In the above-described programs, in an output step of outputting information, a receiving step of receiving information, or the like, processing that is performed by hardware (processing that can only be performed with hardware), for example, processing performed by a modem, an interface card, or the like in the output step, is not included.

Also, this program may be executed by downloading from a server or the like, or may be executed by reading a program that has been stored on a predetermined storage medium (for example, an optical disk such as a CD-ROM, a magnetic disk, a semiconductor memory, or the like).

The computer that executes this program may be a single computer or multiple computers. That is, centralized processing or distributed processing may be performed.

Also, in the foregoing embodiments, it would be appreciated that two or more communication units (such as information transmitting portions) in one device may be physically implemented by one medium.

The present invention is not limited to the embodiments set forth herein. Various modifications are possible within the scope of the present invention.

Furthermore, in the foregoing embodiments, the information processing apparatus may be a stand-alone apparatus, or may be a server apparatus in a server-client system. In the latter case, the output portion, the receiving portion, the set value receiving portion, and the like receive the input, or outputs data to screen, via a communication line.

As described above, the information processing apparatus and the like according to the present invention are suitable as an information processing apparatus and the like for processing information obtained during a manufacturing process performed by the semiconductor manufacturing apparatus. In particular, they are useful as an information processing apparatus and the like for processing information obtained as a result of performing a treatment performed using different set values. In particular, they are useful as an information processing apparatus and the like for processing values that are different from each other in measurement unit such as unit.

What is claimed is:

1. An information processing apparatus for processing a state value, which is a value relating to a state during a treatment, performed by a semiconductor manufacturing apparatus for performing the treatment on a treatment target containing a semiconductor according to a set value, which is a value for setting a condition of the treatment, comprising:
   a set value receiving portion that receives the set value;
   a state value receiving portion that receives the state value;
   a specified value storage portion that stores a preset specified value into which the set value received by the set value receiving portion is to be changed;
   a correction function storage portion that stores a correction function indicating a relationship between a change amount of the set value and a change amount of the state value;
   a correction amount calculating portion that calculates a correction amount, which is a change amount of the state value of a case when the set value is changed into the preset specified value, by assigning a change amount of the set value received by the set value receiving portion with respect to the preset specified value stored in the specified value storage portion, to the correction function stored in the correction function storage portion;
   a correcting portion that corrects the state value received by the state value receiving portion, using the correction amount calculated by the correction amount calculating portion, to correct the state value received by the state value receiving portion into a state value of the case when the set value is changed into the preset specified value; and
   an output portion that outputs the state value corrected by the correcting portion.

2. The information processing apparatus according to claim 1, wherein the correction function is a function having, as a coefficient, a correction matrix for setting the correction function, the correction matrix being a matrix in which a value of each column is a value of a change amount of a state value obtained in a case where the semiconductor manufacturing apparatus is caused to perform a treatment while a value of each element in a matrix representing a desired set value is sequentially changed by a unit amount.

3. The information processing apparatus according to claim 1, wherein the correction function is a function having, as a coefficient, steady-state gain of a transfer function of the semiconductor manufacturing apparatus.

4. The information processing apparatus according to claim 1, wherein the correction function is a function obtained using multiple groups of the set value and the state value that is output by the semiconductor manufacturing apparatus during the treatment according to the set value.

5. The information processing apparatus according to claim 4, further comprising a correction function generating portion that generates the correction function, using the multiple groups of the set value and the state value that is output by the semiconductor manufacturing apparatus during the treatment according to the set value.

6. The information processing apparatus according to claim 4, wherein the correction function is a function expressed as an approximation formula obtained using the multiple groups of the set value and the state value that is output by the semiconductor manufacturing apparatus during a treatment according to the set value.

7. The information processing apparatus according to claim 1, wherein the correction function is a function obtained using multiple groups of the set value and the state value that is output by the semiconductor manufacturing apparatus during the treatment according to the set value.

8. The information processing apparatus according to claim 7, further comprising a correction function generating portion that generates the correction function, using the multiple groups of the set value and the state value that is output by the semiconductor manufacturing apparatus during the treatment according to the set value.

9. The information processing apparatus according to claim 7, wherein the correction function is a function expressed as an approximation formula obtained using the multiple groups of the set value and the state value that is output by the semiconductor manufacturing apparatus during the treatment according to the set value.

10. The information processing apparatus according to claim 1,
    wherein the set value is the value for setting the condition of the treatment on the treatment target inside the semiconductor manufacturing apparatus, and
    the state value is a value indicating a state during a treatment at a position other than a position at which the treatment target is disposed in the semiconductor manufacturing apparatus.

11. The information processing apparatus according to claim 1,
    wherein the set value receiving portion receives multiple set values,
    the state value receiving portion receives multiple state values respectively corresponding to the multiple set values,
    the correction amount calculating portion calculates multiple correction amounts respectively corresponding to the multiple state values, using the correction function,
    the correcting portion corrects the multiple state values respectively corresponding to the multiple correction amounts calculated by the correction amount calculating portion, by the multiple correction amounts, and
    the output portion outputs the multiple state values corrected by the correcting portion.

12. The information processing apparatus according to claim 1,
wherein the set value receiving portion receives a first set value and a second set value each serving as the set value,
the state value receiving portion receives a first state value and a second state value respectively corresponding to the first set value and the second set value,
the correction amount calculating portion calculates a correction amount of the second state value, based on a change amount of the second set value with respect to the first set value serving as a predetermined value, using the correction function,
the correcting portion corrects the second state value by the correction amount, and
the output portion outputs the second state value corrected by the correcting portion and the first state value.

13. The information processing apparatus according to claim 1,
wherein the set value is a set value of temperature inside the semiconductor manufacturing apparatus, and
the state value is a measured value of temperature inside the semiconductor manufacturing apparatus.

14. The information processing apparatus according to claim 1,
wherein the set value is a set value of temperature at a predetermined position inside the semiconductor manufacturing apparatus, and
the state value is a power value of a heater that heats an internal portion of the semiconductor manufacturing apparatus.

15. The information processing apparatus according to claim 1, wherein
the correction amount calculating portion calculates the correction amount by assigning a value obtained by subtracting the preset specified value stored in the specified value storage portion from the set value received by the set value receiving portion, to the correction function stored in the correction function storage portion, and
the correcting portion corrects the state value received by the state value receiving portion by subtracting the correction amount from the state value.

16. A semiconductor manufacturing system, comprising a semiconductor manufacturing apparatus for performing a treatment on a treatment target containing a semiconductor, and the information processing apparatus according to claim 1,
wherein the semiconductor manufacturing apparatus comprises:
a treatment set value receiving portion that receives the set value;
a control portion that controls the treatment on the treatment target according to the set value;
a treatment state value acquiring portion that acquires the state value; and
a treatment output portion that outputs the state value.

17. The semiconductor manufacturing system according to claim 16,
wherein the semiconductor manufacturing apparatus further comprises:
a treatment vessel in which the treatment is performed on the treatment target;
at least one heater that heats an internal portion of the treatment vessel; and
at least one temperature detecting portion that detects a temperature inside the treatment vessel,
the set value is a value for setting a temperature at a predetermined position inside the treatment vessel,
the control portion controls the temperature inside the treatment vessel, by controlling the at least one heater, and
the treatment state value acquiring portion acquires a state value that is a value of the temperature detected by the temperature detecting portion.

18. The semiconductor manufacturing system according to claim 17, wherein the control portion controls the temperature inside the treatment vessel, according to the temperature detected by the at least one temperature detecting portion.

19. The semiconductor manufacturing system according to claim 16,
wherein the semiconductor manufacturing apparatus further comprises:
a treatment vessel in which the treatment is performed on the treatment target; and
at least one heater that heats an internal portion of the treatment vessel,
the set value is a value for setting a temperature at a predetermined position inside the treatment vessel,
the control portion controls a temperature inside the treatment vessel, by controlling the at least one heater, and
the treatment state value acquiring portion acquires a state value that is a power value of the at least one heater.

20. The semiconductor manufacturing system according to claim 19,
wherein the semiconductor manufacturing apparatus further comprises at least one temperature detecting portion that detects the temperature inside the treatment vessel, and
the control portion controls the temperature inside the treatment vessel, according to the temperature detected by the at least one temperature detecting portion.

21. A method of an information processing apparatus for processing a state value, which is a value relating to a state during a treatment, performed by a semiconductor manufacturing apparatus for performing the treatment on a treatment target containing a semiconductor according to a set value, which is a value for setting a condition of the treatment, comprising:
receiving the set value;
receiving the state value;
calculating, by the information processing apparatus, a correction amount, which is a change amount of the state value of a case when the set value is changed into a preset specified value stored in a specified value storage portion, by assigning a change amount of the set value received by the set value receiving portion with respect to the preset specified value stored in the specified value storage portion, to a correction function stored in a correction function storage portion, the correction function indicating a relationship between a change amount of the set value and a change amount of the state value;
correcting the state value received in the state value receiving step, using the correction amount calculated in the calculating step, to correct the state value received by the state value receiving portion into a state value of the case when the set value is changed into the preset specified value; and
outputting the state value corrected in the correcting step.

22. A non-transitory computer-readable storage medium having a program for causing a computer to process a state value, which is a value relating to a state during a treatment, performed by a semiconductor manufacturing apparatus for performing the treatment on a treatment target containing a semiconductor according to a set value, which is a value for setting a condition of the treatment, wherein the program causes the computer to execute:

receiving the set value;

receiving the state value;

calculating a correction amount, which is a change amount of the state value of a case when the set value is changed into a preset specified value stored in a specified value storage portion, by assigning a change amount of the set value received by the set value receiving portion with respect to the preset specified value stored in the specified value storage portion, to a correction function stored in a correction function storage portion, the correction function indicating a relationship between a change amount of the set value and a change amount of the state value;

correcting the state value received in the state value receiving step, using the correction amount calculated in the calculating step, to correct the state value received by the state value receiving portion into a state value of the case when the set value is changed into the preset specified value; and outputting the state value corrected in the correcting step.

* * * * *